(12) United States Patent
Ochi et al.

(10) Patent No.: US 8,393,005 B2
(45) Date of Patent: Mar. 5, 2013

(54) RECORDING MEDIUM, AND DEVICE AND METHOD FOR RECORDING INFORMATION ON RECORDING MEDIUM

(75) Inventors: Makoto Ochi, Osaka (JP); Hirokazu So, Osaka (JP); Shinji Inoue, Osaka (JP); Kazuya Fujimura, Nara (JP); Takuji Maeda, Osaka (JP); Masato Suto, Osaka (JP); Yukiko Inoue, Osaka (JP)

(73) Assignee: Panasonic Corporation, Osaka (JP)

( * ) Notice: Subject to any disclaimer, the term of this patent is extended or adjusted under 35 U.S.C. 154(b) by 894 days.

(21) Appl. No.: 11/571,363

(22) PCT Filed: Jun. 28, 2005

(86) PCT No.: PCT/JP2005/011819
§ 371 (c)(1),
(2), (4) Date: Mar. 1, 2007

(87) PCT Pub. No.: WO2006/003883
PCT Pub. Date: Jan. 12, 2006

(65) Prior Publication Data
US 2007/0300078 A1 Dec. 27, 2007

(30) Foreign Application Priority Data

Jun. 30, 2004 (JP) .................. 2004-193677
Jun. 30, 2004 (JP) .................. 2004-193678

(51) Int. Cl.
*G06F 21/00* (2006.01)
(52) U.S. Cl. .............. 726/27; 726/26; 726/29; 713/169; 713/182; 713/189; 713/193

(58) Field of Classification Search ................. None
See application file for complete search history.

(56) References Cited

U.S. PATENT DOCUMENTS

| | | | |
|---|---|---|---|
| 6,515,212 B2 | 2/2003 | Taira et al. | |
| 6,606,707 B1 * | 8/2003 | Hirota et al. | 713/172 |
| 6,636,773 B1 | 10/2003 | Tagawa et al. | |
| 6,789,192 B2 | 9/2004 | Hirota et al. | |
| 7,062,652 B2 | 6/2006 | Hirota et al. | |
| 7,099,946 B2 * | 8/2006 | Lennon et al. | 709/227 |

(Continued)

FOREIGN PATENT DOCUMENTS

| | | |
|---|---|---|
| EP | 1176754 | 1/2002 |
| EP | 1213720 | 6/2002 |

(Continued)

OTHER PUBLICATIONS

English language Abstract of JP 2002-358732.

(Continued)

*Primary Examiner* — Jeffrey Pwu
*Assistant Examiner* — Thomas C Lauzon
(74) *Attorney, Agent, or Firm* — Greenblum & Bernstein, P.L.C.

(57) ABSTRACT

A recording medium (100) for storing content that can be read and written by a host device stores a content key (a key that is used for encrypting content) (805*a*) encrypted in a first format, and a content key (805*b*) that is encrypted in a second format for content that is the same as the content related to the content key (805*a*) encrypted in the first format. The first format is, for example, a format used for distributed content, and the second format is a format used with local content.

9 Claims, 42 Drawing Sheets

U.S. PATENT DOCUMENTS

| | | | |
|---|---|---|---|
| 7,596,698 B2 * | 9/2009 | Hirota et al. | 713/172 |
| RE42,019 E * | 12/2010 | Tagawa et al. | 726/27 |
| 2002/0062261 A1 * | 5/2002 | Mukai | 705/26 |
| 2002/0116622 A1 | 8/2002 | Okaue et al. | |
| 2002/0141731 A1 | 10/2002 | Elberbaum | |
| 2002/0141737 A1 | 10/2002 | Fuchigami | |
| 2002/0186842 A1 * | 12/2002 | Sabet-Sharghi et al. | 380/200 |
| 2003/0101861 A1 | 6/2003 | Taira et al. | |
| 2003/0226025 A1 | 12/2003 | Lin et al. | |
| 2004/0054678 A1 * | 3/2004 | Okamoto et al. | 707/100 |
| 2004/0256470 A1 | 12/2004 | Takami et al. | |
| 2005/0160053 A1 * | 7/2005 | Okamoto et al. | 705/67 |
| 2005/0216684 A1 | 9/2005 | So et al. | |
| 2005/0231765 A1 | 10/2005 | So et al. | |
| 2006/0129819 A1 | 6/2006 | Hirota et al. | |
| 2007/0100759 A1 | 5/2007 | Kasahara et al. | |
| 2008/0155700 A1 * | 6/2008 | Ohmori et al. | 726/26 |
| 2008/0263367 A1 * | 10/2008 | Tatebayashi et al. | 713/193 |

FOREIGN PATENT DOCUMENTS

| | | |
|---|---|---|
| EP | 1411514 | 4/2004 |
| EP | 1480411 | 11/2004 |
| EP | 1553497 | 7/2005 |
| EP | 1758290 | 2/2007 |
| JP | 2000-358003 | 12/2000 |
| JP | 2001-249695 | 9/2001 |
| JP | 2002-184114 | 6/2002 |
| JP | 2002-358732 | 12/2002 |
| JP | 3389186 | 1/2003 |
| JP | 2004-349754 | 12/2004 |
| TW | 591630 | 6/2004 |
| WO | 00/65602 | 11/2000 |
| WO | 2004/036434 | 4/2004 |

OTHER PUBLICATIONS

English language Abstract of JP 2000-358003.
English language Abstract of JP 2002-184114.
English language Abstract of JP 2004-349754.
English language Abstract of JP 3389186.
English language Abstract of JP 2001-249695.
U.S. Appl. No. 10/578,373 to So et al., filed May 5, 2006.
U.S. Appl. No. 10/596,780 to Inoue et al., filed Jun. 23, 2006.
U.S. Appl. No. 11/571,594 to So et al., filed Jan. 23, 2007.
E.P.O. Office action, mail date is Sep. 9, 2011.
Taiwan Office Action, dated Jul. 30, 2012, with English language translation.

* cited by examiner

RECORDING MEDIUM, AND DEVICE AND METHOD FOR RECORDING INFORMATION ON RECORDING MEDIUM

TECHNICAL FIELD

The present invention relates to recording media and relates more particularly to recording media enabling copyright protection. The invention also relates to a recording apparatus and a recording method for recording information on such recording media.

BACKGROUND ART

Recording media of many types, including semiconductor recording media, magnetic disks, optical disks, and magneto-optical disks, are used to record music content, video content, still picture content, and other types of digital data (referred to below as "content").

In addition to small size and light weight, semiconductor recording media have seen rapid advances in storage capacity, speed, and price reduction in recent years, leading to widespread use in digital cameras, cell phones, portable music players, televisions, DVD recorders, and other products. Common examples of semiconductor recording media include SD Memory cards (R), memory sticks, and Compact Flash (R) media. Some semiconductor recording media, such as SD Memory cards, also have a copyright protection function and enable recording copyrighted content.

One method of storing content to semiconductor recording media using a copyright protection function is described next. Such semiconductor recording media have a protected memory area that can only be accessed after mutual authentication by the semiconductor recording medium and the reading device or writing device that is the host device, and an unprotected memory area that can be accessed without mutual authentication. Encrypted content is recorded in the unprotected memory area, and the key used to encrypt the content is stored in the protected memory area. See, for example, patent reference 1.

Content that is stored using the copyright protection function cannot be played back by an unauthenticated device that cannot be mutually authenticated. The content also cannot be used by simply copying the content stored in the unprotected memory area to a different card.

New applications for content using the copyright protection function of such semiconductor recording media continue to emerge. Users can rip content from music CDs purchased by the user, and can download content from the Internet. More specifically, using a personal computer connected to the Internet, users can purchase and download music, books, and other copyrighted content from on-line content providers, record the downloaded content to a semiconductor recording medium, and can listen to the music or read the book using the semiconductor recording medium and a compact semiconductor player.

In addition to using a personal computer connected to the Internet, users can also purchase content through electronic terminals (digital kiosks) installed in specific fixed locations such as convenience stores, other types of businesses, and even train stations. Because such applications are particularly convenient for the user and afford an expanded sales network for the providers, the type of content and the user environment continue to evolve.

Various recording standards based on the type of semiconductor recording medium and the type of content have been defined for recording copyrighted content to semiconductor recording media, and the recording device records the content according to the standard. This enables any device conforming to the standard to read and write content to the semiconductor recording medium.

Using a music application program by way of example, the content of a song is encrypted using an encryption key, and the key and the encrypted content are stored to the semiconductor recording medium.

Patent reference 2 teaches a semiconductor recording medium for storing a plurality of encryption keys in a predetermined order in a protected memory area that can only be accessed by mutual authentication of the semiconductor recording medium and the host device, and storing encrypted content and corresponding management information in an unprotected memory area. This semiconductor recording medium protects music content from unauthorized decryption (decoding) while still enabling changing the play-back sequence of individual tracks and deleting selected tracks, and thus affords great convenience.

[Patent reference 1] Japanese Patent 3389186
[Patent reference 2] Japanese Unexamined Patent Appl. Pub. 2001-249695

DISCLOSURE OF INVENTION

Problem to be Solved by the Invention

Problems with the foregoing technology are described below. The standards for storing encrypted content and the keys used for the copyright protection function of the semiconductor recording medium are variously defined according to the type of content and semiconductor recording medium storing the content. New storage standards may also be defined in the future according to changes in usage patterns and content type. Storing content according to a storage standard affording a relatively high degree of freedom (accommodating a wide range of content types) also enables storing content that can be stored according to a storage standard affording a relatively low degree of content freedom.

More specifically, a storage standard enabling encrypting and storing content such as music and still pictures regardless of the content type also enables storing music content that can be stored according to a storage standard designed only for music content.

Encrypting the same content according to multiple storage standards and storing the encrypted content to a single semiconductor recording medium to enable play-back on reading devices conforming to different standards requires a lot of processing time to write the content from the host device to the semiconductor recording medium. Storing the same content multiple times also consumes more storage space.

The present invention is directed to the foregoing problems, and an object of the invention is to provide a semiconductor recording medium for recording the same content according to different copyright protection standards so that the content can be played back and recorded by a plurality of devices, and to provide a recording method and recording apparatus.

Means for Solving the Problem

A recording medium according to a first aspect of the invention is a recording medium that enables reading and writing data by means of a host device to store content, and stores a content key, which is a key used for encrypting content, in a first storage format to a predetermined area and a content key equivalent to the content key in a second storage format different from the first storage format to a predetermined area. The first storage format is, for example, a format used with distributed content, and the second storage format is a format used with local content.

A recording apparatus for recording content to a recording medium according to a second aspect of the invention has a reception means for receiving content in a first format and a content key that is the key used for encrypting the content, a first key writing means for writing the received first format content key in a predetermined storage format to a predetermined area of the recording medium, a first content writing means for writing the received first format content in a predetermined storage format to a predetermined area of the recording medium, a key conversion means for converting the first format content key to a second format content key without changing the key value, a content conversion means for converting the first format content to second format content, a second key writing means for writing the second format content key in a predetermined storage format to a predetermined area of the recording medium, and a second content writing means for writing the second format content in a predetermined storage format to a predetermined area of the recording medium.

A recording apparatus for recording content to a recording medium according to a third aspect of the invention has an input means for inputting content from a source, a content recording means for generating a content key that is a key used for encrypting content input through the input means and using the key to encrypt the content to produce encrypted content, a first key writing means for writing the content key to a predetermined area of the recording medium in a first storage format, a second key writing means for writing the content key equivalent to the content key to a predetermined area of the recording medium in a second storage format, a first content writing means for writing the encrypted content to a predetermined area of the recording medium in the first storage format, and a second content writing means for writing the encrypted content to a predetermined area of the recording medium in a second storage format.

A recording apparatus for recording content to a recording medium according to a fourth aspect of the invention has a reception means for receiving content in a first format and a first format content key that is used to encrypt the content, a first key writing means for writing the received first format content key in a predetermined storage format to a predetermined area of the recording medium, a first format content writing means for writing the received first format content in a predetermined storage format to a predetermined area of the recording medium, a key conversion means for converting the content key of the first format to a content key of a second format without changing the key value itself, a content conversion means for converting the first format content to content of the second format, a second key writing means for writing the second format content key in a predetermined storage format to a predetermined area of the recording medium, and a second content writing means for writing the second format content in a predetermined storage format to a predetermined area of the recording medium.

The key conversion means has a content key decryption means for getting the first format content key from the recording medium and decrypting the first format content key using a predetermined key encryption key, and a content key encryption means for encrypting the decrypted first format content key using a second key encryption key and storing the encrypted content key as a second format content key to the recording medium.

A fifth aspect of the invention is a recording method for recording a content key that is a key used for encrypting content to a recording medium by storing the content key to a predetermined area of the recording medium in a first storage format and additionally storing the content key equivalent to said content key to a predetermined area of the recording medium in the recording medium in a second storage format different from the first storage format.

Effect of the Invention

The invention enables recording encryption keys in a plurality of formats for identical content recorded on the same recording medium. The invention thus enables recording the same content to a recording medium with compatibility for a plurality of copyright protection standards, and thus improves the utility of a recording medium affording such a copyright protection function. Furthermore, by managing the content stored to the recording medium using uniquely readable information, the invention prevents storing the same content multiple times and reduces consuming recording capacity.

KEY TO THE FIGURES

Figure 1:
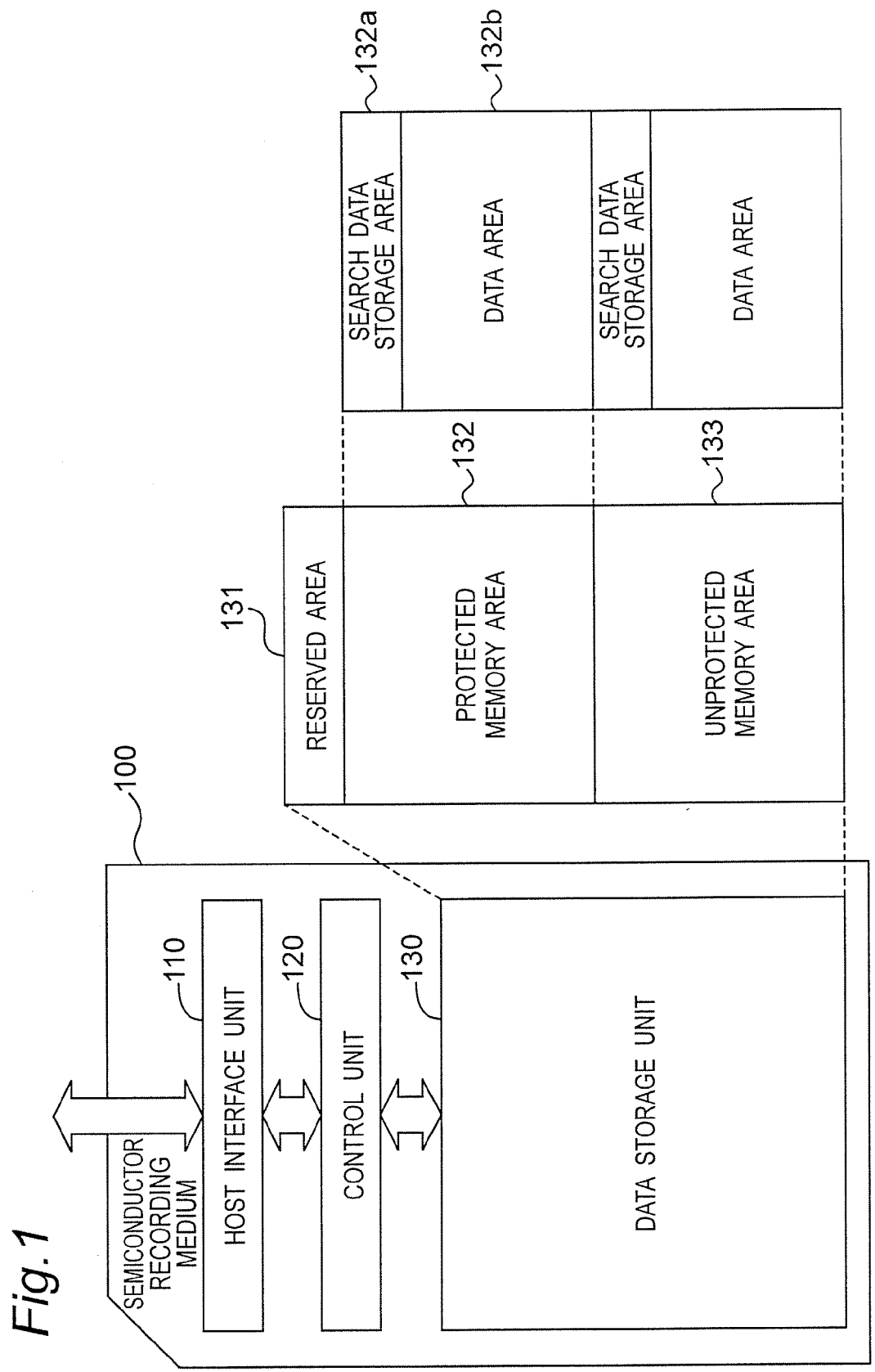
FIG. 1 shows the arrangement of a semiconductor recording medium according to a first embodiment of the invention.

100, 100a-100k semiconductor recording medium
110 host interface unit
120 control unit
130 data storage unit
131 reserved area
132 protected memory area
133 unprotected memory area
200, 600a-600k, 2000 distributed content recording apparatus
210 first format content and key reception unit
221 first format content key writing unit
230 content key format conversion unit
241 first format content writing unit
242 second format content writing unit
250 content format conversion unit
280, 380, 480 internal recording medium
605 content key decryption unit
607 content key encryption unit
615 mutual authentication unit
619 key encryption key calculation unit
801 media key
803 service key
803a encryption service key
805 content key
805a first format encrypted content key
807 content
807a first format encrypted content
1304 management information

MODE FOR CARRYING OUT THE INVENTION

Preferred embodiments of the present invention are described below with reference to the accompanying figures.

First Embodiment 1.1 Arrangement of the Recording Medium

FIG. 1 shows the arrangement of a semiconductor recording medium according to the present invention. This semiconductor recording medium 100 includes a host interface unit 110, a control unit 120, and a data storage unit 130.

The host interface unit 110 controls data communication with the host device (such as a play-back device or recording device) that reads and writes data in the semiconductor recording medium 100.

The control unit 120 controls internal operations of the semiconductor recording medium 100. The control unit 120 interprets read and write commands received from the host and accesses the data storage unit 130. The control unit 120 also handles reporting the results to the host device through the host interface unit 110 as needed.

The data storage unit 130 stores digital data and physically is a nonvolatile memory device such as flash memory. The recording area of the data storage unit 130 includes a reserved area 131, a protected memory area 132, and an unprotected memory area 133.

The reserved area 131 is where digital data that is used by the semiconductor recording medium 100 is stored, and cannot be accessed directly by the host device. The reserved area 131 stores a unique media key that is unique to each semiconductor recording medium 100 and is recorded during semiconductor recording medium 100 manufacture.

The protected memory area 132 is a storage area that can only be accessed after mutual authentication by the host device and the semiconductor recording medium 100. As a result, only a host device that succeeds with authentication can read and write data in the protected memory area 132.

The unprotected memory area 133 is a memory area where the host device can read and write without mutual authentication by the host device and semiconductor recording medium 100.

The protected memory area 132 and unprotected memory area 133 each include a search data storage area 132a and a data area 132b. The data area 132b is used for storing selected digital data. The search data storage area 132a stores the information (such as address and size) required for the host device to retrieve digital data stored to the data area 132b.

In this embodiment of the invention digital data is managed using the FAT file system, and the area that stores the information required by the FAT file system (file system management information) is the search data storage area 132a.

Figure 2:
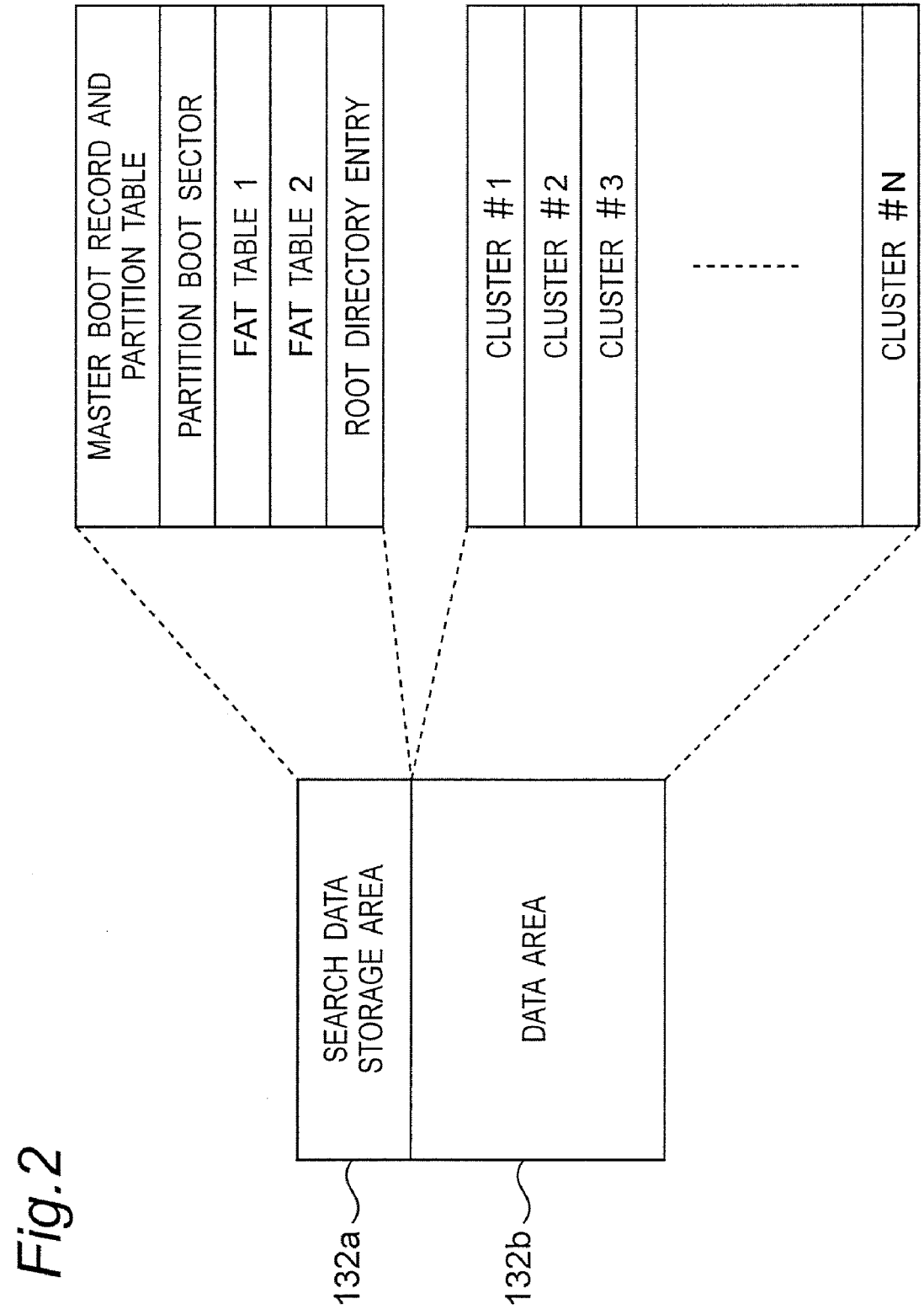
FIG. 2 shows the arrangement of the data search storage area and the data area in the first embodiment of the invention.

FIG. 2 shows the structure of the search data storage area 132a and data area 132b when the FAT file system is used. As shown in FIG. 2, the search data storage area 132a stores a master boot record and partition table for dividing the data area 132b into a plurality of partitions and managing the partitions, a partition boot sector for storing management information in one partition, FAT table 1 and FAT table 2 containing the storage locations of the data contained in the files, and a root directory entry that stores file and directory information that are located directly below the root directory. The data area 132b is divided into a plurality of units called "clusters" for management.

1.2 Method of Storing Content Data 1.2.1 Method of Storing Distributed Content (First Format)

The content data storage method of this first embodiment of the invention is described next with reference to FIG. 3 to FIG. 5.

Figure 3:
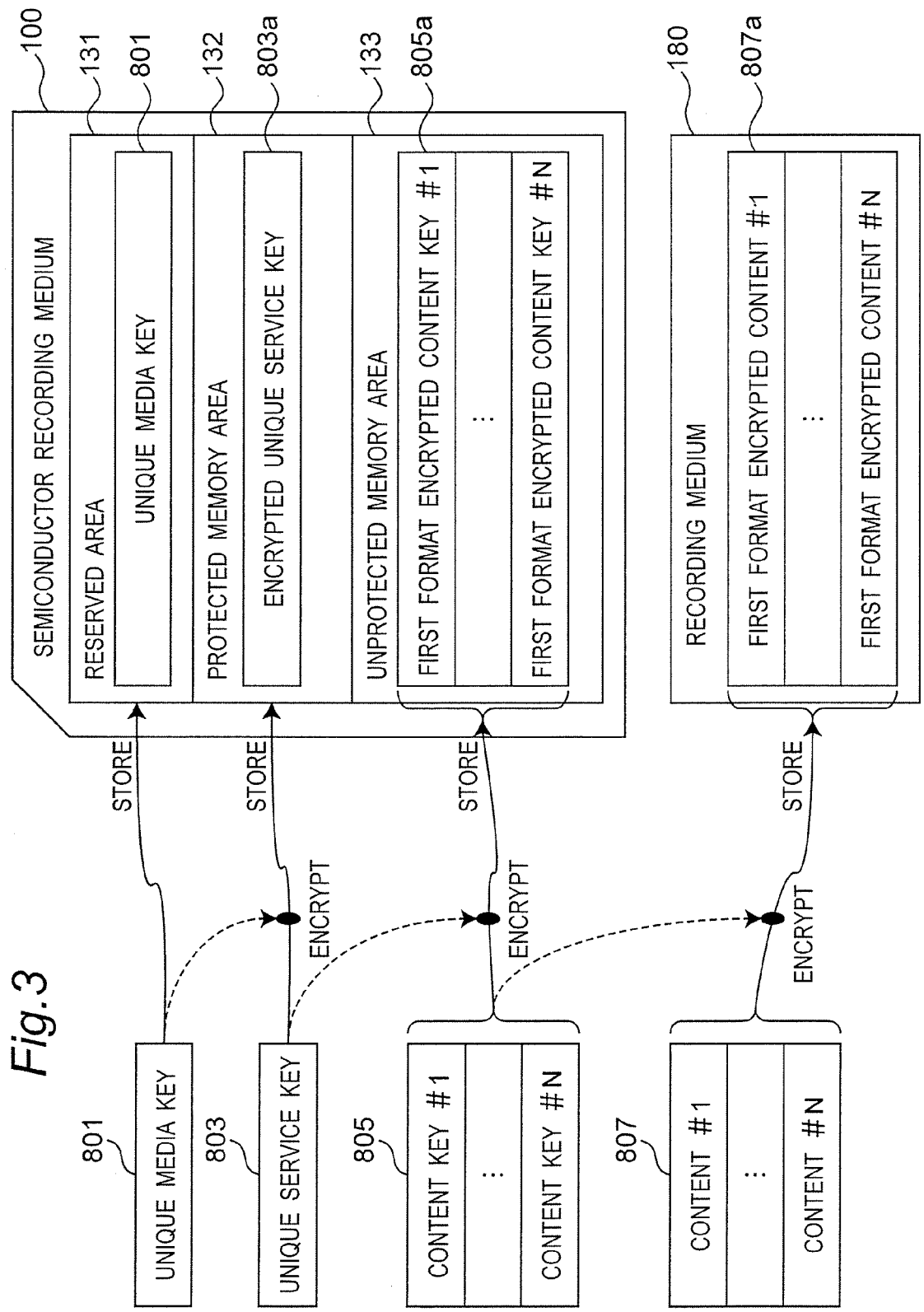
FIG. 3 shows an example of a method of storing distributed content to the semiconductor recording medium.

FIG. 3 describes a method of storing distributed content that is downloaded over a network from an entity providing a distribution service (a "content provider" below) to the semiconductor recording medium 100. The storage format used by this method is referred to below as the "first format."

As shown in FIG. 3, N distributed contents 807 (content #1 to content #N) are encrypted using N content keys 805 (content key #1 to content key #N), and are recorded to a recording medium 180 separate from the semiconductor recording medium 100 as N encrypted contents 807a (first format encrypted content #1 to first format encrypted content #N).

The N content keys 805 (content key #1 to content key #N) are encrypted using a service key 803 selectively defined by the distribution service, and then stored in the unprotected memory area 133 of the semiconductor recording medium 100 as N encrypted content keys 805a (first format encrypted content key #1 to first format encrypted content key #N).

The service key 803 is encrypted using the unique media key 801, which is a key unique to the semiconductor recording medium 100, and is stored in the protected memory area 132 of the semiconductor recording medium 100 as an encrypted unique service key 803a.

The unique service keys 803 are generated by the content provider in this embodiment of the invention, the encrypted unique service key 803a is prestored in the semiconductor recording medium 100 by the content provider, and the distributed content recording apparatus 200 and distributed content play-back apparatus 400 described below can only read the encrypted unique service key 803a.

The unique media key 801 is stored in the reserved area 131 during semiconductor recording medium 100 manufacture. The host device can only read the unique media key 801 after mutual authentication by the host device and semiconductor recording medium 100.

1.2.2 Storage Method for Local Content (Second Format)

Figure 4:
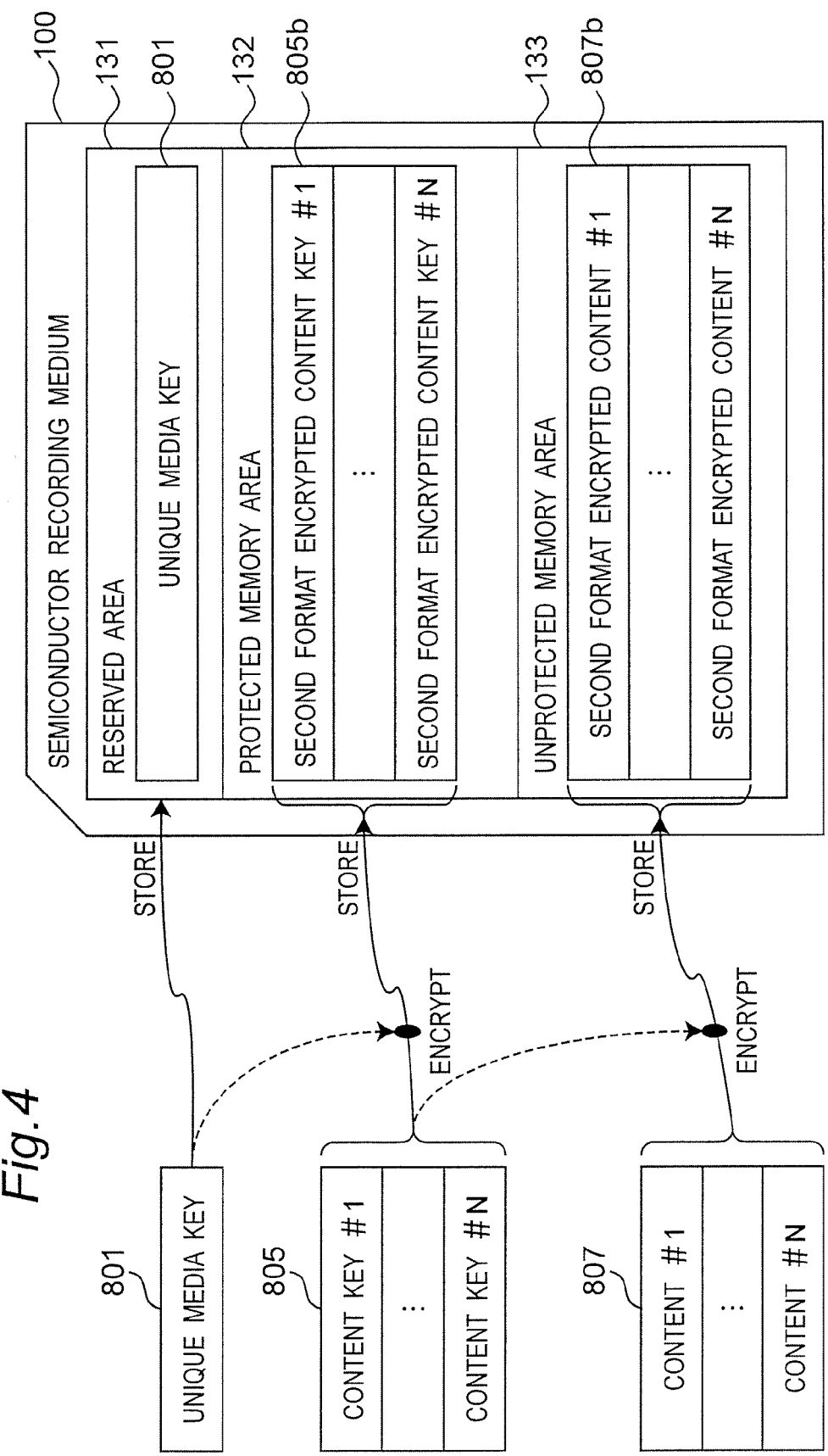
FIG. 4 shows an example of a method of storing local content to the semiconductor recording medium.

FIG. 4 describes a method of storing local content to the semiconductor recording medium 100. The storage format used by this method is called the "second format" below.

Local content is content that can be acquired by means other than distribution and includes video data and audio data that is stored on CD, Mini Disc, or DVD, for example, video data, audio data, and text data that is stored as files on the hard disk drive of a personal computer, for example, and video data and audio data that is produced by the user. Local content can be encrypted or encoded for data compression, but is assumed to be neither encrypted or compressed in this embodiment of the invention. Local content is, for example, PCM audio data stored on a music CD.

As shown in FIG. 4, N local contents 807 (content #1 to content #N) are encrypted using N content keys 805 (content key #1 to content key #N), and are recorded to the unprotected memory area 133 of the semiconductor recording medium 100 as N encrypted contents 807b (second format encrypted content #1 to second format encrypted content #N).

The N content keys 805 (content key #1 to content key #N) are encrypted using a unique media key 804 stored in the reserved area 131 of the semiconductor recording medium 100, and are stored as N encrypted content keys 805b (second format encrypted content key #1 to second format encrypted content key #N) in the protected memory area 132 of the semiconductor recording medium 100.

1.2.3 Content Storage Method of the Invention

Figure 5:
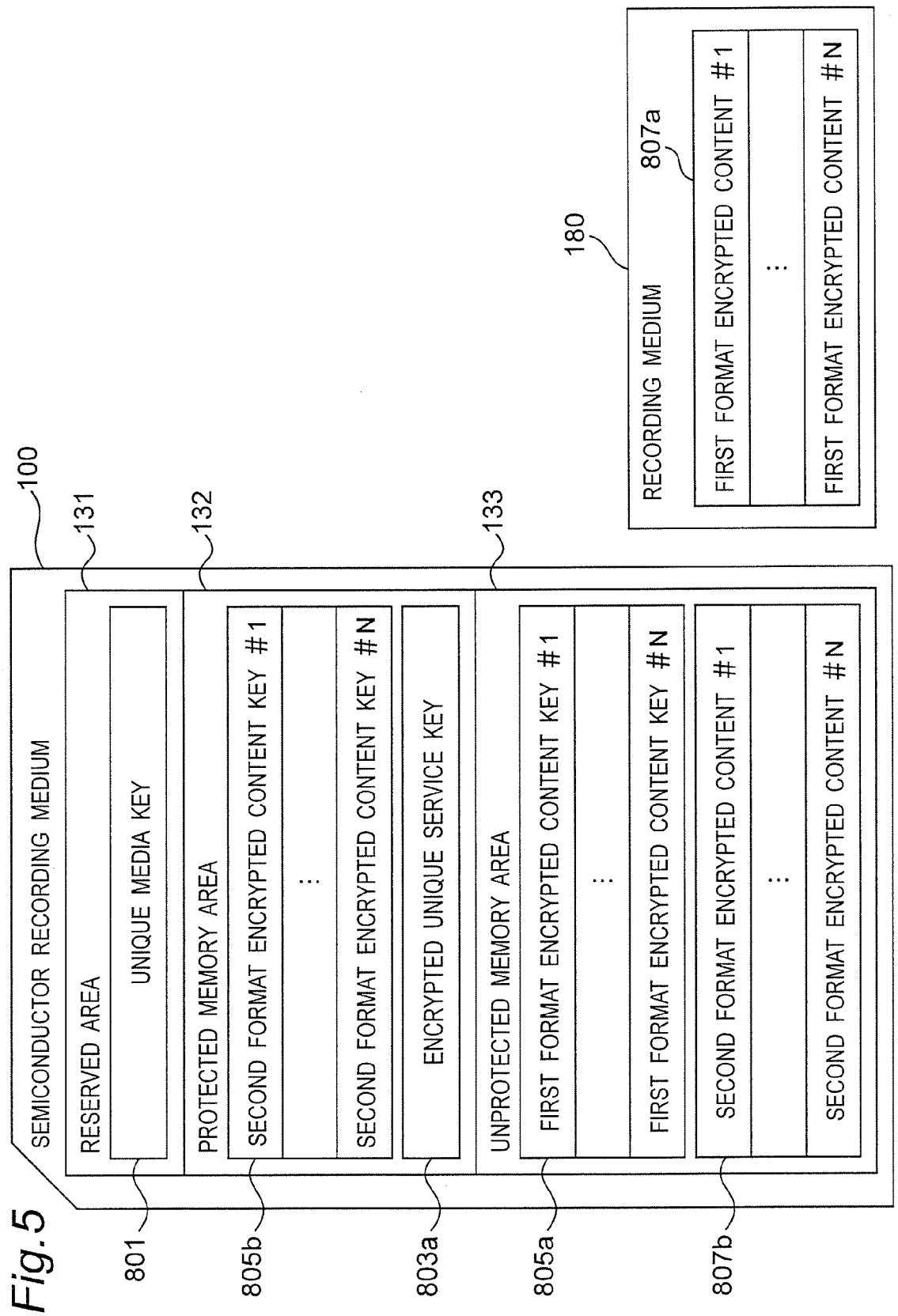
FIG. 5 shows an example of a method of storing content to the semiconductor recording medium in a first embodiment of the invention.

FIG. 5 shows the storage method of the present invention for storing content (either distributed content or local content) to a semiconductor recording medium 100.

FIG. 5 describes the data structure of content recorded using a combination of the first format storage method shown in FIG. 3 and the second format storage method shown in FIG. 4.

As a result, N contents 807 (content #1 to content #N) are encrypted using N content keys 805 (content key #1 to content key #N), and are recorded to a recording medium 180 separate from the semiconductor recording medium 100 as N encrypted contents 807a (first format encrypted content #1 to first format encrypted content #N). Additionally, N encrypted contents 807b (second format encrypted content #1 to second format encrypted content #N) are simultaneously recorded to the unprotected memory area 133 of the semiconductor recording medium 100. Thus storing the first format encrypted content 807a to a separate recording medium 180 has the effect of reducing consumption of the recording capacity of the semiconductor recording medium 100. However, if the recording capacity of the semiconductor recording medium 100 is not a concern, the first format encrypted content 807a can be recorded with the second format encrypted content 807b to the semiconductor recording medium 100.

The N content keys 805 (content key #1 to content key #N) are encrypted using a service key 803 selectively defined by the distribution service, and then stored in the unprotected memory area 133 of the semiconductor recording medium 100 as N encrypted content keys 805a (first format encrypted content key #1 to first format encrypted content key #N). The N content keys 805 (content key #1 to content key #N) are encrypted using a unique media key 801 stored in the reserved area 131 of the semiconductor recording medium 100, and are also stored as N encrypted content keys 805b (second format encrypted content key #1 to second format encrypted content key #N) in the protected memory area 132 of the semiconductor recording medium 100.

The unique service key 803 is encrypted using the unique media key 801, which is a key unique to the semiconductor recording medium 100, and is stored in the protected memory area 132 of the semiconductor recording medium 100 as a encrypted unique service key 803a.

In this embodiment of the invention the format (including size) of the unencrypted, that is, plain text, content keys is the same in both the first format and second format. The format of the plain text content (such as the encoding method) is also the same. The method of encrypting plain text content with a plain text content key is also the same (such as DES encryption or C2 encryption).

1.3 Arrangement and Operation of the Recording Apparatus

The arrangement and the recording sequence of the recording apparatus according to the present invention are described next with reference to FIG. 6 to FIG. 9.

1.3.1 Recording Apparatus for Distributed Content

Figure 6:
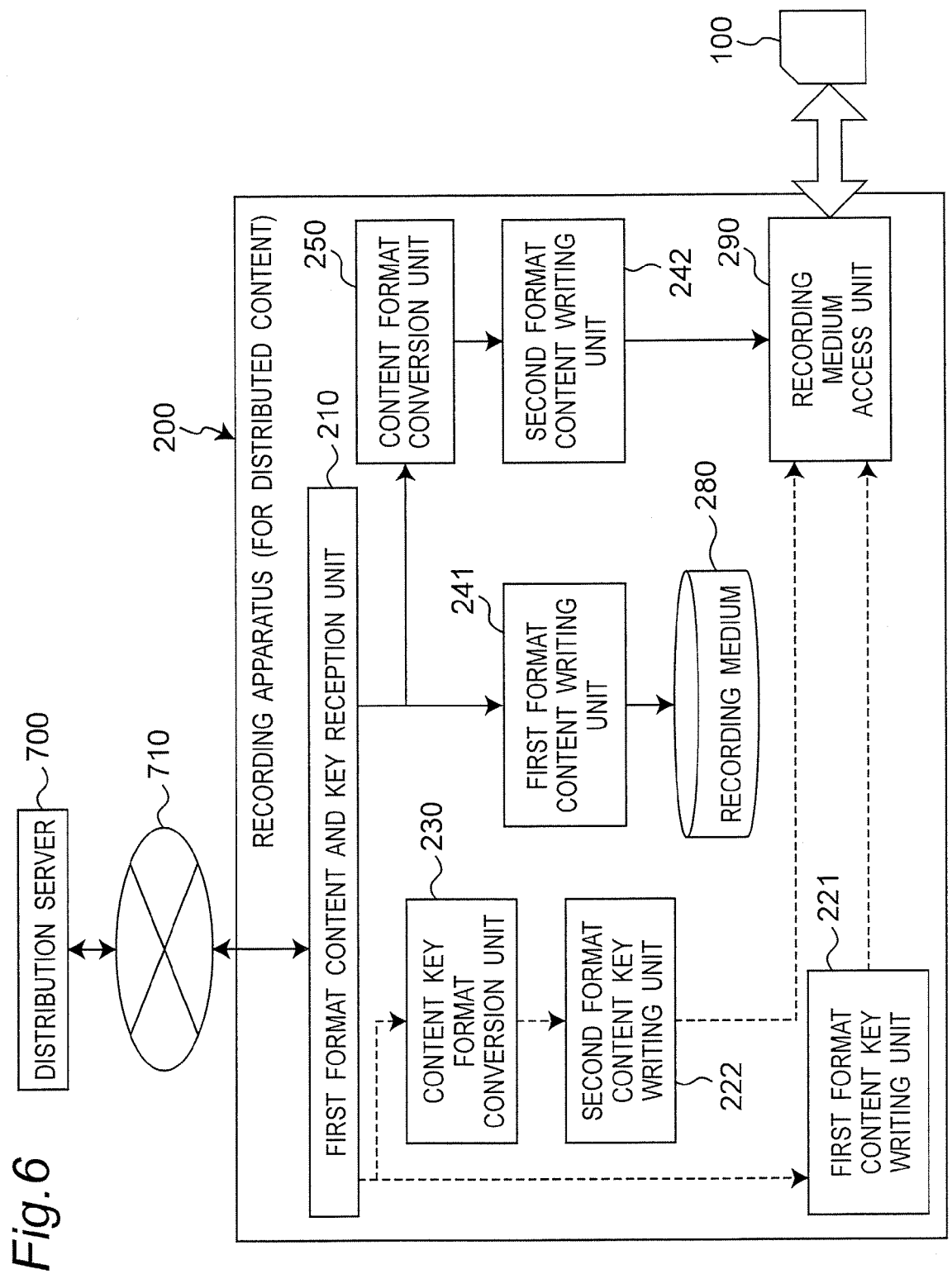
FIG. 6 shows the arrangement of a distributed content recording apparatus (host device) according to a first embodiment of the invention.

FIG. 6 shows the arrangement of a recording apparatus for distributed content that records distributed content to a semiconductor recording medium 100 using the storage method described in FIG. 5. Solid lines in FIG. 6 denote the flow of content data and broken lines denote the flow of content key data.

This recording apparatus 200 includes a first format content and key reception unit 210, a first format content key writing unit 221, a second format content key writing unit 222, a content key format conversion unit 230, a first format content writing unit 241, a second format content writing unit 242, a content format conversion unit 250, an internal recording medium 280, and a recording medium access unit 290.

The first format content and key reception unit 210 is connected to a network 710, and receives in the first format content and content keys for encrypting content from a distribution server 700 connected to the same network. The content distributed from the distribution server 700 is encrypted using a content key, and the content keys distributed from the distribution server 700 are encrypted using a unique service key that is desirably defined by the distribution service.

The first format content key writing unit 221 writes the first format encrypted content key to the semiconductor recording medium 100 through the recording medium access unit 290.

The second format content key writing unit 222 writes the second format encrypted content key to the semiconductor recording medium 100 through the recording medium access unit 290.

The content key format conversion unit 230 converts the first format encrypted content key to a second format encrypted content key.

The first format content writing unit 241 writes the first format encrypted content to the internal recording medium 280. Note the first format encrypted content can be written to the semiconductor recording medium 100 instead of the internal recording medium 280.

The second format content writing unit 242 writes the second format encrypted content to the semiconductor recording medium 100 through the recording medium access unit 290.

The content format conversion unit 250 converts first format encrypted content to second format encrypted content.

The internal recording medium 280 is inside the distributed content recording apparatus 200 and is a recording medium to which any digital data can be written or read. Note that this internal recording medium 280 corresponds to the recording medium 180 shown in FIG. 3 and FIG. 5.

The semiconductor recording medium 100 can be connected to the recording medium access unit 290, and the recording medium access unit 290 executes the authentication process required to access the connected semiconductor recording medium 100, read the unique media key stored in the reserved area 131 of the semiconductor recording medium 100, and read and/or write desired digital data that is stored in the protected memory area 132.

Figure 7:
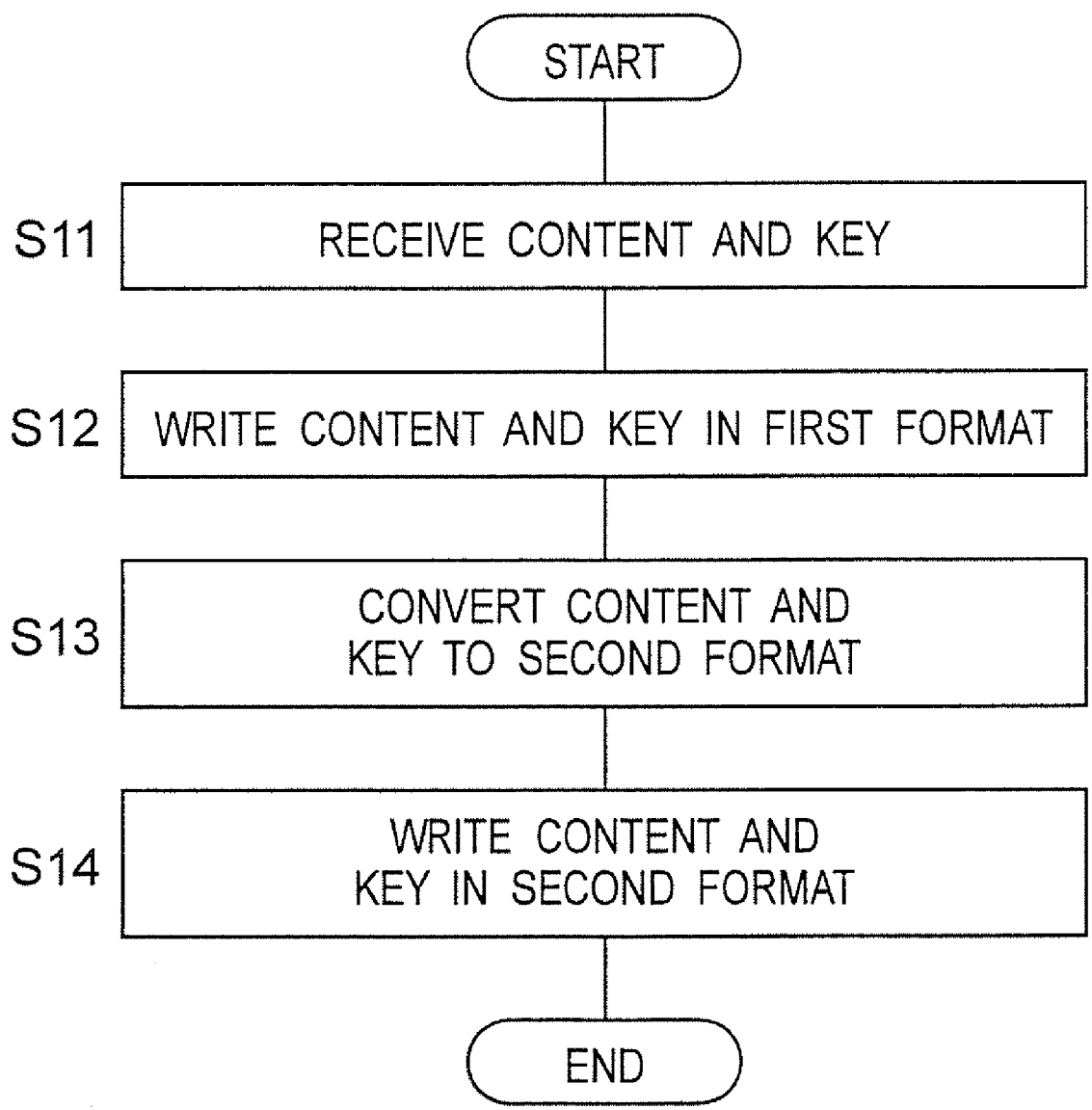
FIG. 7 is a flow chart of the distributed content recording sequence according to a first embodiment of the invention.

FIG. 7 is a flow chart showing the operating sequence for storing distributed content received by the distributed content recording apparatus 200 to the semiconductor recording medium 100 and internal recording medium 280.

Step S11

First, the first format content and key reception unit 210 of the recording apparatus 200 receives content and a content key in the first format from the distribution server 700 through the intervening network 710. The content distributed by the distribution server 700 is encrypted using the content key, and the content key is encrypted by the unique service key that is freely selected by the distribution service.

Step S12

The first format content key writing unit 221 then stores the received content key through the recording medium access unit 290 to the unprotected memory area 133 of the semiconductor recording medium 100, and the first format content writing unit 241 stores the received content to the internal recording medium 280.

Step S13

Next, the first format content and content key are converted to the second format. As a result, the content key format conversion unit 230 converts the content key from the first format to the second format. This conversion process includes a first part of generating a plain text content key from the encrypted content key stored in the first format, and a second part of generating an encrypted content key for storage in the second format from the plain text content key.

More specifically, this first part executes the following operations. The content key is encrypted to the first format using the unique service key as shown in FIG. 3. The unique service key is therefore read through the recording medium access unit 290 and decrypted using the unique service key to generate a plain text content key. However, because the unique service key is encrypted using the unique media key when the service key is stored to the semiconductor recording medium 100, the encrypted unique service key and unique media key must be read to calculate a plain text unique service key.

The second part executes the following operations. As shown in FIG. 4, the content key is encrypted using a unique media key in the second format, and the unique media key is therefore read through the recording medium access unit 290 and the plain text content key is encrypted using the unique media key.

An encrypted content key can thus be generated in the second format. Note that reading the unique media key and reading the encrypted unique service key are enabled when mutual authentication by the recording medium access unit 290 and semiconductor recording medium 100 succeeds.

The content format conversion unit 250 also converts the content from the first format to the second format. In both the first format and the second format in this embodiment the format (including size) of the plain text content keys is the same, the format (such as encoding method) of the plain text content is the same, and the encryption method when encrypting the content with the content key is the same. As a result, a process for decrypting, editing, and re-encrypting encrypted content of the first format is not necessary. It is only necessary to simply convert the file format of the encrypted content, for example.

Step S14

Next, the content and content key of the second format are written to the semiconductor recording medium 100. The second format content key writing unit 222 stores the encrypted content key of the second format generated in the previous step through the recording medium access unit 290 to the protected memory area 132 of the semiconductor recording medium 100. Writing to the protected memory area 132 is enabled when mutual authentication by the recording medium access unit 290 and semiconductor recording medium 100 succeeds.

The second format content writing unit 242 also stores the encrypted content of the second format generated in the previous step through the recording medium access unit 290 to the unprotected memory area 133 of the semiconductor recording medium 100.

1.3.2 Recording Apparatus for Local Content

Figure 8:
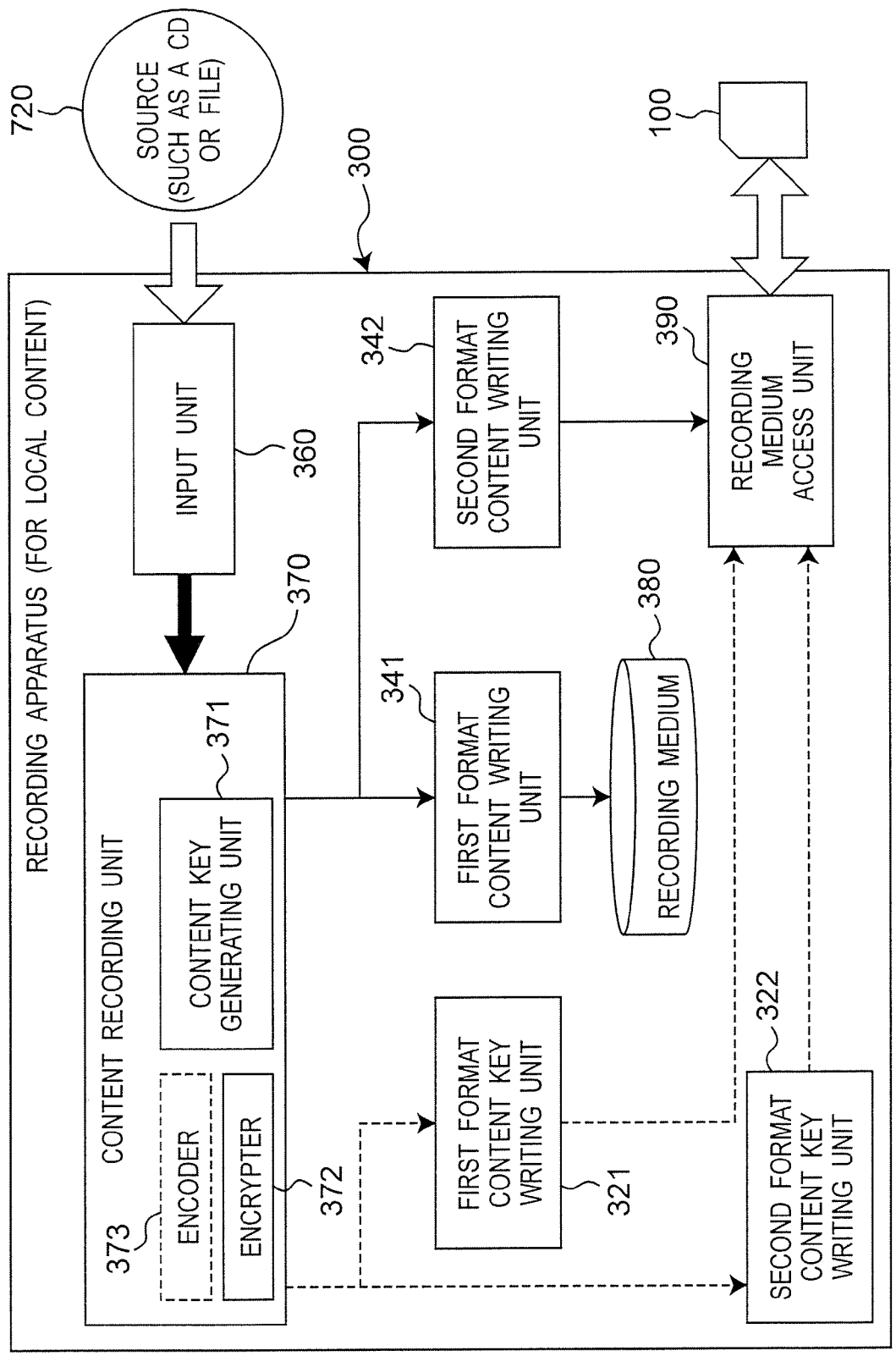
FIG. 8 shows the arrangement of a local content recording apparatus (host device) according to a first embodiment of the invention.

FIG. 8 shows the arrangement of a local content recording apparatus 300 for recording local content to the semiconductor recording medium 100. Solid lines in FIG. 8 denote the flow of content data and broken lines denote the flow of content key data.

The local content recording apparatus 300 has a first format content key writing unit 321, a second format content key writing unit 322, a first format content writing unit 341, a second format content writing unit 342, an input unit 360, a content recording unit 370, an internal recording medium 380, and a recording medium access unit 390.

The input unit 360 inputs the local content from a source such as a recording medium to which the local content is stored.

The content recording unit 370 generates the content key and uses the content key to generate encrypted content from the local content input through the input unit 360. The content recording unit 370 includes a content key generating unit 371, an encrypter 372, and an encoder 373.

The content key generating unit 371 generates the content key used to encrypt the local content input from the input unit 360. In this embodiment of the invention the content key generating unit 371 has a random number generator and generates the content keys randomly.

The encrypter 372 encrypts the local content using the content key generated by the content key generating unit 371 and thus outputs encrypted content in the first and second formats. The encoder 373 compresses the local content input by the input unit 360 by an encoding algorithm. The encoder 373 is not necessarily required, but in this embodiment of the invention the input local content is compressed by the encoder 373 and is then encrypted by the encrypter 372.

The first format content key writing unit 321 converts the plain text content key to an encrypted content key of the first format, and writes the encrypted content key through the recording medium access unit 390 to the semiconductor recording medium 100.

The second format content key writing unit 322 converts the plain text content key to an encrypted content key of the second format, and writes the encrypted content key through the recording medium access unit 390 to the semiconductor recording medium 100.

The first format content writing unit 341 writes the encrypted content of the first format to the internal recording medium 380.

The second format content writing unit 342 writes the encrypted content of the second format through the recording medium access unit 390 to the semiconductor recording medium 100.

The internal recording medium 380 is built in to the local content recording apparatus 300 and is a recording medium that enables reading and writing desired digital data. This internal recording medium 380 corresponds to the recording medium 180 shown in FIG. 3 and FIG. 5.

When a semiconductor recording medium 100 is mounted, the recording medium access unit 390 runs the authentication process required to enable accessing the mounted semiconductor recording medium 100, reading the unique media key stored to the reserved area 131 of the semiconductor recording medium 100, and reading and/or writing desired digital data stored in the protected memory area 132.

Figure 9:
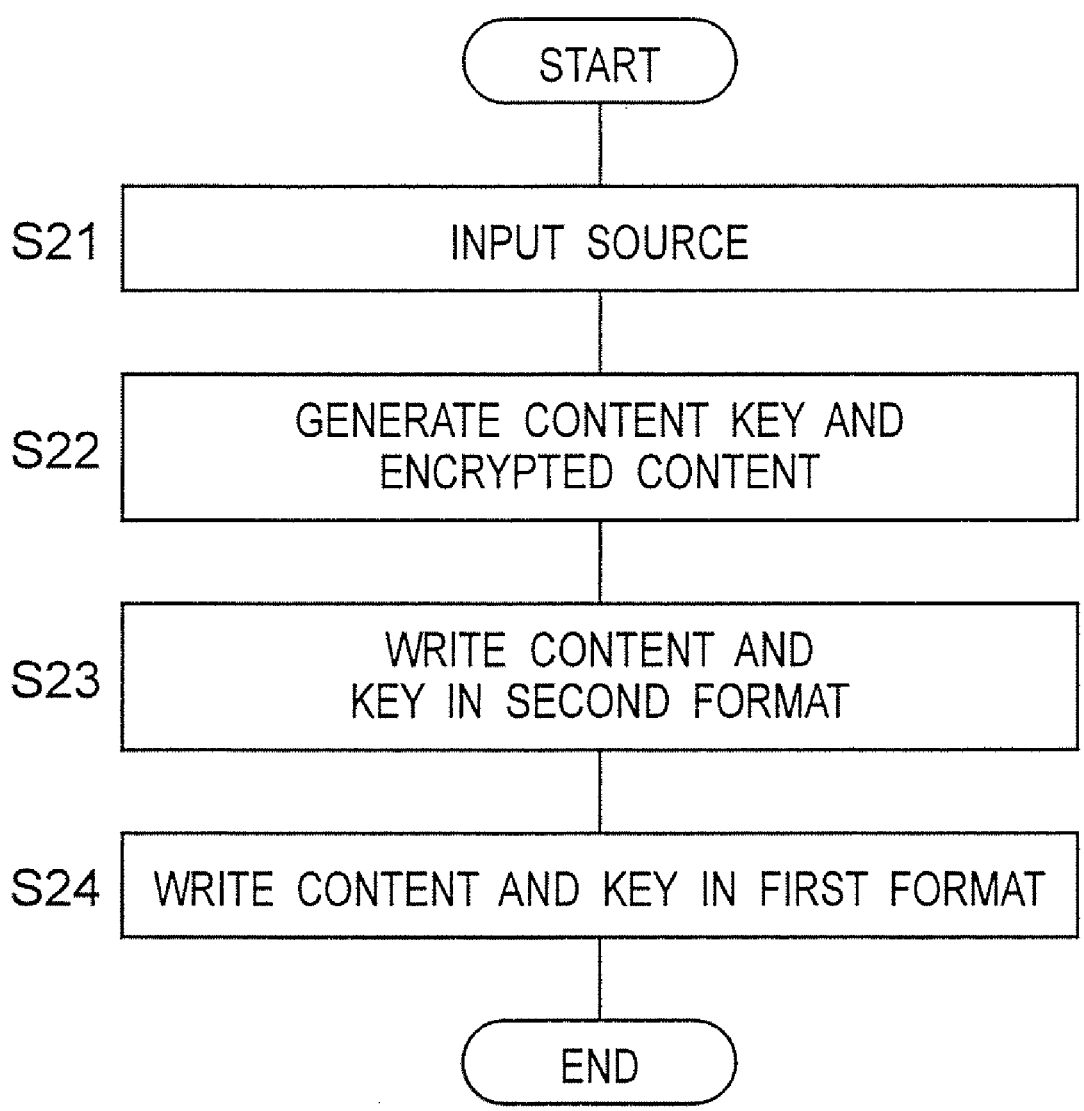
FIG. 9 is a flow chart of the local content recording sequence according to a first embodiment of the invention.

FIG. 9 is a flow chart showing the operating sequence for storing local content acquired by the local content recording apparatus 300 through the input unit 360 to the semiconductor recording medium 100 and internal recording medium 380.

Step S21

The input unit 360 of the recording apparatus 300 first gets the local content by reading from the recording medium 720 to which the source is recorded or as input from an input device such as a camera and microphone. The acquired local content is passed to the content recording unit 370.

Step S22

The content recording unit 370 compresses the local content input from the encoder 373 by encoding. The content key generating unit 371 generates the content key, and the encrypter 372 encrypts the encoded local content using the content key to generate encrypted content in the first format and second format.

Step S23

The second format content key writing unit 322 encrypts the content key using the unique media key of the semiconductor recording medium 100 to generate the encrypted content key, and stores the encrypted content key in the second format to the protected memory area 132 of the semiconductor recording medium 100 by way of the recording medium access unit 390. Reading the unique media key and writing to the protected memory area 132 is enabled by mutual authentication by the recording medium access unit 390 and semiconductor recording medium 100.

The second format content writing unit 342 stores the encrypted content through the recording medium access unit 390 to the unprotected memory area 133 of the semiconductor recording medium 100 in the second format.

Step S24

Next, the first format content key writing unit 321 encrypts the content key using the unique service key stored in the semiconductor recording medium 100 to generate the encrypted content key, and writes the encrypted content key through the recording medium access unit 390 to the unprotected memory area 133 of the semiconductor recording medium 100 in the first format. Note that because the unique service key is encrypted by the unique media key and is stored to the semiconductor recording medium 100, the encrypted unique service key and the unique media key must be read and a plain text unique service key calculated. Reading the unique media key and writing to the protected memory area 132 are enabled by mutual authentication of the recording medium access unit 390 and semiconductor recording medium 100.

The first format content writing unit 341 stores the encrypted content to the internal recording medium 380 in the first format.

The recording apparatus 200 for distributed content and the recording apparatus 300 for local content can thus write distributed content and local content to the semiconductor recording medium 100 using the storage method shown in FIG. 5.

1.4 Arrangement and Operation of the Play-Back Apparatus

The arrangement of the play-back apparatus and the play-back sequence are described with reference to FIG. 10 to FIG. 13.

1.4.1 Play-Back Apparatus for Distributed Content

Figure 10:
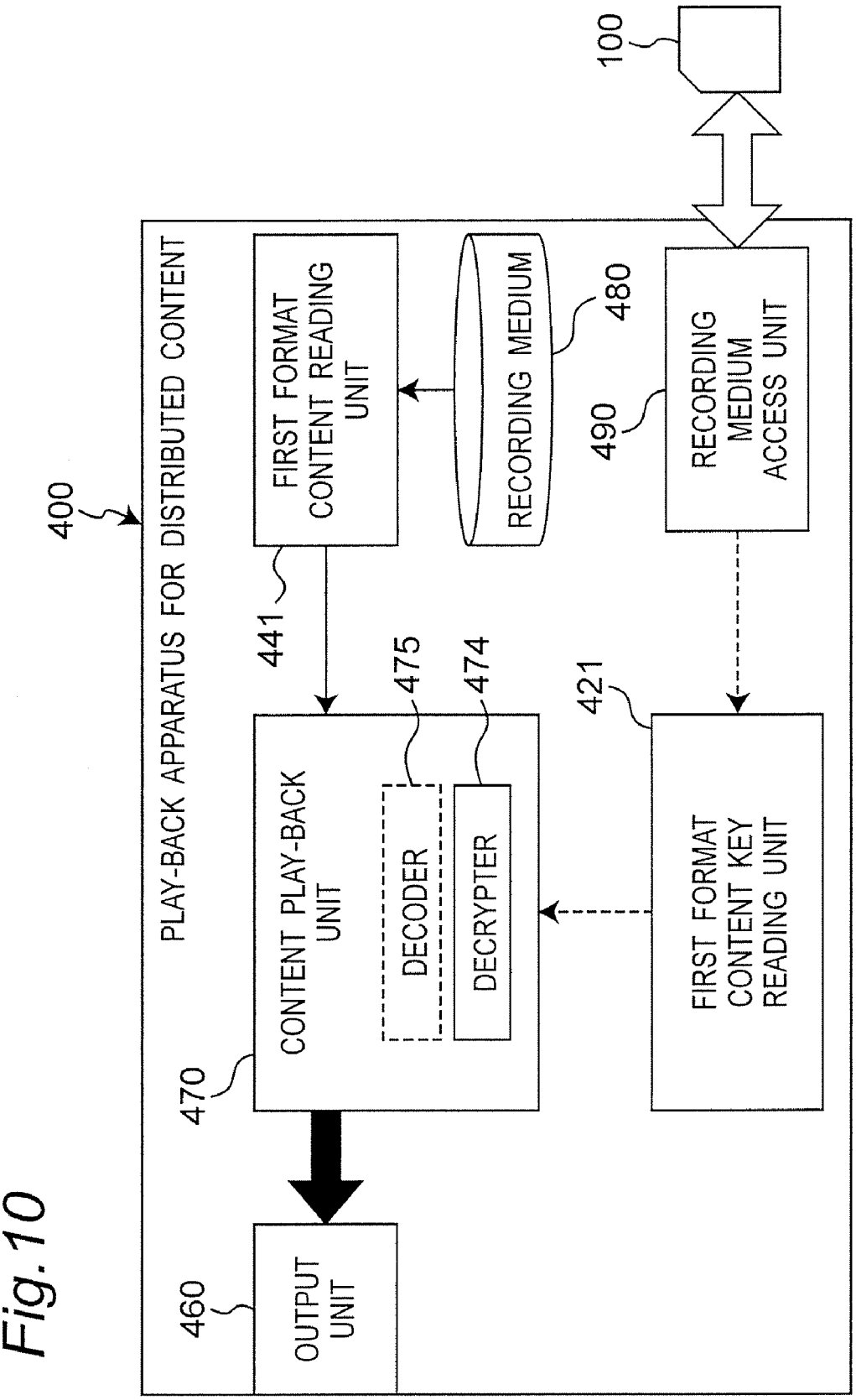
FIG. 10 shows the arrangement of a distributed content play-back apparatus (host device) according to a first embodiment of the invention.

FIG. 10 shows the arrangement of the distributed content play-back apparatus 400. This play-back apparatus 400 can play back content stored in the first format. Solid lines in FIG. 10 denote the flow of content data and broken lines denote the flow of content key data.

The play-back apparatus 400 includes a first format content key reading unit 421, a first format content reading unit 441, an output unit 460, a content play-back unit 470, an internal recording medium 480, and a recording medium access unit 490.

The first format content key reading unit 421 has a function for reading the first format encrypted content key stored to the semiconductor recording medium 100 by means of the recording medium access unit 490, decrypting the key, and passing the plain text content key to the content play-back unit 470.

The first format content reading unit 441 reads the encrypted content stored in the first format to the internal recording medium 480, and passes the encrypted content to the content play-back unit 470.

The output unit 460 outputs the content data played back by the content play-back unit 470. The output unit 460 corresponds to a display if the content data is video data and to a speaker if the content data is audio data, for example, and corresponds to an output terminal such as an AV-OUT terminal if a display or speaker connected externally to the play-back apparatus 400 is used.

The content play-back unit 470 has a decrypter 474 and a decoder 475, and decrypts the encrypted content received from the first format content reading unit 441 using the content key received from the first format content key reading unit 421, expands the decrypted data, and plays back the content.

The decrypter 474 decrypts the encrypted content using the content key. If the content decrypted by the decrypter 474 is compressed, the decoder 475 runs a process to expand and restore the data to the state before data compression. If the content is not compressed, the decoder 475 is not needed.

The internal recording medium 480 is built in to the play-back apparatus 400 and is a recording medium enabling reading and writing desired digital data. This recording medium 480 stores the encrypted content in the first format. The recording medium 480 corresponds to the recording medium 180 in FIG. 3 and FIG. 5.

When a semiconductor recording medium 100 is mounted the recording medium access unit 490 accesses the mounted semiconductor recording medium 100. The recording medium access unit 490 runs the authentication process required to read the unique media key stored in the reserved area 131 of the semiconductor recording medium 100, and to read and/or write desired digital data that is stored in the protected memory area 132.

Figure 11:
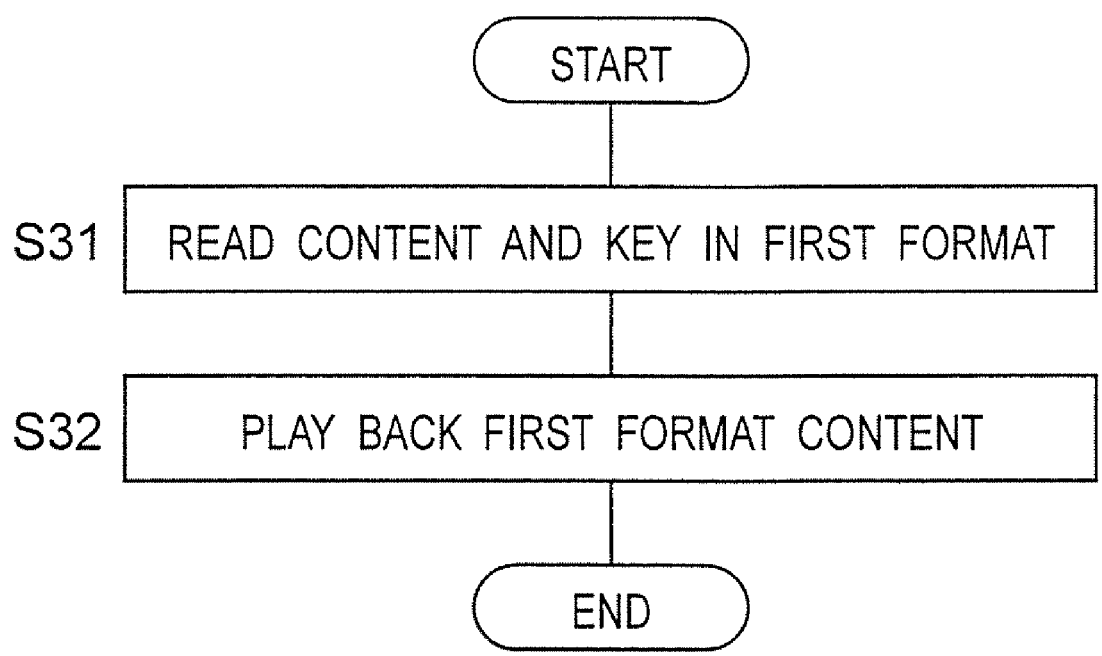
FIG. 11 is a flow chart of the distributed content play-back sequence according to a first embodiment of the invention.

FIG. 11 is a flow chart showing the operating sequence of the play-back apparatus 400 for distributed content in order to play back content stored in the first format to the semiconductor recording medium 100 and internal recording medium 480.

Step S31

The first format content key reading unit 421 first reads the encrypted content key of the first format through the recording medium access unit 490. As shown in FIG. 3, the content key is encrypted by the unique service key in the first format, and the encrypted content key is decrypted using the unique service key to generate a plain text content key. However, because the unique service key is encrypted by the unique media key when stored in the semiconductor recording medium 100, the encrypted unique service key and unique media key must first be read and the plain text unique service key calculated.

The resulting content key is passed to the content play-back unit 470.

Reading the unique media key and reading the encrypted unique service key are enabled by mutual authentication by the recording medium access unit 490 and semiconductor recording medium 100.

The first format content reading unit 441 reads the encrypted content in the first format from the internal recording medium 480, and passes the encrypted content to the content play-back unit 470.

Step S32

The decrypter 474 of the content play-back unit 470 uses the content key acquired from the first format content key reading unit 421 to decrypt the encrypted content acquired from the first format content reading unit 441. The decoder 475 then expands the decrypted content and passes the decoded content to the output unit 460 to complete play-back.

1.4.2 Play-Back Apparatus for Local Content

Figure 12:
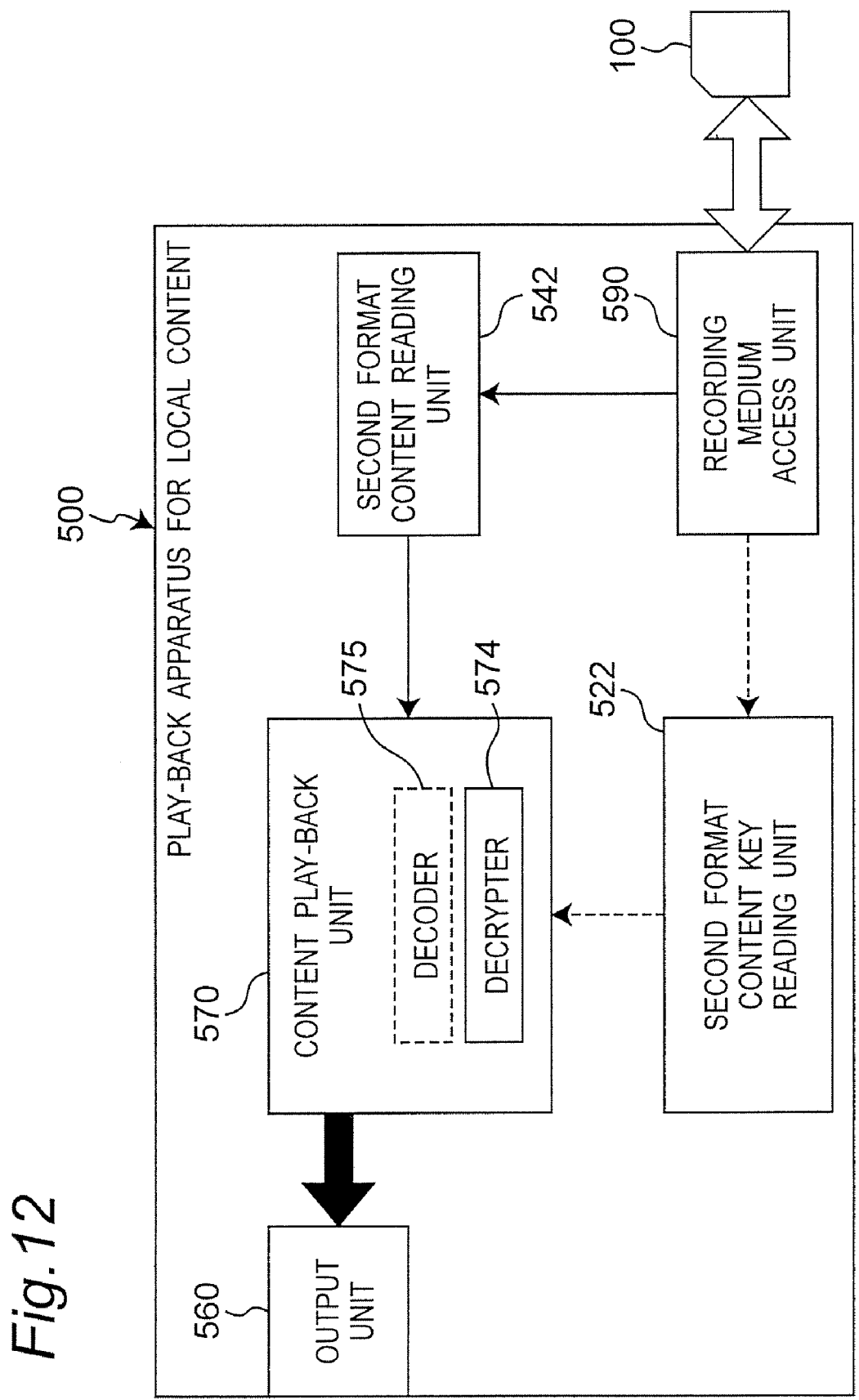
FIG. 12 shows the arrangement of a local content play-back apparatus (host device) according to a first embodiment of the invention.

FIG. 12 shows the arrangement of a play-back apparatus for local content 500. This play-back apparatus 500 can play back content stored in the second format. Solid lines in FIG. 12 denote the flow of content data and broken lines denote the flow of content key data.

The play-back apparatus 500 has a second format content key reading unit 522, a second format content reading unit 542, an output unit 560, a content play-back unit 570, and a recording medium access unit 590.

The second format content key reading unit 522 reads the encrypted content key of the second format stored to the semiconductor recording medium 100 by way of the recording medium access unit 590, decrypts the encrypted content key, and passes the plain text content key to the content play-back unit 570.

The second format content reading unit 542 reads the encrypted content of the second format stored to the semiconductor recording medium 100 through the recording medium access unit 590, and passes the encrypted content to the content play-back unit 570.

The output unit 560 outputs the content data generated by the content play-back unit 570. The output unit 560 corresponds to a display if the content data is video data and to a speaker if the content data is audio data, for example, and corresponds to an output terminal such as an AV-OUT terminal if a display or speaker connected externally to the play-back apparatus 500 is used.

The content play-back unit 570 includes a decrypter 574 and decoder 575, decrypts the encrypted content received from the second format content reading unit 542 using the content key received from the second format content key reading unit 522, expands the data, and plays back the content.

The decrypter 574 runs a process for decrypting the encrypted content using the content key. If the content decrypted by the decrypter 574 is compressed, the decoder 575 expands the data to the state before data compression. The decoder 575 is not needed if the content is not compressed.

If a semiconductor recording medium 100 is mounted, the recording medium access unit 590 runs the authentication process required to access the mounted semiconductor recording medium 100, read the unique media key stored to the reserved area 131, and read and/or write the desired digital data stored in the protected memory area 132.

Figure 13:
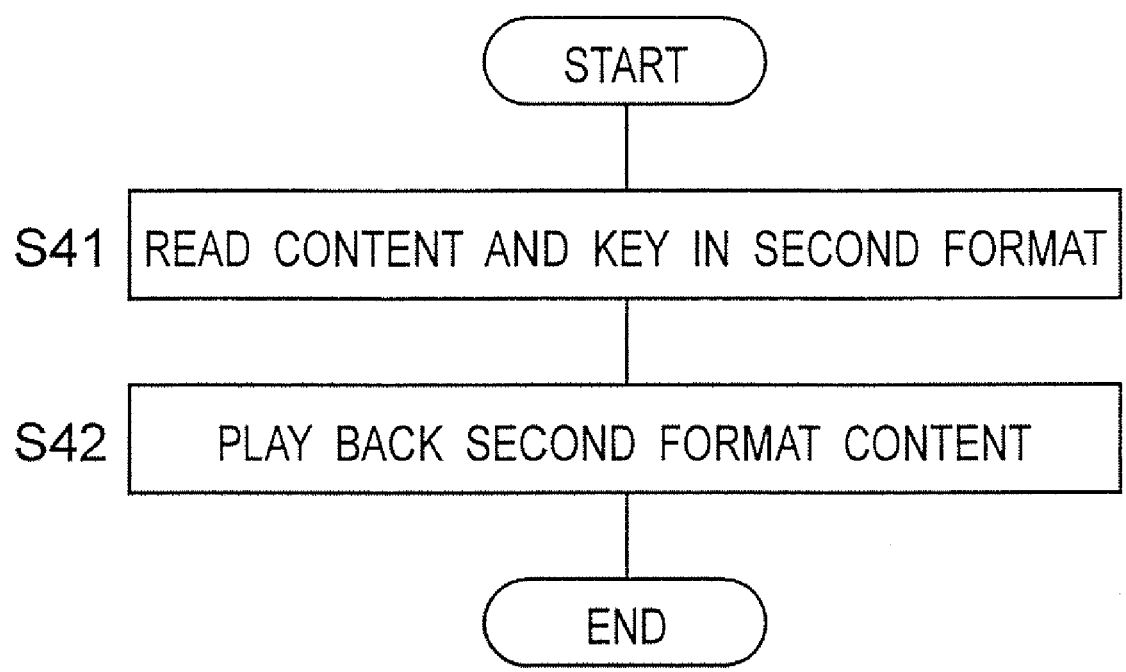
FIG. 13 is a flow chart of the local content play-back sequence according to a first embodiment of the invention.

FIG. 13 is a flow chart describing the operating sequence whereby the local content play-back apparatus 500 plays back content stored in the second format to the semiconductor recording medium 100.

Step S41

The second format content key reading unit 522 first reads the encrypted content key for the second format by means of the recording medium access unit 590. Because the content key of the second format is encrypted using the unique media key as shown in FIG. 4, the unique media key is read through the recording medium access unit 590 and the encrypted content key is decrypted using the unique media key. The resulting content key is then passed to the content play-back unit 570.

Reading the unique media key mutually authenticates the recording medium access unit 590 and semiconductor recording medium 100.

The second format content reading unit 542 then reads the encrypted content of the second format from the semiconductor recording medium 100 by way of the recording medium access unit 590, and passes the encrypted content to the content play-back unit 570.

Step S42

The decrypter 574 of the content play-back unit 570 uses the content key acquired from the second format content key reading unit 522 to decrypt the encrypted content acquired from the second format content reading unit 542. The decoder 575 then expands the decrypted content and passes the decoded content to the output unit 560 to complete play-back.

As described above, content stored to the semiconductor recording medium 100 using the storage method shown in FIG. 5 can be played back either by a play-back apparatus 400 for distributed content or by a play-back apparatus 500 for local content. The user can therefore use the play-back apparatus whether the format of the content stored to the semiconductor recording medium 100 is the first format or the second format, and a significant improvement in ease of use can be expected.

The present invention is particularly effective when used in a semiconductor recording medium that has a copyright protection function and is used to store both distributed content and local content.

The present invention is described above with reference to a preferred embodiment, but the invention is not limited to this embodiment. The embodiment of the invention can be varied in many ways without departing from the scope of the invention. The arrangements described below are also included in the present invention.

Second Embodiment

A second embodiment of the invention is described below with reference to the accompanying figures.

Figure 14:
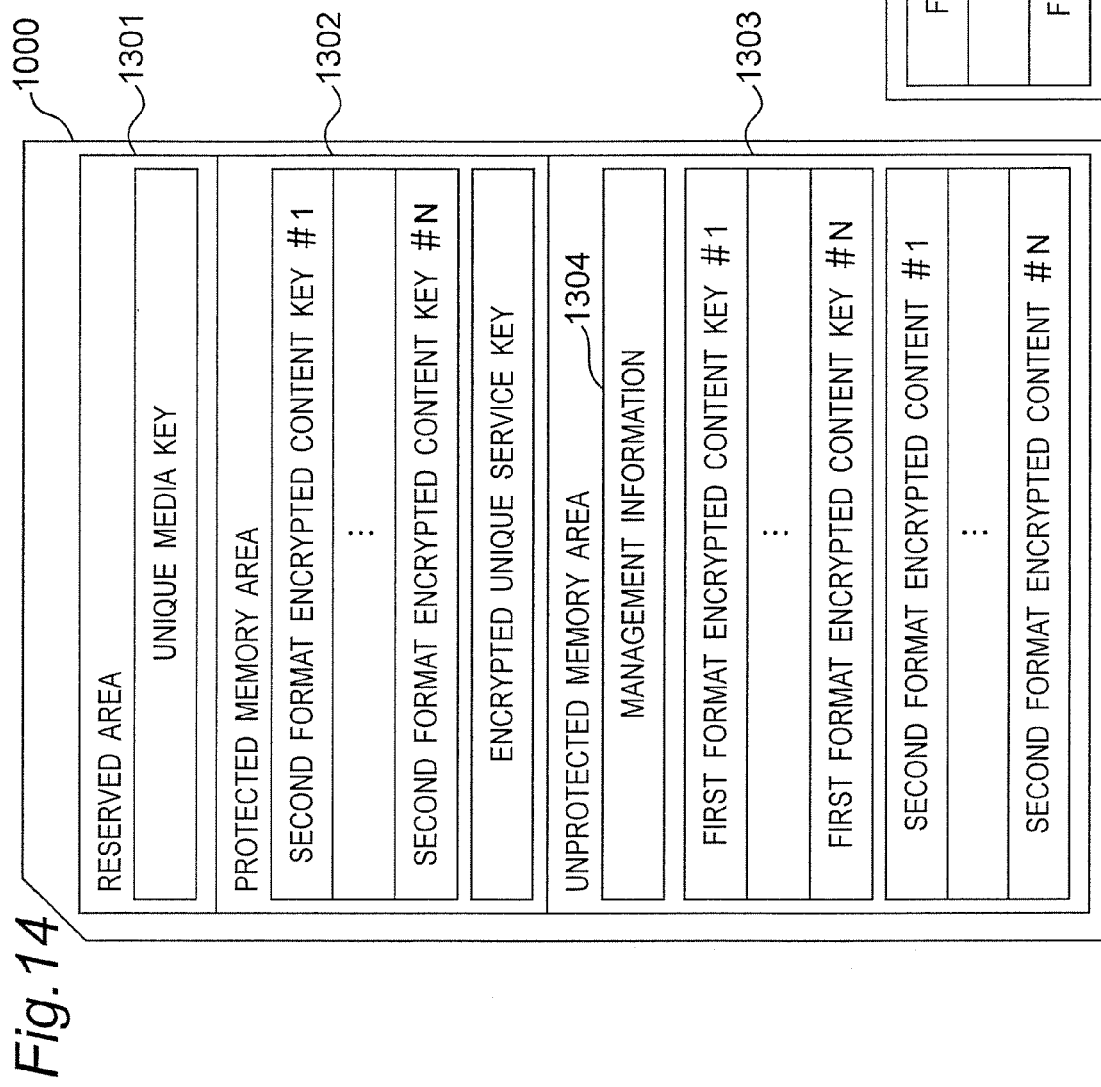
FIG. 14 shows the arrangement of a semiconductor recording medium according to a second embodiment of the invention.

FIG. 14 shows the arrangement of a semiconductor recording medium 1000 according to a second embodiment of the invention.

Figure 15:
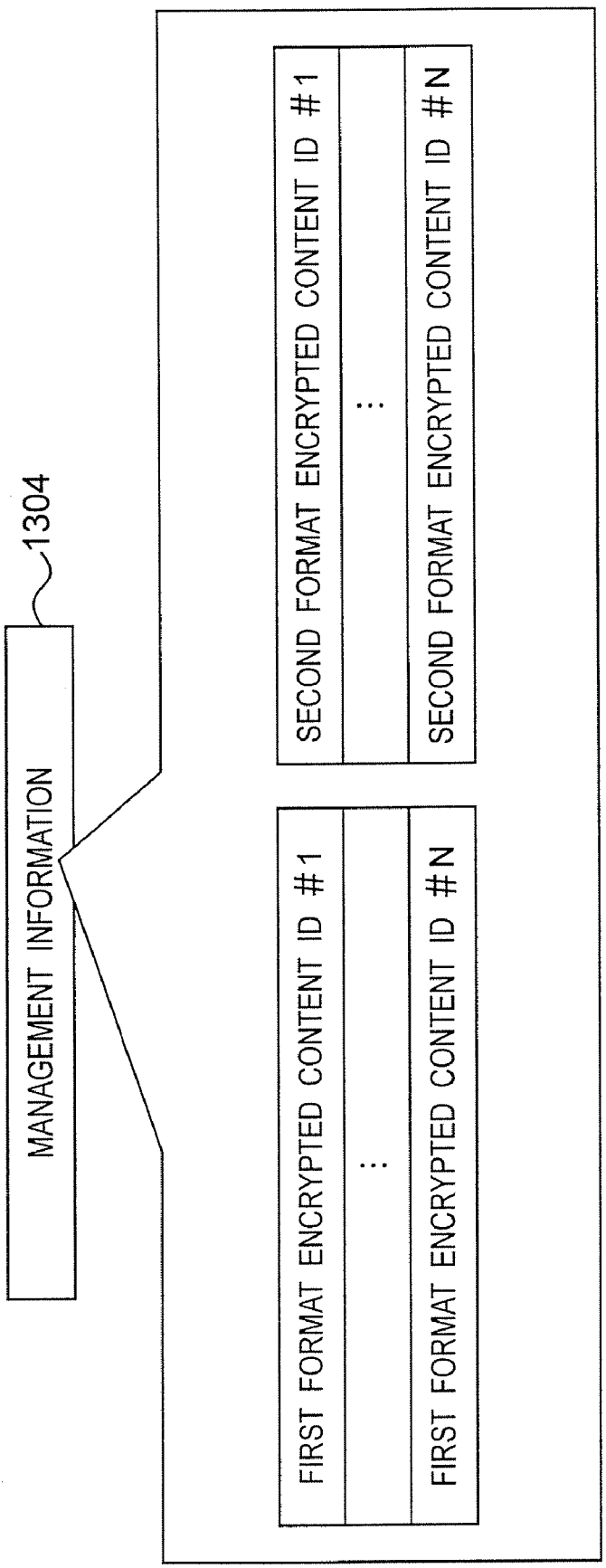
FIG. 15 shows the arrangement of the management information according to the second embodiment of the invention.

What differs from the first embodiment is the inclusion of management information 1304 in the semiconductor recording medium 1000. As shown in FIG. 15, the management information 1304 stores information relating to the ID of each content stream in the first format encrypted content, and information relating to the ID of each content stream in the second format encrypted content. As described in the first embodiment, the semiconductor recording medium 1000 stores the same content as both first format encrypted content and second format encrypted content. The ID of the first format encrypted content and the ID of the second format encrypted content for the same content #1 is therefore the same ID #1 (the same value).

The content ID is, for example, 20 bits long but can be any format insofar as the ID information enables uniquely identifying the content.

The arrangement of this semiconductor recording medium 1000 is otherwise the same as described in the first embodiment.

Figure 16:
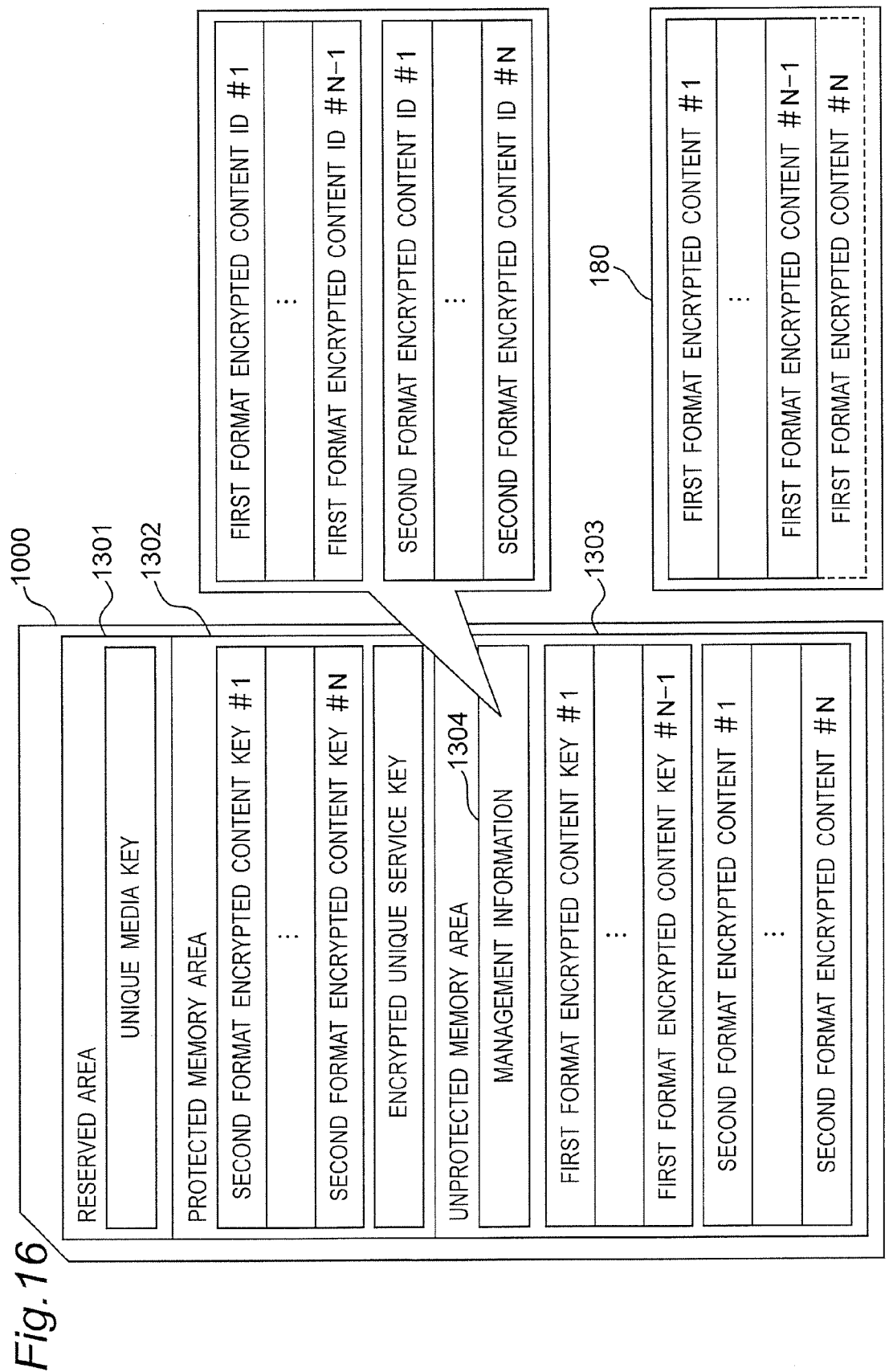
FIG. 16 shows the arrangement of a semiconductor recording medium according to a second embodiment of the invention.

FIG. 16 shows the structure of the semiconductor recording medium according to this embodiment of the invention. FIG. 16 shows the structure when a recording apparatus that is compatible with only the first format removes or unconditionally deletes a portion of first format content from the semiconductor recording medium 1000 shown in FIG. 14.

More specifically, FIG. 16 shows an example in which the N-th unit of content is deleted from the encrypted content of the first format. The group of first format encrypted content keys is composed of encrypted content keys #1 to #(N−1). Information relating to the ID of the N-th unit of content contained in the management information 1304 for the first format encrypted content is also deleted, and the management information relating to the first format encrypted content is composed of entries #1 to #(N−1). Because the separate recording medium 180 may or may not be connected to the recording apparatus, or the data may or may not be intentionally deleted by the user using the recording apparatus, "first format encrypted content #N" recorded to the recording medium 180 is denoted by a broken line.

Figure 17:
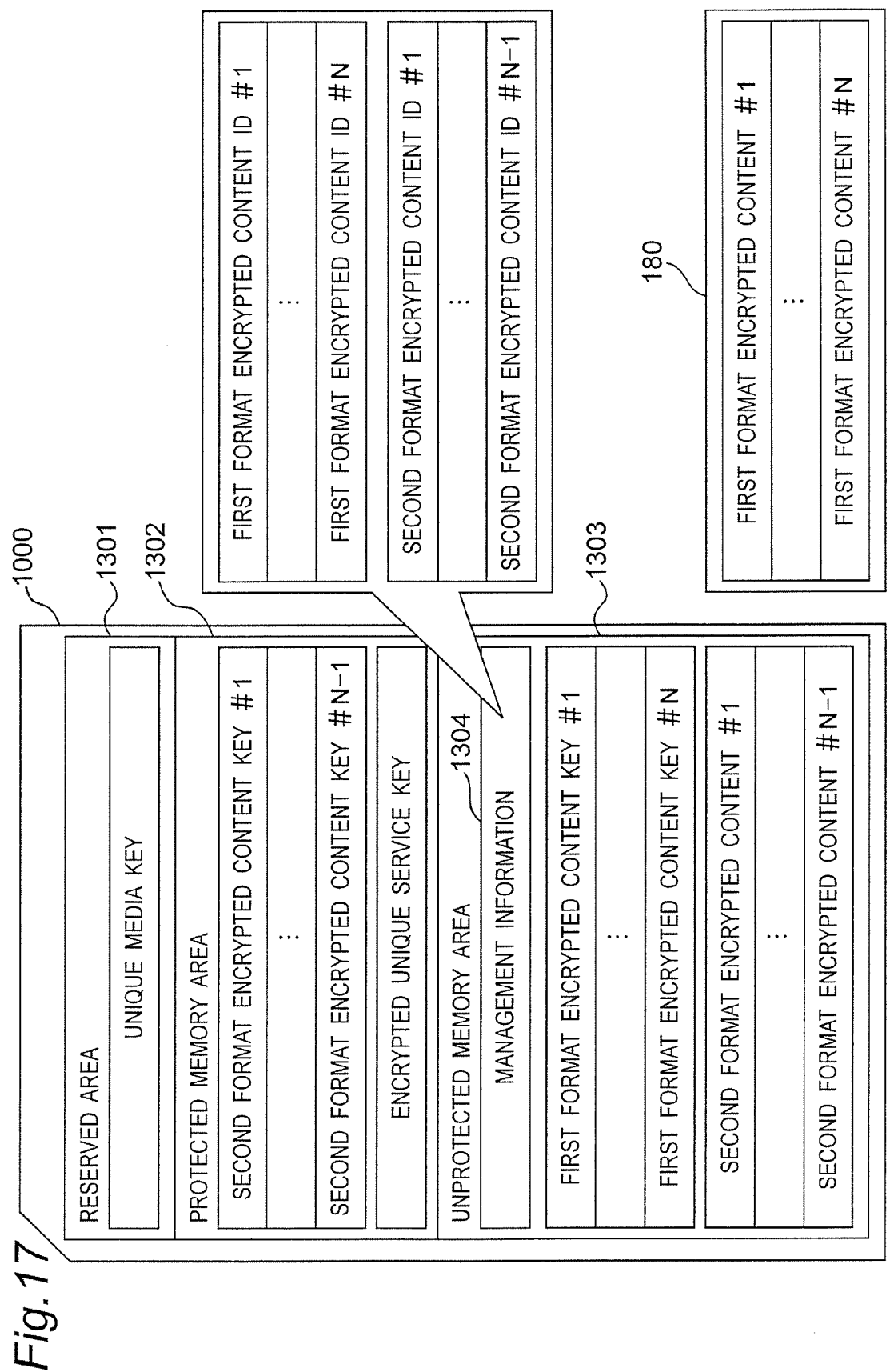
FIG. 17 shows the arrangement of a semiconductor recording medium according to a second embodiment of the invention.

FIG. 17 shows another example of a semiconductor recording medium according to this embodiment of the invention. This figure shows an example in which a recording apparatus that is only compatible with the second format, for example, removes or unconditionally deletes a portion of the second format content from the semiconductor recording medium 1000 shown in FIG. 14.

More specifically, in the example shown in FIG. 17 the N-th encrypted content key and encrypted content are deleted from the encrypted content in the second format. The group of encrypted content keys and the group of encrypted content in the second format contains encrypted content keys and encrypted content range from entry #1 to entry #(N−1). Information relating to the ID of the N-th content entry contained in the management information 1304 for the second format encrypted content is also deleted, and the management information relating to the second format encrypted content ranges from entry #1 to entry #(N−1).

Figure 18:
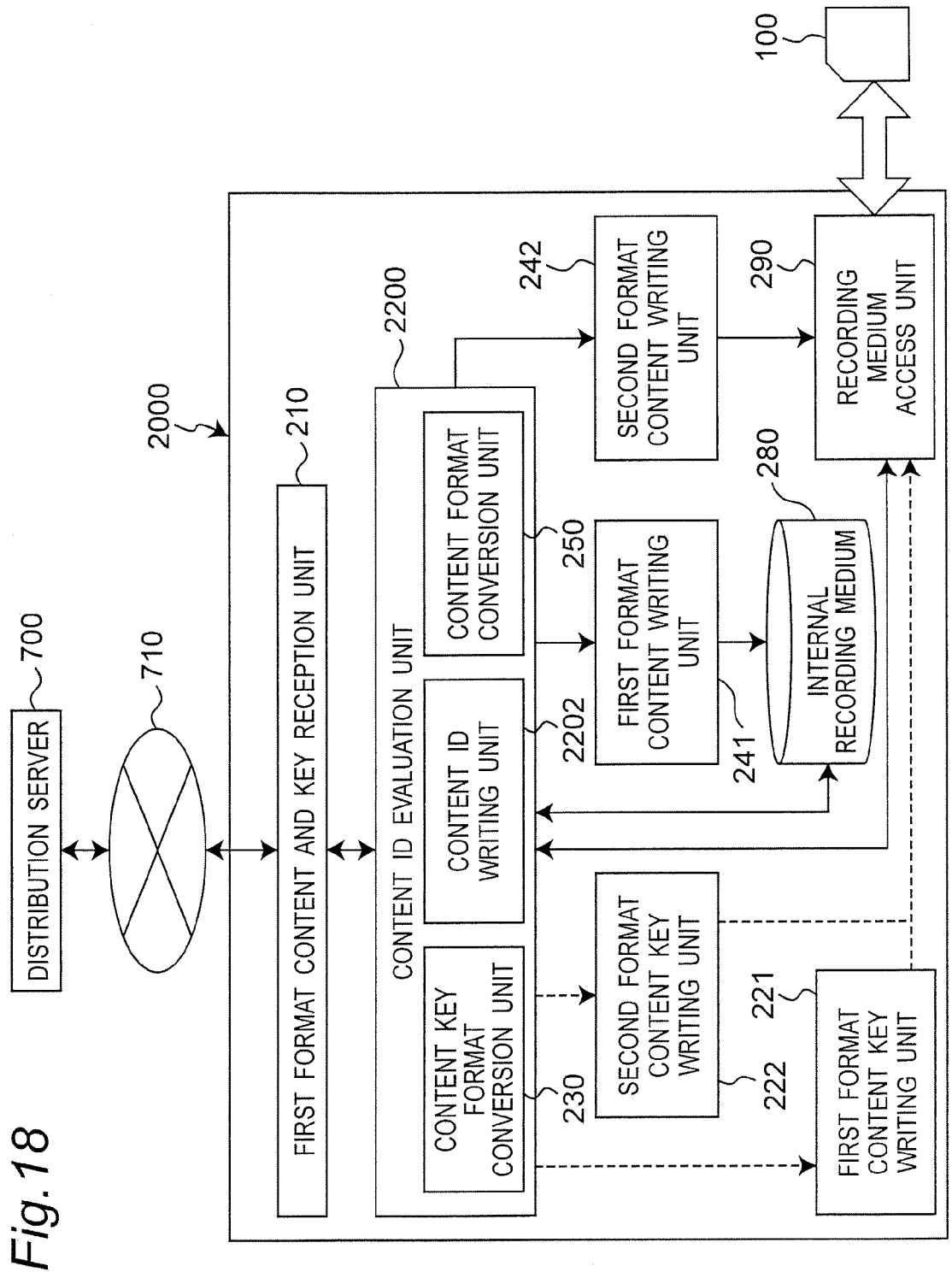
FIG. 18 shows the arrangement of a distributed content recording apparatus according to a second embodiment of the invention.

FIG. 18 shows the arrangement of the recording apparatus for distributed content in this embodiment of the invention. What differs from the first embodiment is the addition of a content ID evaluation unit 2200 and the addition of a content ID writing unit 2202. The content ID evaluation unit 2200 includes a content key format conversion unit 230, content ID writing unit 2202, and content format conversion unit 250.

In addition to the function described in the first embodiment, the content key format conversion unit 230 has a function for converting second format encrypted content keys to first format encrypted content keys.

The content ID writing unit 2202 stores the content ID to the semiconductor recording medium 100.

In addition to the function described in the first embodiment, the content format conversion unit 250 has a function for converting second format encrypted content to first format encrypted content.

The content ID evaluation unit 2200 has a function for evaluating the content IDs of the first format encrypted content and the content IDs of the second format encrypted content contained in the management information stored to the semiconductor recording medium 100. The content ID evaluation unit 2200 also has a function for controlling the first format content and key reception unit 210, the first format content key writing unit 221, the second format content key writing unit 222, the first format content writing unit 241, the second format content writing unit 242, the internal recording medium 280, and the recording medium access unit 290.

Other aspects of the arrangement and function of this embodiment are the same as the arrangement of the recording apparatus for distributed content described in the first embodiment.

Figure 19:
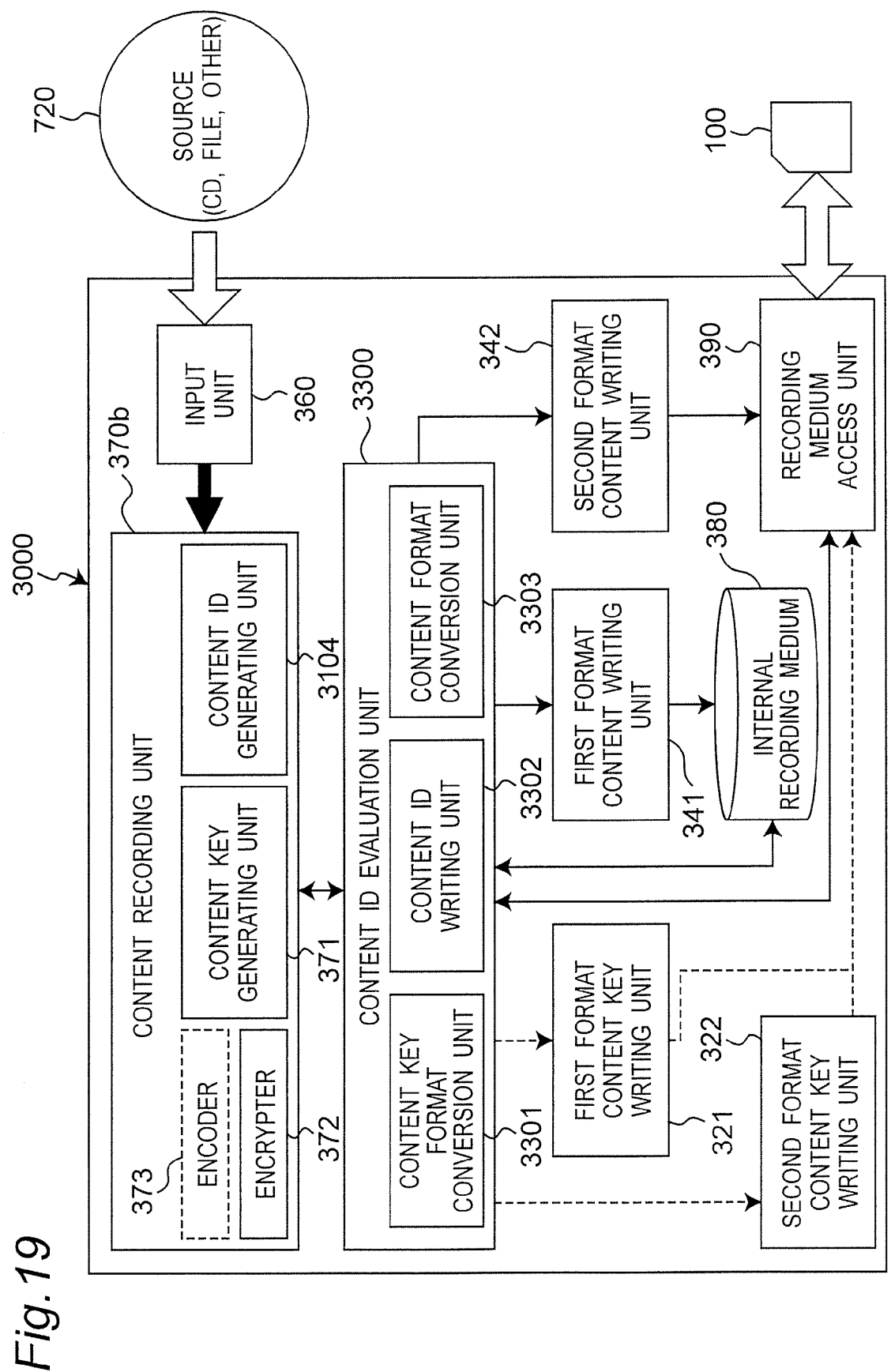
FIG. 19 shows the arrangement of a local content recording apparatus according to a second embodiment of the invention.

FIG. 19 shows the arrangement of a recording apparatus for local content according to this embodiment of the invention.

What differs from the first embodiment is that the content recording unit 370b has a content ID generating unit 3104, and a content ID evaluation unit 3300 is added. In addition, the function of the first format content key writing unit 321, the second format content key writing unit 322, the first format content writing unit 341, and the second format content writing unit 342 differ from the functions described in the first embodiment.

The content ID generating unit 3104 generates content IDs enabling uniquely identifying content stored to the semiconductor recording medium 100.

The content ID evaluation unit 3300 has a content key format conversion unit 3301, a content ID writing unit 3302, and a content format conversion unit 3303.

The content key format conversion unit 3301 has a function for converting first format content keys to second format content keys, and a function for converting second format content keys to first format content keys.

The content ID writing unit 3302 writes the content IDs to the semiconductor recording medium.

The content format conversion unit 3303 has a function for converting first format encrypted content to second format encrypted content, and a function for converting second format encrypted content to first format encrypted content.

The content ID evaluation unit 3300 has a function for evaluating the content IDs of the first format encrypted content and the content IDs of the second format encrypted content contained in the management information 1304 stored in the semiconductor recording medium 100. The content ID evaluation unit 3300 also has a function for controlling the second format content writing unit 342, the second format content key writing unit 322, the first format content writing unit 341, the first format content key writing unit 321, the internal recording medium 380, and the recording medium access unit 390.

The first format content key writing unit 321 writes first format content keys to the semiconductor recording medium 100 by way of the recording medium access unit 390 as controlled by the content ID evaluation unit 3300.

The second format content key writing unit 322 writes second format content keys to the semiconductor recording medium 100 by way of the recording medium access unit 390 as controlled by the content ID evaluation unit 3300.

The first format content writing unit 341 writes first format content to the internal recording medium 380 as controlled by the content ID evaluation unit 3300.

The second format content writing unit 342 writes second format content to the semiconductor recording medium 100 through the recording medium access unit 390 as controlled by the content ID evaluation unit 3300.

Other aspects of the arrangement and function of this embodiment are the same as the local content recording apparatus described in the first embodiment. The play-back apparatus is also the same as in the first embodiment.

The content recording process for writing to the semiconductor recording medium from the recording apparatus according to this embodiment of the invention is described next. In this content recording process the recording apparatus manages recording based on the content IDs stored to the semiconductor recording medium.

Figure 20:
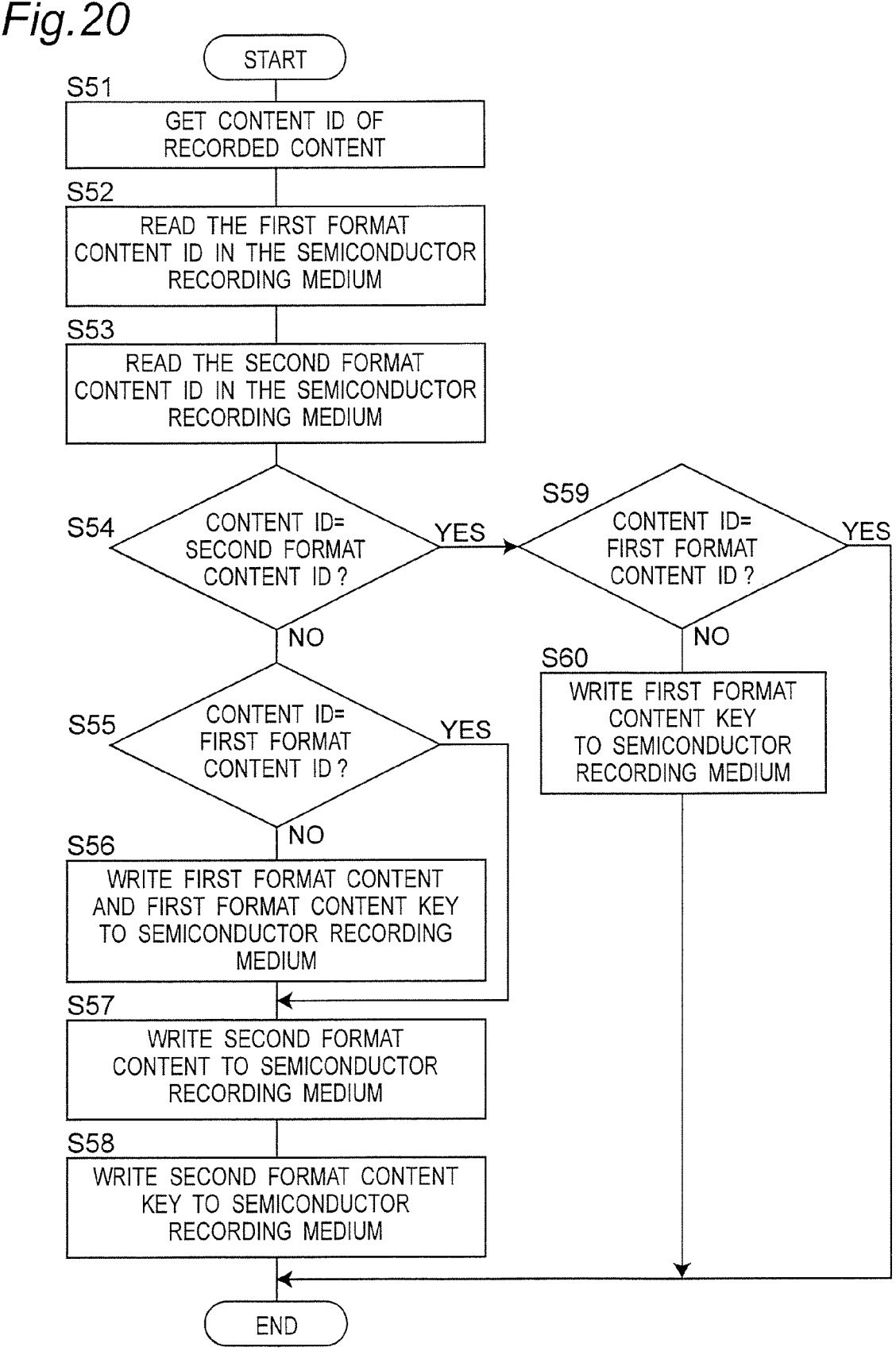
FIG. 20 is a flow chart of the recording sequence of a recording apparatus according to a second embodiment of the invention.

Referring first to FIG. 20, the process whereby the recording apparatus 2000 or 3000 shown in FIG. 18 and FIG. 19 records content to a semiconductor recording medium to which content encrypted in a first format and content encrypted in a second format is stored similarly to the semiconductor recording medium 100 shown in FIG. 14 is described below.

Step S51

As an initialization step the content ID evaluation unit gets the content IDs recorded to the semiconductor recording medium 100. In this example the content to be recorded to the semiconductor recording medium 100 is uniquely defined in the recording apparatus by the user, for example. More particularly, the content to be recorded to the semiconductor recording medium 100 by the recording apparatus is any single content stream stored on the semiconductor recording medium 100 and has a content ID that is the same as the ID of any first format content or the ID of any second format content already stored on the semiconductor recording medium 100.

Step S52

Next, the content ID evaluation unit retrieves a list of IDs of all first format content from the semiconductor recording medium 100 by way of the recording medium access unit.

Step S53

Next, the content ID evaluation unit retrieves a list of IDs of all second format content from the semiconductor recording medium 100 by way of the recording medium access unit.

Steps S54, S59

The content ID evaluation unit compares the ID of the content to be recorded with the ID list of second format content acquired from the semiconductor recording medium 100. Because the ID of the content to be recorded matches at least one ID in the list in this example, step S59 also executes.

In step S59 the ID of the content to be recorded is compared with the ID list of first format content acquired from the semiconductor recording medium 100. Because this comparison determines that the same content ID is already stored in the semiconductor recording medium 100, the process ends without recording new content.

This process enables the recording apparatus for distributed content and the recording apparatus for local content to eliminate storing to the semiconductor recording medium 1000 content that is the same as content already stored on the semiconductor recording medium 1000, and can thus reduce consumption of available recording capacity.

Although not shown in the figures, steps S54 and S59 could ask the user through the user interface of the recording apparatus 2000, 3000 whether to write duplicate content to the semiconductor recording medium 100, and could write content duplicating existing content on the semiconductor recording medium 100 as directed by the user.

Referring to FIG. 20, an example of a process whereby the recording apparatus 2000, 3000 records content to a semiconductor recording medium 100 as shown in FIG. 16 after the ID of the N-th encrypted content key and encrypted content has been deleted from the group of content encrypted in the first format is described next.

Steps S51 to S53 execute as described above. In this example, however, the content that is to be recorded and is stored in the recording apparatus by the user, for example, is identical to the plain text content acquired by decrypting second format encrypted content #N that is stored in the semiconductor recording medium 100, and the content ID is the same value as the ID #N of the second format encrypted content.

Step S54

The content ID evaluation unit compares the ID of the content to be recorded with the ID list of all second format content acquired from the semiconductor recording medium 100. Because content identical to the N-th second format content is to be recorded, the ID of the content to be recorded matches at least one second format content ID, and step S59 therefore executes.

Step S59

The content ID evaluation unit determines if the ID of the content to be recorded matches an ID in the ID list of all first format encrypted content acquired from the semiconductor recording medium 100. Because a matching ID is not found in the ID list of first format content, step S60 executes.

Step S60

The content key format conversion unit of the content ID evaluation unit generates and stores a first format content key to the semiconductor recording medium 100. This conversion process includes a first part of generating a plain text content key from the encrypted content key stored in the second format, and a second part of generating an encrypted content key for storing in the first format from the plain text content key.

Because the encrypted content key is encrypted using unique media key in the second format, the first part reads the encrypted content key and unique media key from the semiconductor recording medium 100 by way of the recording medium access unit, decrypts the encrypted content key using the unique media key, and generates a plain text content key.

Because the encrypted content key is encrypted using the unique service key in the first format, the second part reads the encrypted unique service key from the semiconductor recording medium 100 through the recording medium access unit, and encrypts the plain text content key generated in the first part. However, because the encrypted unique service key is also encrypted by the unique media key, the encrypted unique service key must be decrypted with the unique media key and a plain text unique service key must be calculated.

This process results in an encrypted content key of the first format.

More specifically, in the recording apparatus 2000 shown in FIG. 18, the content key format conversion unit 230 of the content ID evaluation unit 2200 converts the second format encrypted content key to a first format encrypted content key, which is then written by the first format content key writing unit 221 to the semiconductor recording medium 100.

Note that reading the encrypted service key and reading the second format encrypted content key is enabled by mutual authentication by the recording medium access unit 290 and the semiconductor recording medium 100.

The content ID writing unit 2202 also writes an ID to the content for the first format encrypted content. The content ID evaluation unit 2200 also acquires the second format encrypted content as required, the content format conversion unit 250 converts the second format encrypted content to first format encrypted content, and the first format content writing unit 241 writes the first format encrypted content to the internal recording medium 280.

In the local content recording apparatus 3000 shown in FIG. 19, the content key format conversion unit 3301 of the content ID evaluation unit 3300 converts the second format encrypted content key to a first format encrypted content key, and the first format content key writing unit 321 writes the first format encrypted content key to the semiconductor recording medium 100.

Note that reading the encrypted service key and reading the second format encrypted content key is enabled by mutual authentication by the recording medium access unit 390 and the semiconductor recording medium 100.

The content ID writing unit 3302 also writes an ID to the content for the first format encrypted content. In addition, the content format conversion unit 3303 acquires and converts the second format encrypted content to first format encrypted content as needed, and the first format content writing unit 341 writes the first format encrypted content to the internal recording medium 380.

These steps result in the first format content key and as needed the encrypted content being written to the semiconductor recording medium.

Referring to FIG. 20, an example of a process whereby the recording apparatus 2000, 3000 records content to a semiconductor recording medium 100 as shown in FIG. 17 after the ID of the N-th encrypted content key and encrypted content has been deleted from the group of content encrypted in the second format is described next.

Steps S51 to S53

These steps are as described above. This example assumes that the ID of the content that is to be recorded and is stored in the recording apparatus by the user, for example, is the same value as the content ID for first format content of ID #N.

Step S54

The content ID evaluation unit compares the ID of the content to be recorded with the ID list of all second format content acquired from the semiconductor recording medium 100. Because content identical to the N-th first format content is to be recorded, there is no matching second format content ID and step S55 therefore executes.

Step S55

The content ID evaluation unit then compares and determines if the ID of the content to be recorded matches an ID in the ID list of all first format content acquired from the semiconductor recording medium 100. Because there is at least one matching first format content ID, step S57 executes.

Steps S57, S58

The content ID evaluation unit converts the first format encrypted content to second format encrypted content and writes to semiconductor recording medium 100. The content conversion process in this case does not need to re-encrypt the content, and simply converts the content format. A second format encrypted content key is also generated from the first format encrypted content key and written to semiconductor recording medium 100. This conversion process includes a first part of generating a plain text content key from the encrypted content key stored in the first format, and a second part of generating an encrypted content key for writing in the second format from the plain text content key.

Because the encrypted content key is encrypted by the service key in the first format, in the first part of this process the encrypted content key and encrypted service key are read from the semiconductor recording medium 100 by the recording medium access unit and decrypted with the encrypted service key to generate a plain text content key. However, because the encrypted service key is encrypted using the unique media key, the encrypted service key must be decrypted using the unique media key and a plain text unique service key must be calculated.

Because the encrypted content key is encrypted by the unique media key in the second format, the second part of the process reads the unique media key from the semiconductor recording medium 100 by means of the recording medium access unit and encrypts the plain text content key generated in the first part of the process.

This process generates an encrypted content key of the second format.

More specifically, in the recording apparatus 2000 for distributed content shown in FIG. 18 the content key format conversion unit 230 of the content ID evaluation unit 2200 converts an encrypted content key of the first format to content key of the second format, and writes the content key of the second format to the semiconductor recording medium 100 by means of the second format content key writing unit 222.

Note that reading the encrypted unique service key and writing the second format encryption key are enabled by mutual authentication by the recording medium access unit 290 and the semiconductor recording medium 100.

Furthermore, the content format conversion unit 250 reads and converts encrypted content of the first format to the second content format, and writes the encrypted content through the second format content writing unit 242 to the semiconductor recording medium 100. The content can be decrypted and re-encrypted as may be needed in this case.

The content ID writing unit 2202 also writes an ID to the content for the second format encrypted content.

In the local content recording apparatus 3000 shown in FIG. 19 the content key format conversion unit 3301 of the content ID evaluation unit 3300 converts the first format encrypted content key to a second format content key and writes the second format content key to the semiconductor recording medium 100 by means of the second format content key writing unit 322.

Reading the encrypted unique service key and writing the second format encryption key are enabled by mutual authentication by the recording medium access unit 390 and the semiconductor recording medium 100.

The content format conversion unit 3303 reads and converts first format content to the second content format, and writes the encrypted content to the semiconductor recording medium 100 by means of the second format content writing unit 342. The content can be decrypted and re-encrypted as necessary.

The content ID writing unit 3302 also writes an ID to the content for the second format encrypted content.

These steps enable writing a content key of the second format and the encrypted content to the semiconductor recording medium.

An example of the process whereby the recording apparatus 2000, 3000 records content with a content ID that does not match any content of the first format or the second format is described next with reference to FIG. 20.

Steps S51 to S54

Steps S51 to S54 execute as described above. In this example, however, the ID of the content that is to be recorded and is stored in the recording apparatus by the user, for example, does not match the ID of content stored to the semiconductor recording medium 100.

Step S55

The content ID evaluation unit compares the content ID of the content to be recorded with the ID list of all first format content acquired from the semiconductor recording medium 100. Because the ID of the content to be recorded does not match a content ID stored in the semiconductor recording medium 100, step S56 executes.

Steps S56, S57, S58

Because the first format content ID and second format content ID do not match, the content ID evaluation unit of the recording apparatus writes the first format encrypted content and the first format content key, and the second format encrypted content and the second format content key, to the semiconductor recording medium 100. The steps of this operation are the same as the method described in the first embodiment whereby the distributed content recording apparatus and local content recording apparatus write to the semiconductor recording medium.

More particularly in this case, the content ID writing unit of the content ID evaluation unit of the recording apparatus also writes the content ID to the semiconductor recording medium.

When the recording apparatus writes an encrypted content key and encrypted content to a semiconductor recording medium for storing content in a first format and a second format as shown in FIG. 14, FIG. 16, and FIG. 17, this writing process enables preventing writing duplicate content, thus increases the available storage capacity of the semiconductor recording medium, and greatly improves ease of use.

The present invention is particularly useful in a semiconductor recording medium having a copyright protection function that is used to store both distributed content and local content.

The present invention is described above with reference to a preferred embodiment, but the invention is not limited to this embodiment. The embodiment of the invention can be varied in many ways without departing from the scope of the invention. The arrangements described below are also included in the present invention.

(1) A semiconductor recording medium is described in the foregoing embodiments, but the same arrangement can be applied to any recording medium having a copyright protection function and a storage area such as the foregoing protected memory area that can be accessed by mutual authentication by the host device and the recording medium. The present invention is therefore also effective with recording media other than semiconductor recording media.

(2) The FAT file system is used for the search information storage area in the foregoing first and second embodiments of the invention, but a different file system, such as FAT32 or UDF, can be used. Alternatively, a file system can be omitted with content managed by size and recording address.

(3) In the foregoing embodiments content keys of the first format are stored to the unprotected memory area 133 and content keys of the second format are stored to the protected memory area 132, but the invention is not so limited. The content keys can be stored anywhere regardless of format.

Where the encrypted content is stored is also described by way of example only above, and the invention is not so limited. For example, encrypted content of the first format can be stored to the unprotected memory area 133 of the semiconductor recording medium 100.

(4) Furthermore, the key for encrypting content keys of the first format is the unique service key and the key for encrypting content keys of the second format is the unique media key in the foregoing embodiments, but the invention is not so limited. How the content keys are stored is not format dependent and can be freely determined. For example, if security is assured plain text content keys can be stored without encryption.

(5) The foregoing embodiments are described using the first format primarily for distributed content and the second format primarily for local content, but the usable formats are not limited to these two. The invention can be used with two or more formats regardless of the application.

(6) The distributed content recording apparatus 2000 and the local content recording apparatus 3000 are described in the foregoing embodiments as having an internal recording medium 280 but the internal recording media can be removable. A DVD-RAM or other type of optical disc can be used, for example.

(7) Distributed content of the first format is described as being acquired from a distribution server over a network in the foregoing embodiments, but the distributed content of the first format can be distributed pre-recorded to recording media such as CD-ROM or DVD-ROM.

In this case the first format content and key reception unit 210 of the distributed content recording apparatus 2000 shown in FIG. 18 acquires the content and content key from a recording medium to which the first format distributed content is stored instead of over a network, and operation is otherwise as described above.

(8) The foregoing embodiments are described as checking whether the same first format content or second format content is already stored on the semiconductor recording medium based on IDs that are uniquely assigned to the content, but where the content IDs are stored and the ID values can be any means enabling the recording apparatus to uniquely identify the content to be recorded and the content that is already stored on the recording medium. For example, if the value of the content key enables the recording apparatus to uniquely identify content, the key value can be used. Furthermore, the IDs of first format content and the IDs of second format content can be different insofar as the content can be differentiated by the recording apparatus. Yet further, the content IDs stored to the recording medium can be the IDs for only first format content or only second format content.

(9) The order in which content and content keys are written is not limited to the order described in the foregoing embodiments.

Third Embodiment

This embodiment of the invention describes the specific arrangement and operation of a number of content key format conversion units 230 for converting encrypted content keys from a first format (the format used for content distribution) to a second format (the format used for local content) in the recording apparatuses described in the foregoing embodiments.

In order to convert the encrypted content key, the encrypted content key must first be read, the format changed, and the key must then be written again, and the likelihood of a security hole being exploited during this process is high. If the system is implemented in software, for example, technology for making the part required security tamper-proof is required, and because tamper-proofing incurs an increase in processing overhead and the size of the software, the modules where security is required must be made smaller. A method for safely and easily converting encrypted content keys is taught below. More specifically, this embodiment of the invention provides technology for avoiding the security holes that occur easily during encrypted content key conversion and enabling safely and easily converting encryption keys.

3.1 Example 1

Figure 21:
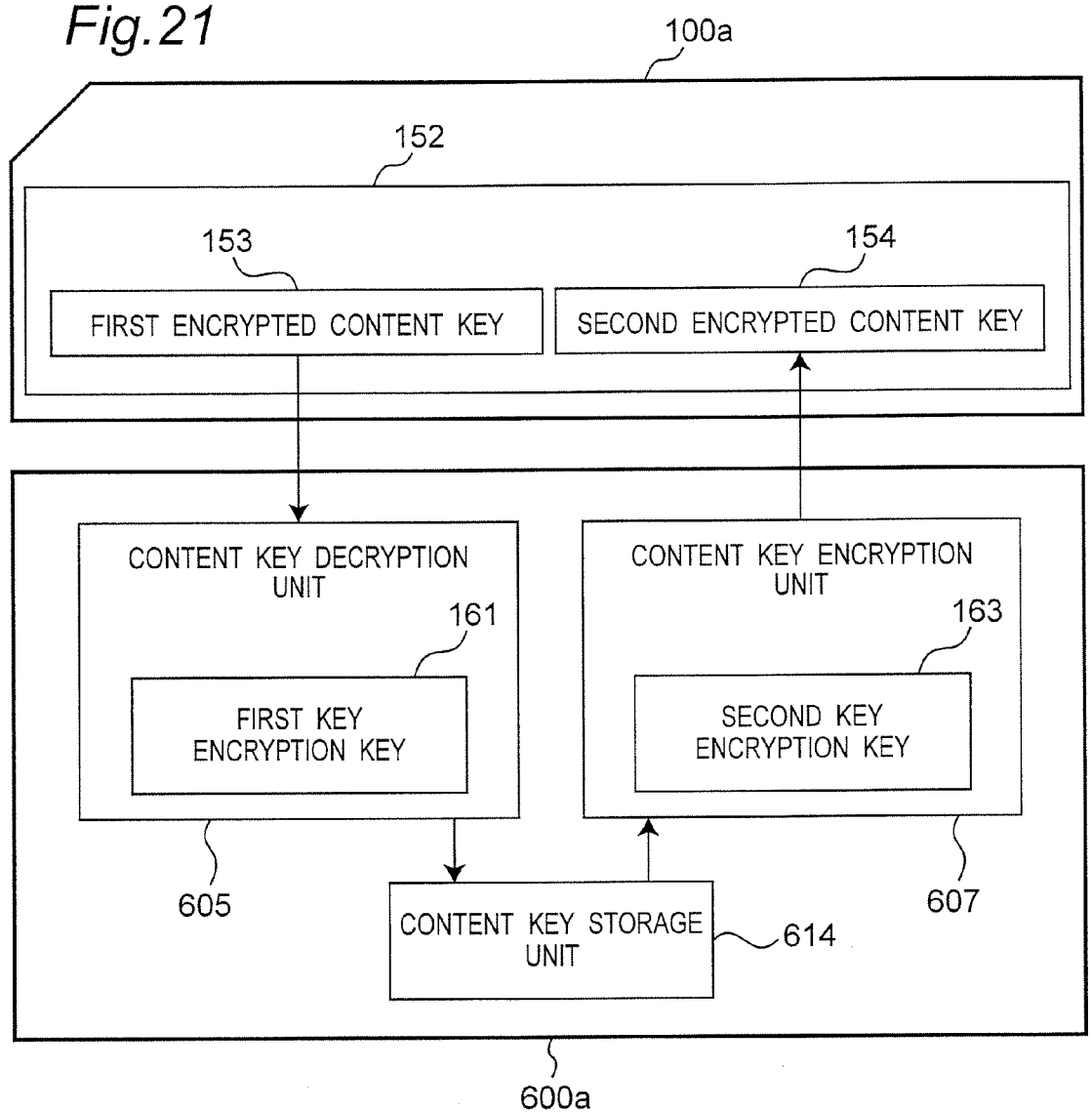
FIG. 21 shows the arrangement of a first recording apparatus and recording medium according to a third embodiment of the invention.

FIG. 21 shows the arrangement of a first recording apparatus and recording medium according to this embodiment of the invention.

The recording apparatus 600a reads the encrypted content key from a recording medium 100a storing content and an encrypted content key, encrypts the key in a different format, and then stores the key again.

The recording medium 100a has an encrypted content key storage unit 152 for storing a first encrypted content key 153 and a second encrypted content key 154.

The recording apparatus 600a has a content key decryption unit 605 for decrypting the encrypted content key, a content key storage unit 614 for temporarily storing the encrypted content key, and a content key encryption unit 607 for encrypting the content key. The content key decryption unit 605 stores the first key encryption key 161 for decrypting the encrypted content key. The content key encryption unit 607 stores a second key encryption key 163 for encrypting a plain text content key.

Figure 22:
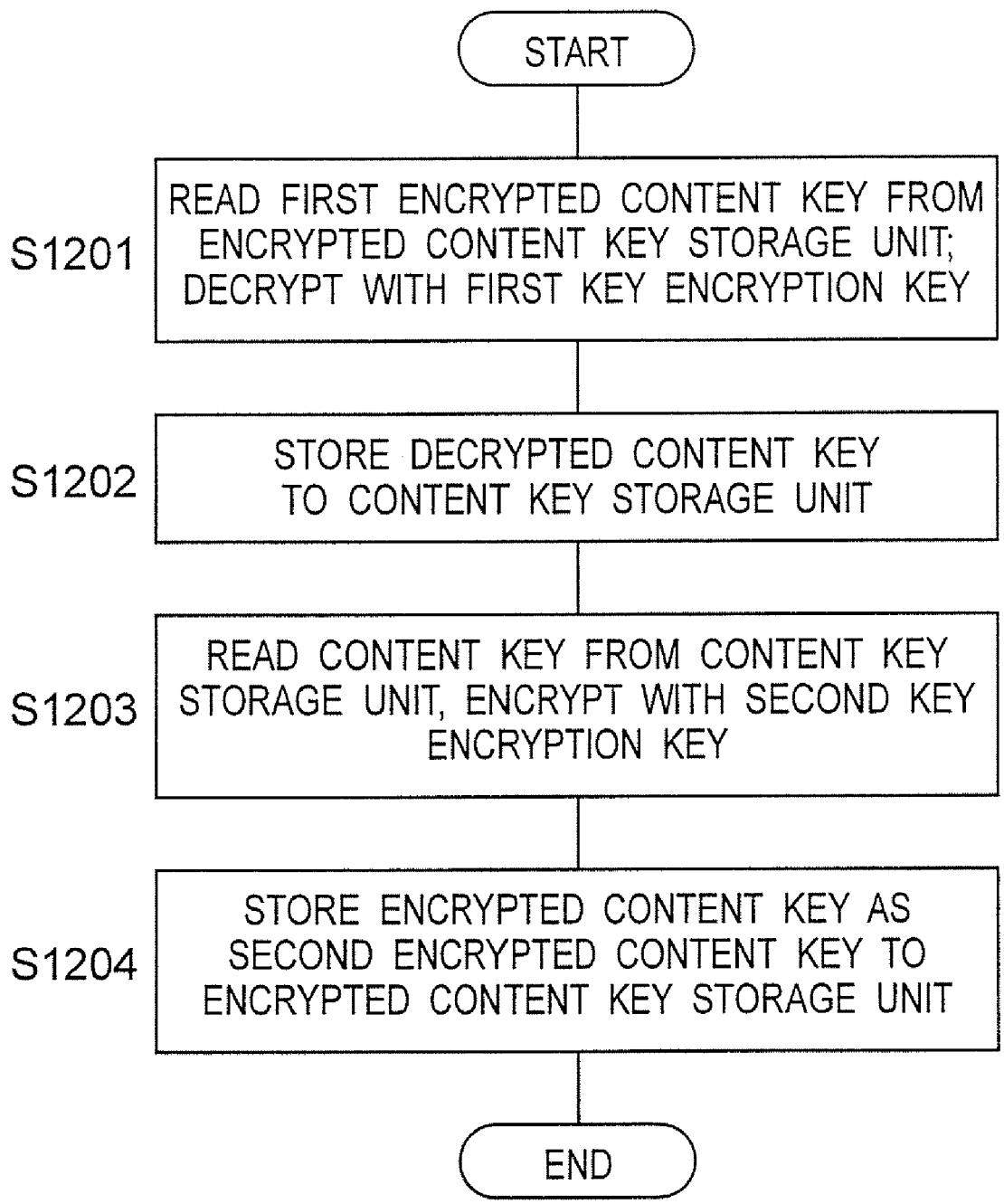
FIG. 22 is a flow chart of the content key conversion process of the first recording apparatus and recording medium according to the third embodiment of the invention.

The process of converting an encrypted content key is described next with reference to the flow chart in FIG. 22.

Step S1201

The content key decryption unit 605 reads the first encrypted content key 153 stored in the encrypted content key storage unit 152 and decrypts the first encrypted content key 153 with the first key encryption key 161 stored in the content key decryption unit 605.

Step S1202

The decrypted content key (plain text content key) is stored in the content key storage unit 614.

Steps S1203, S1204

The content key encryption unit 607 gets the decrypted content key from the content key storage unit 614, encrypts the content key with the second key encryption key 163 stored in the content key encryption unit 607, and stores the encrypted content key as the second encrypted content key 154 to the encrypted content key storage unit 152 of the recording medium 100a.

An encrypted content key of the first format can thus be converted to an encrypted content key of the second format.

Note that in this and the embodiments described below the content key storage unit 614 is provided separately from the content key decryption unit 605 and the content key encryption unit 607, but could be combined with these units. For example, the content key storage unit 614 can be included in either the content key decryption unit 605 or the content key encryption unit 607. Alternatively, the content key decryption unit 605, content key encryption unit 607, and content key storage unit 614 can be integrated in a single unit.

The first key encryption key 161 is stored in the content key decryption unit 605 in this example, but can be externally supplied to the content key decryption unit 605. The second key encryption key 163 is likewise stored in the content key encryption unit 607, but can be externally supplied to the content key encryption unit 607.

Furthermore, the first encrypted content key 153 is decrypted using the first key encryption key 161 in this example, but the content keys can be encrypted by an encryption algorithm that does not use an encryption key, in which case the first key encryption key 161 is not needed. The same can be said about the second key encryption key 163.

The first encrypted content key 153 can also be deleted before or after writing the second encrypted content key 154.

3.2 Example 2

Figure 23:
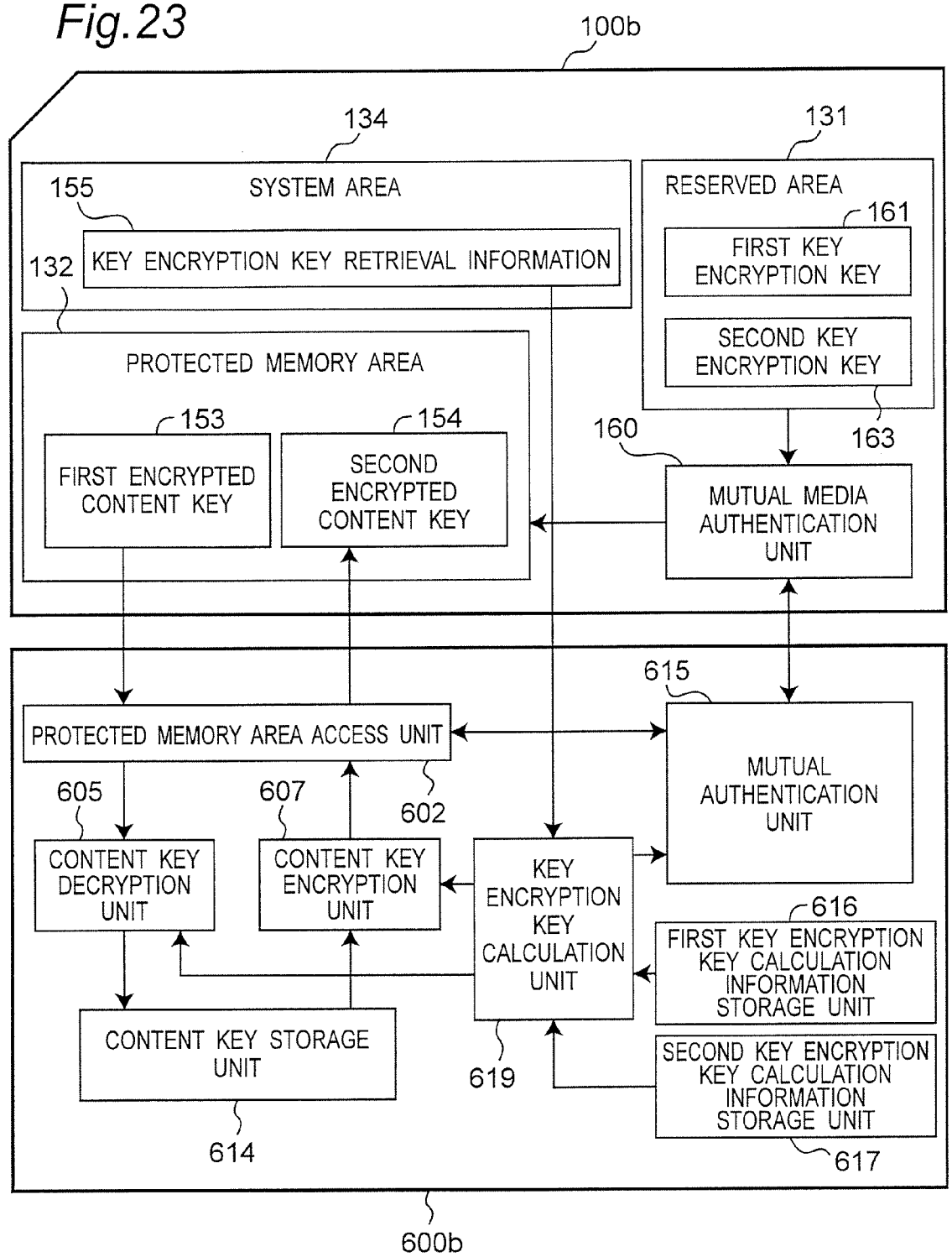
FIG. 23 shows the arrangement of a second recording apparatus and recording medium according to a third embodiment of the invention.

FIG. 23 shows the arrangement of a second recording apparatus and recording medium according to this embodiment of the invention.

The recording medium 100b has a reserved area 131 which cannot be read or written externally to the recording medium 100b, a protected memory area 132 which can be read and written only by devices for which mutual authentication with the recording medium 100b succeeds, and a system area 134 which can be read unconditionally from outside the recording medium 100b but cannot be written.

The reserved area 131 stores the first key encryption key 161 and the second key encryption key 162, which are keys for decrypting the content keys.

The protected memory area 132 stores the first encrypted content key 153 and second encrypted content key 154.

The system area 134 stores information (key encryption key retrieval information) 155 for acquiring the key for decrypting a content key.

The recording medium 100b has a mutual media authentication unit 160 for mutual authentication with the recording apparatus 600b.

The recording apparatus 600b has a protected memory area access unit 602, content key decryption unit 605, content key encryption unit 607, content key storage unit 614, mutual authentication unit 615, first and second key encryption key calculation information storage units 616 and 617, and a key encryption key calculation unit 619. The first and second key encryption key calculation information storage units 616 and 617 respectively store information (first and second key encryption key calculation information) for calculating the first and second key encryption keys 161 and 163. The first and second key encryption keys used for mutual authentication can be calculated by performing a specific calculation on the first and second key encryption key calculation information with the key encryption key retrieval information 155.

The process of mutual authentication by the recording medium 100b and recording apparatus 600b is described next.

The first and second key encryption key calculation information is information required to generate the first and second key encryption keys 161 and 163 assigned to the recording apparatus 600b, and is normally licensed information. The first and second key encryption key calculation information is stored in the first and second key encryption key calculation information storage units 616 and 617 so that the calculation information cannot be read from outside the recording apparatus 600b.

The key encryption key retrieval information 155 is information for getting the information required to retrieve the key encryption key. Because the system area 134 can be read unconditionally, the key encryption key retrieval information 155 can be read unconditionally from outside the recording medium.

The key encryption key calculation unit 619 acquires the first key encryption key calculation information from the first key encryption key calculation information storage unit 616, acquires the key encryption key retrieval information 155 from the system area 134, and calculates the first key encryption key from the acquired information. A correct first key encryption key cannot be calculated if illegal first key encryption key calculation information is used for this calculation.

Likewise, the key encryption key calculation unit 619 acquires the second key encryption key calculation information from the second key encryption key calculation information storage unit 617, acquires the key encryption key retrieval information 155 from the system area 134, and calculates the second key encryption key calculation information from the acquired information. A correct second key encryption key cannot be calculated if illegal second key encryption key calculation information is used for this calculation.

Next, the key encryption key calculation unit 619 sends the first key encryption key to the mutual authentication unit 615.

The mutual media authentication unit 160 acquires the first key encryption key 161 stored in the reserved area 131. If the recording medium is legal and the recording apparatus is legal, the first key encryption key stored in the mutual authentication unit 615 and the first key encryption key stored in the mutual media authentication unit 160 will match. To verify a match, the mutual authentication unit 615 and mutual media authentication unit 160 execute a challenge-response mutual authentication process.

More specifically, the mutual authentication unit 615 generates a random number R1, and passes the random number R1 to the mutual media authentication unit 160.

The mutual media authentication unit 160 encrypts the received random number R1 with the first key encryption key stored in the mutual media authentication unit 160, and returns the result to the mutual authentication unit 615.

The mutual authentication unit 615 encrypts the previously generated random number R1 with the first key encryption key stored in the mutual authentication unit 615, and compares the result with the encrypted random number R1 received from the mutual media authentication unit 160. If the keys match, the recording apparatus 600b recognizes the recording medium 100b as authenticated media.

Next, the mutual media authentication unit 160 generates random number R2 and sends random number R2 to the mutual authentication unit 615. The mutual authentication unit 615 encrypts the received random number R2 with the first key encryption key stored in the mutual authentication unit 615, and returns the result to the mutual media authentication unit 160. The mutual media authentication unit 160 encrypts the previously generated random number R2 with the first key encryption key stored in the mutual media authentication unit 160, and compares the result with the encrypted random number R2 returned from the mutual authentication unit 615. If they match, the recording medium 100b recognizes the recording apparatus 600b as an authenticated device.

If both devices verify the other, mutual authentication succeeds. The second key encryption key can also be used for mutual authentication by the mutual authentication unit 615 and mutual media authentication unit 160 in the same way.

The recording medium 100b and recording apparatus 600b can also acquire a common "first session key" by taking the exclusive OR of the random number R1 and random number R2 used for mutual authentication and encrypting the result with the first key encryption key. The result is "first protected memory area access information," and the encryption key for encrypting data when sending data between the protected memory area 132 and the protected memory area access unit 602.

In other words, when the protected memory area access unit 602 writes data to the protected memory area 132, the protected memory area access unit 602 encrypts the data using the first session key and sends the encrypted data to the protected memory area 132. The protected memory area 132 decrypts the received data with the first session key and stores the decrypted data.

Likewise when the protected memory area access unit 602 reads data from the protected memory area 132, the data to be read is encrypted using the first session key in the protected memory area 132 and then sent to the protected memory area access unit 602. The protected memory area access unit 602 decrypts the received data using the first session key to acquire the read data.

If the second key encryption key is used a second session key can be similarly acquired, and the result becomes the second protected memory area access information and is the encryption key used for exchanging data between the protected memory area 132 and protected memory area access unit 602.

Figure 24:
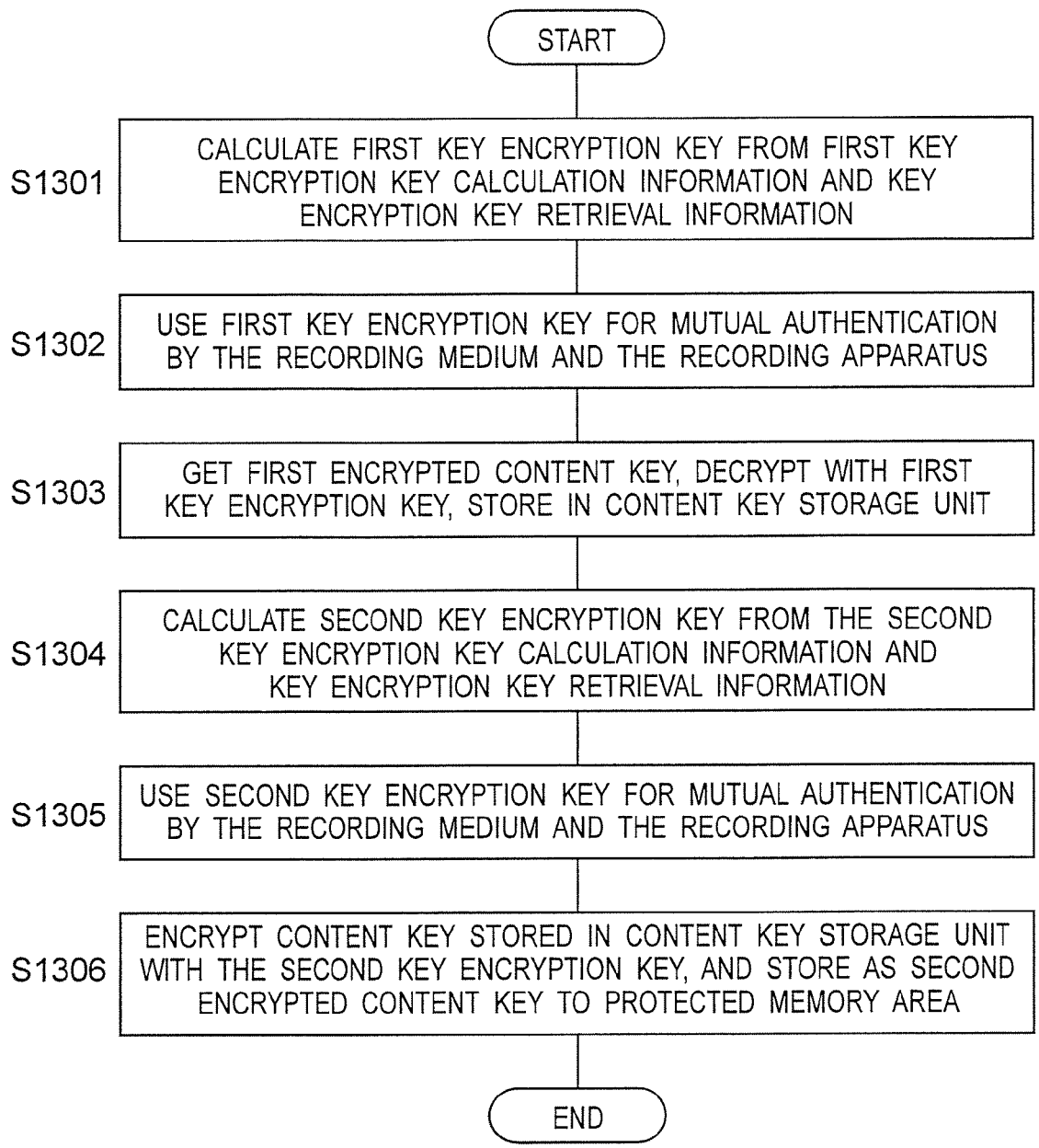
FIG. 24 is a flow chart of the content key conversion process of the second recording apparatus and recording medium according to the third embodiment of the invention.

The process of converting content keys from the first format to the second format is described next with reference to the flow chart in FIG. 24.

Step S1301

The key encryption key calculation unit 619 gets the first key encryption key calculation information from the first key encryption key calculation information storage unit 616, gets the key encryption key retrieval information 155 from the system area 134, and from this information calculates and sends the first key encryption key to the mutual authentication unit 615.

Step S1302

The mutual authentication unit 615 uses the first key encryption key for mutual authentication with the mutual media authentication unit 160, and acquires and sends the first protected memory area access information to the protected memory area access unit 602. If mutual authentication fails, the process aborts.

Step S1303

The content key decryption unit 605 requests the protected memory area access unit 602 for the first encrypted content key. The protected memory area access unit 602 uses the first protected memory area access information to get and send the first encrypted content key 153 from the protected memory area 132 to the content key decryption unit 605.

The content key decryption unit 605 gets the first encrypted content key from the protected memory area access unit 602, and gets the first key encryption key from the key encryption key calculation unit 619. The content key decryption unit 605 decrypts the first encrypted content key using the first key encryption key, and stores the decrypted content key to the content key storage unit 614.

Step S1304

The key encryption key calculation unit 619 gets the second key encryption key calculation information from the second key encryption key calculation information storage unit 617, gets the key encryption key retrieval information 155 from the system area 134, and uses this information to calculate and send the second key encryption key to the mutual authentication unit 615.

Step S1305

The mutual authentication unit 615 uses the second key encryption key for mutual authentication with the mutual media authentication unit 160, and gets and sends the second protected memory area access information to the protected memory area access unit 602. If mutual authentication fails, the process aborts.

Step S1306

The content key encryption unit 607 gets the decrypted content key from the content key storage unit 614, gets the second key encryption key from the key encryption key calculation unit 619, encrypts the decrypted content key with the second key encryption key, and sends the result as the second encrypted content key to the protected memory area access unit 602. The protected memory area access unit 602 uses the second protected memory area access information to write the second encrypted content key 154 to the protected memory area 132.

As a result, an encrypted content key of the first format can be converted to an encrypted content key of the second format.

An example of a mutual authentication means is described in this embodiment of the invention, but other methods can be used as long as the method can safely confirm that both devices have a common key encryption key. Furthermore, the protected memory area access information acquired as a result of mutual authentication is used to encrypt and exchange data between the protected memory area access unit and the protected memory area, but other methods can be used insofar as data can be securely exchanged between the protected memory area access unit and the protected memory area.

3.3 Example 3

Figure 25:
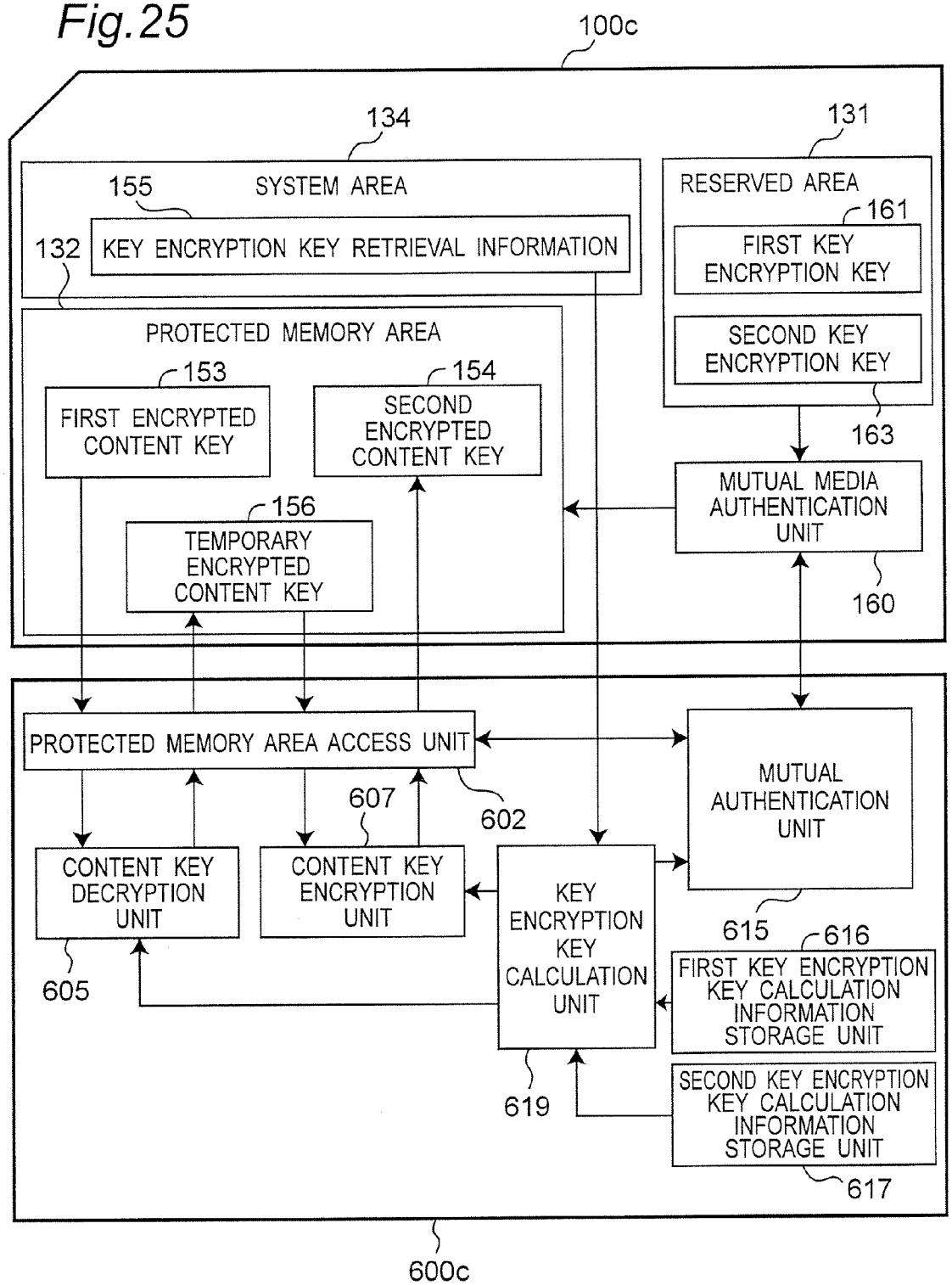
FIG. 25 shows the arrangement of a third recording apparatus and recording medium according to a third embodiment of the invention.

FIG. 25 shows the arrangement of a third recording apparatus and recording medium according to this embodiment of the invention.

This recording medium 100c has a system area 134 for storing key encryption key retrieval information 155, a reserved area 131 for storing one or more key encryption keys, a protected memory area 132 for storing encrypted content keys, and a mutual media authentication unit 160.

The recording apparatus 600c has a protected memory area access unit 602, content key decryption unit 605, content key encryption unit 607, mutual authentication unit 615, first and second key encryption key calculation information storage units 616 and 617, and a key encryption key calculation unit 619.

Figure 26:
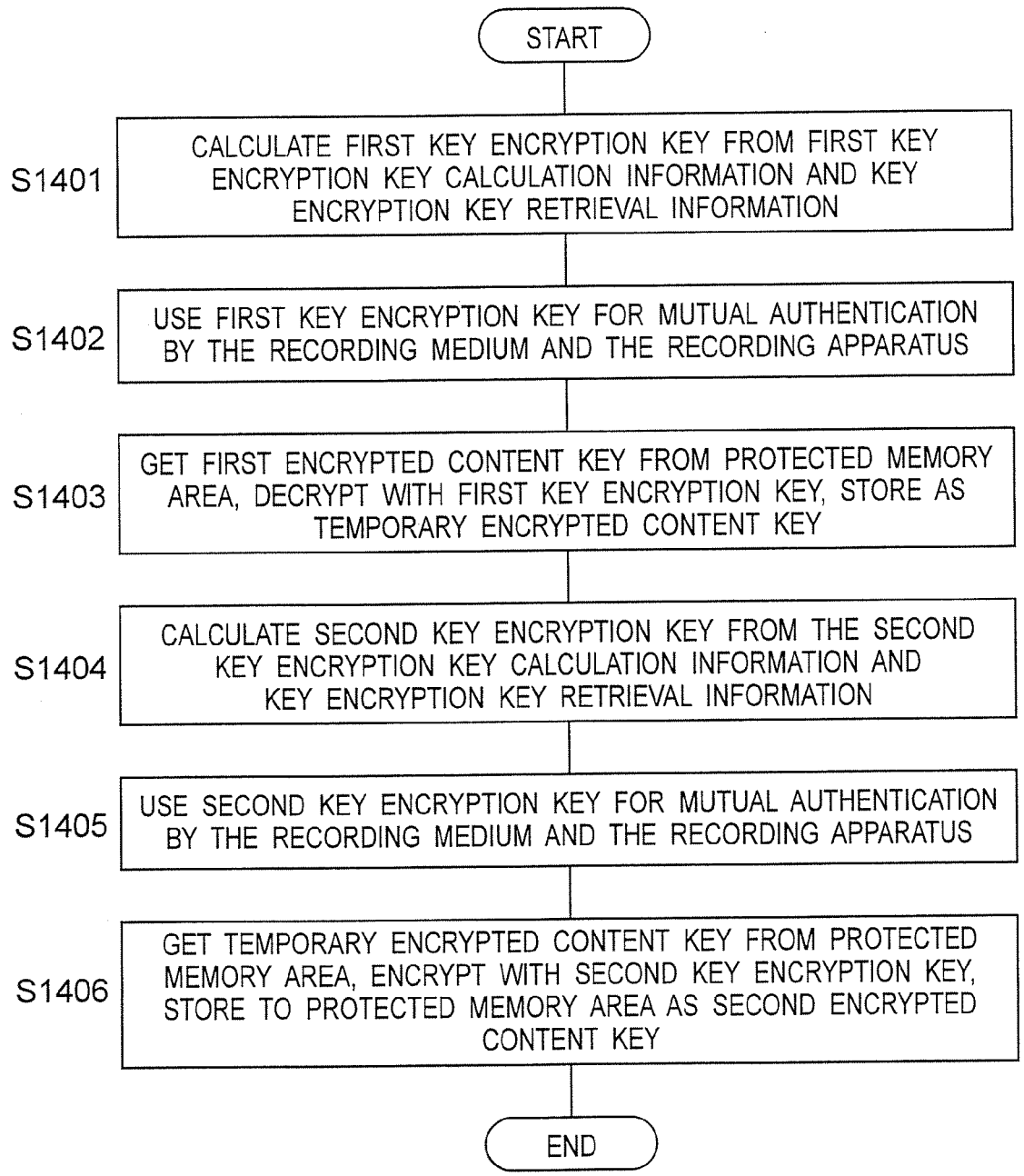
FIG. 26 is a flow chart of the content key conversion process of the third recording apparatus and recording medium according to the third embodiment of the invention.

The operation of this recording apparatus and recording medium is basically the same as described in the second example above. The encrypted content key conversion process is described next with reference to the flow chart in FIG. 26.

Step S1401

The first key encryption key is calculated from the first key encryption key calculation information and the key encryption key retrieval information 155.

Step S1402

The mutual media authentication unit 160 and mutual authentication unit 615 then use the first key encryption key for mutual authentication. If mutual authentication fails, the process aborts.

Step S1403

If mutual authentication using the first key encryption key succeeds, the content key decryption unit 605 acquires the first encrypted content key 153 through the protected memory area access unit 602, gets the first key encryption key from the key encryption key calculation unit 619, and decrypts the first encrypted content key 153 with the first key encryption key, and sends the result to the protected memory area access unit 602.

The protected memory area access unit 602 then writes the received content key to the protected memory area 132 as a temporary encrypted content key 156 using the first protected memory area access information received from the mutual authentication unit 615.

Step S1404

The second key encryption key is then calculated from the second key encryption key calculation information and the key encryption key retrieval information 155.

Step S1405

The mutual authentication unit 615 uses the second key encryption key for mutual authentication with the mutual media authentication unit 160.

Step S1406

The protected memory area access unit 602 reads the temporary encrypted content key 156 from the protected memory area 132 using the second protected memory area access information received from the mutual authentication unit 615, and outputs the temporary encrypted content key 156 to the content key encryption unit 607.

The content key encryption unit 607 encrypts the received temporary encrypted content key 156 with the second key encryption key received from the key encryption key calculation unit 619, and outputs the encrypted key to the protected memory area access unit 602.

The protected memory area access unit 602 stores the received encrypted content key to the protected memory area 132 as the second encrypted content key 154.

An encrypted content key of the first format can thus be converted to an encrypted content key of the second format.

3.4 Example 4

Figure 27:
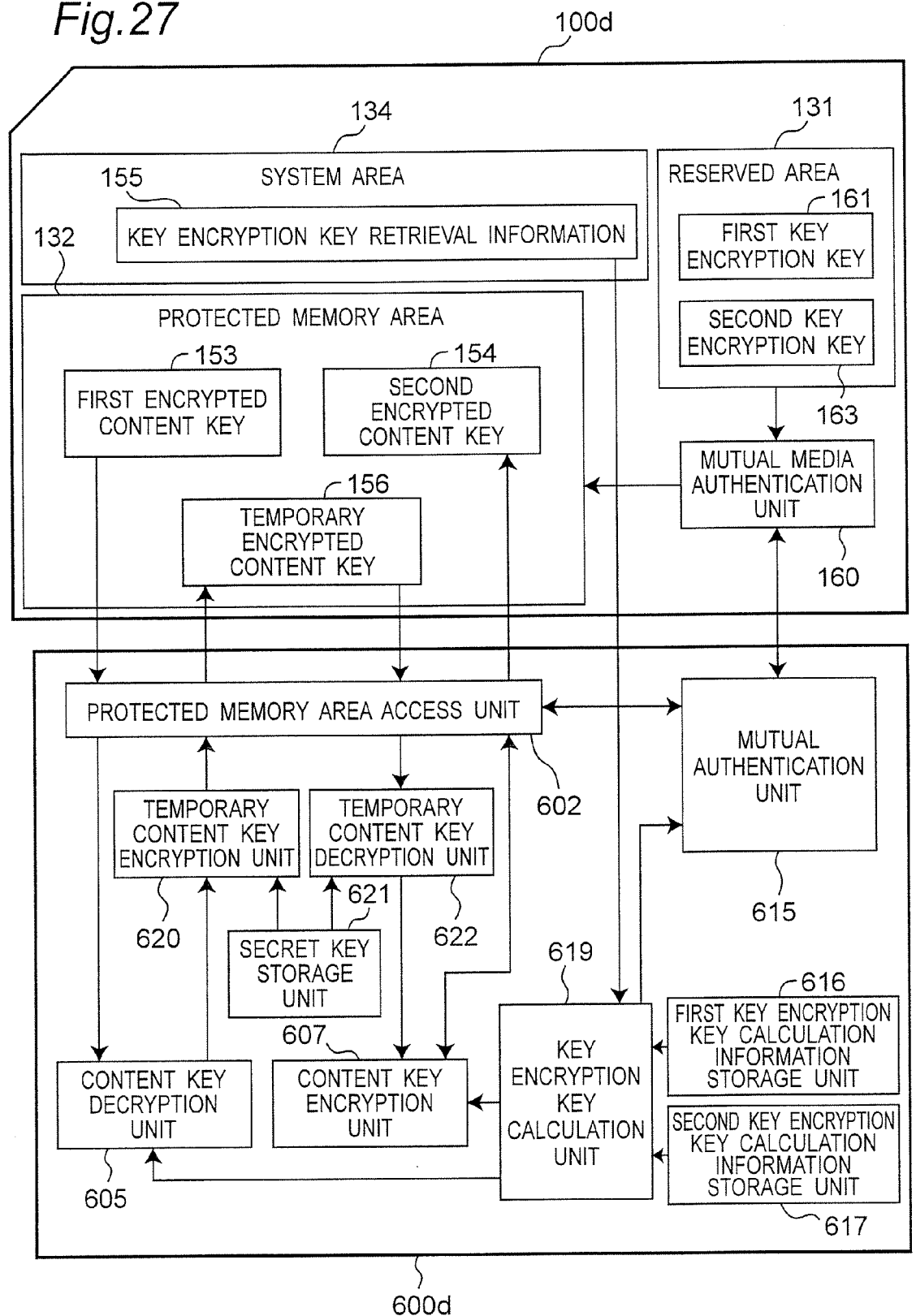
FIG. 27 shows the arrangement of a fourth recording apparatus and recording medium according to a third embodiment of the invention.

FIG. 27 shows the arrangement of a fourth recording apparatus and recording medium according to this embodiment of the invention The recording medium 100d has the same arrangement as the preceding recording medium 100c.

In addition to the components of the recording apparatus 600c described above, the recording apparatus 600d of this embodiment also has a temporary content key encryption unit 620, a temporary content key decryption unit 622, and a secret key storage unit 621.

Figure 28:
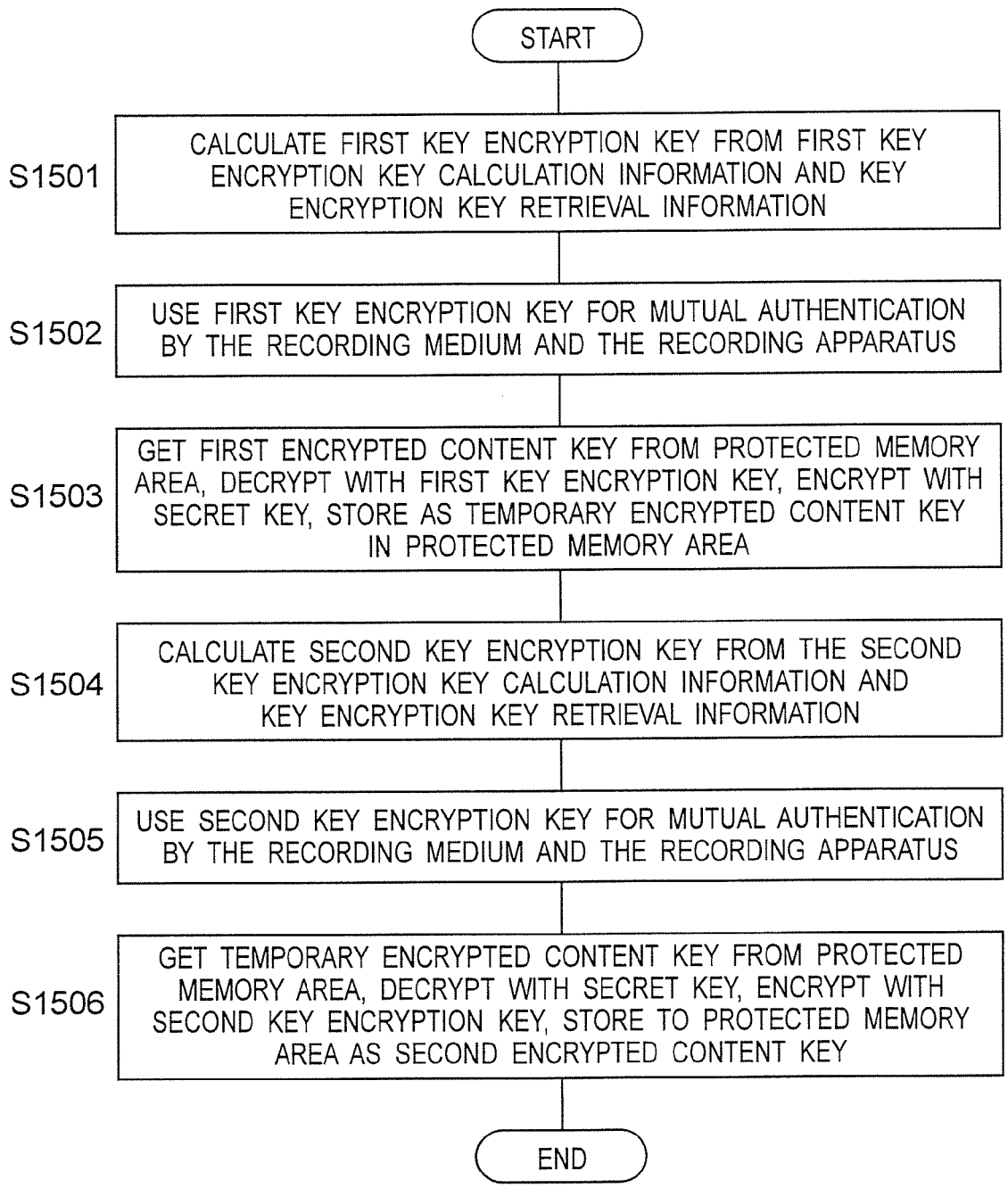
FIG. 28 is a flow chart of the content key conversion process of the fourth recording apparatus and recording medium according to the third embodiment of the invention.

The operation of this recording apparatus and recording medium is basically the same as described in the third example above. The encrypted content key conversion process is described next with reference to the flow chart in FIG. 28.

Step S1501

First, the first key encryption key is calculated from the first key encryption key calculation information and the key encryption key retrieval information 155.

Step S1502

The mutual media authentication unit 160 and the mutual authentication unit 615 then use the first key encryption key for mutual authentication. If mutual authentication fails, the process aborts.

Step S1503

The content key decryption unit 605 acquires the first encrypted content key 153 through the protected memory area access unit 602, gets the first key encryption key from the key encryption key calculation unit 619, decrypts the first encrypted content key 153 with the first key encryption key, and sends the result to the temporary content key encryption unit 620.

The temporary content key encryption unit 620 gets the secret key from the secret key storage unit 621, encrypts the content key received from the content key decryption unit 605 with the secret key, and sends the encrypted content key to the protected memory area access unit 602. The protected memory area access unit 602 writes the received encrypted content key as the temporary encrypted content key 156 to the protected memory area 132 using the first protected memory area access information received from the mutual authentication unit 615.

Step S1504

The second key encryption key is then calculated from the second key encryption key calculation information and the key encryption key retrieval information 155.

Step S1505

Next, the mutual authentication unit 615 uses the second key encryption key for mutual authentication with the mutual media authentication unit 160. The protected memory area access unit 602 then uses the second protected memory area access information received from the mutual authentication unit 615 to read and send the temporary encrypted content key 156 from the protected memory area 132 to the temporary content key decryption unit 622.

Step S1506

The temporary content key decryption unit 622 decrypts the received temporary encrypted content key 156 using the secret key stored in the secret key storage unit 621 and outputs the decrypted content key to the content key encryption unit 607. The content key encryption unit 607 encrypts the received content key with the second key encryption key received from the key encryption key calculation unit 619, and outputs the encrypted content key to the protected memory area access unit 602. The protected memory area access unit 602 then stores the received encrypted content key to the protected memory area 132 as the second encrypted content key 154.

An encrypted content key of the first format can thus be converted to an encrypted content key of the second format.

The secret key storage unit 621 is provided separately from the temporary content key encryption unit 620 and temporary content key decryption unit 622 in this embodiment, but these units can be combined. For example, the secret key storage unit 621 can be included in each of the temporary content key encryption unit 620 and the temporary content key decryption unit 622. The temporary content key encryption unit 620, temporary content key decryption unit 622, and secret key storage unit 621 can also be integrated in a single unit.

Furthermore, the temporary content key encryption unit 620 and temporary content key decryption unit 622 separately handle encryption and decryption operations using the secret key stored in the secret key storage unit 621 in this example, but the content can be temporarily encrypted and decrypted using an encryption/decryption algorithm that does not use a secret key. In this case the secret key storage unit 621 is unnecessary.

3.5 Example 5

Figure 29:
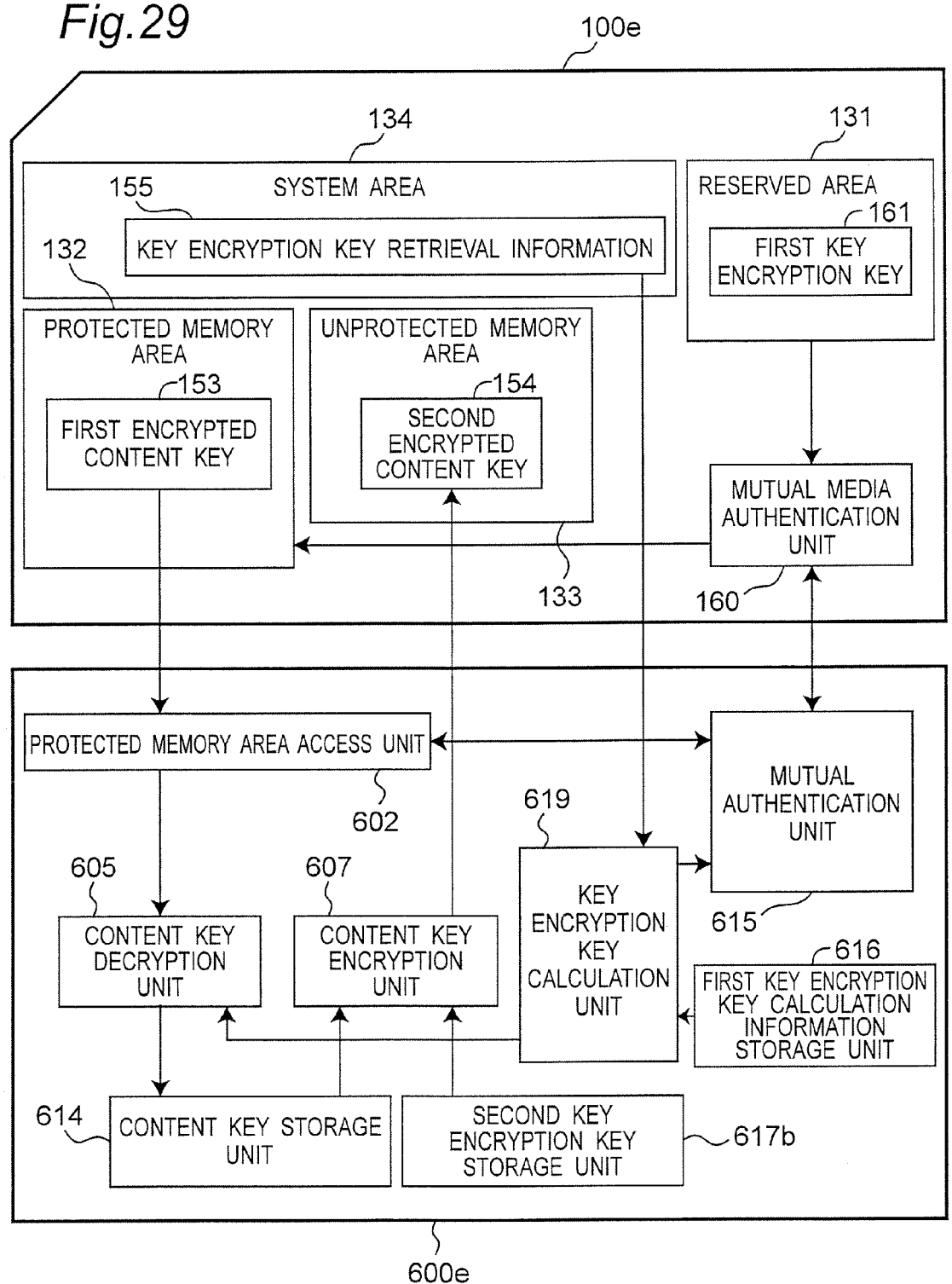
FIG. 29 shows the arrangement of a fifth recording apparatus and recording medium according to a third embodiment of the invention.

FIG. 29 shows the arrangement of a fifth recording apparatus and recording medium according to this embodiment of the invention The recording medium 100e has a system area 134 for storing the key encryption key retrieval information 155, a reserved area 131 for storing the first key encryption key 161, a protected memory area 132 for storing the first encrypted content key 153, an unprotected memory area 133 for storing a second encrypted content key 154, and a mutual media authentication unit 160. The unprotected memory area 133 can be freely read and written.

The recording apparatus 600e has a protected memory area access unit 602, content key decryption unit 605, content key encryption unit 607, content key storage unit 614, mutual authentication unit 615, first key encryption key calculation information storage unit 616, second key encryption key storage unit 617b, and key encryption key calculation unit 619.

Use of the protected memory area access information by the protected memory area access unit 602 to access the protected memory area 132 for mutual authentication is the same as described in the foregoing second example of the present embodiment.

Figure 30:
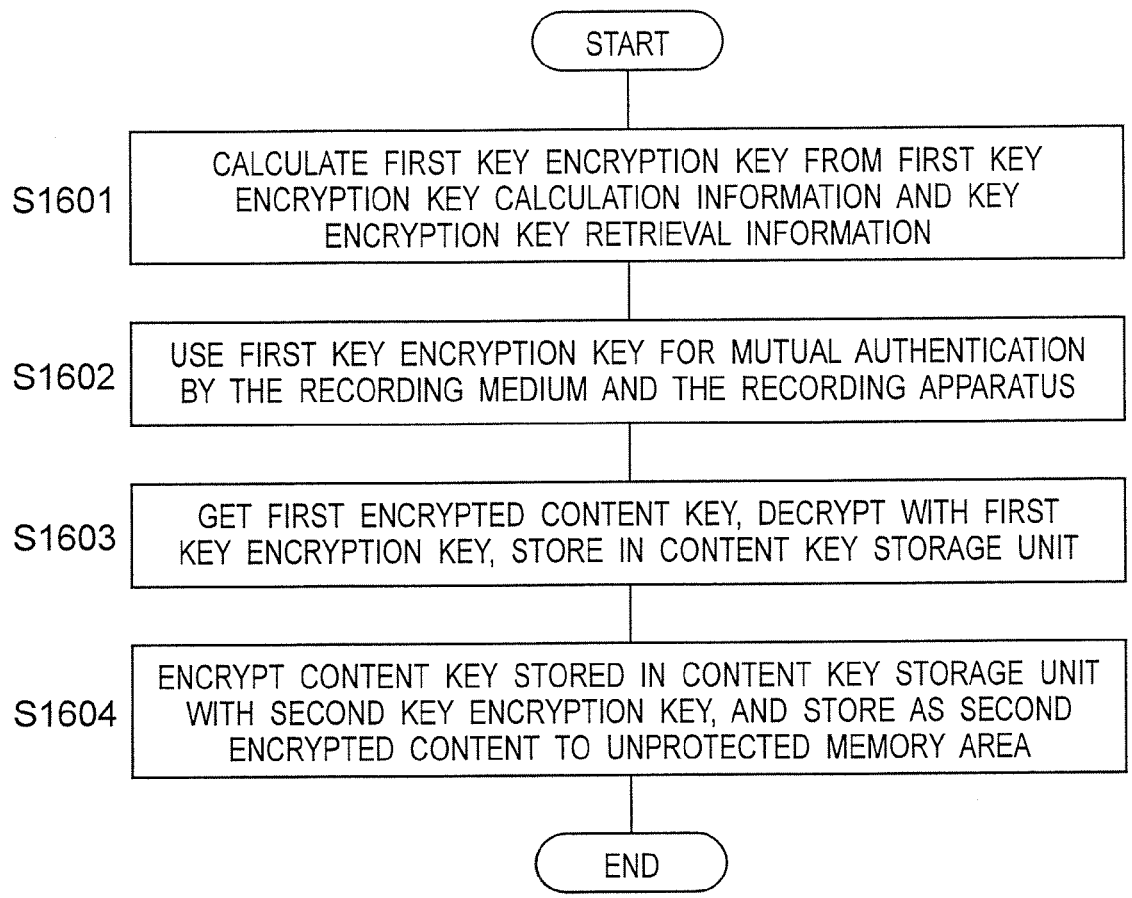
FIG. 30 is a flow chart of the content key conversion process of the fifth recording apparatus and recording medium according to the third embodiment of the invention.

The encrypted key conversion process of this fifth example is described below with reference to the flow chart in FIG. 30.
Step S1601

The key encryption key calculation unit 619 acquires the first key encryption key calculation information from the first key encryption key calculation information storage unit 616, gets the key encryption key retrieval information 155 from the system area 134, calculates the first key encryption key from these informations, and sends the first key encryption key to the mutual authentication unit 615.
Step S1602

The mutual authentication unit 615 uses the first key encryption key for mutual authentication with the mutual media authentication unit 160, acquires the first protected memory area access information, and sends the first protected memory area access information to the protected memory area access unit 602.

The content key decryption unit 605 asks the protected memory area access unit 602 to get the first encrypted content key.

The protected memory area access unit 602 uses the first protected memory area access information to get and send the first encrypted content key 153 from the protected memory area 132 to the content key decryption unit 605.
Step S1603

The content key decryption unit 605 gets the first encrypted content key 153 from the protected memory area access unit 602, gets the first key encryption key from the key encryption key calculation unit 619, decrypts the first encrypted content key 153 with the first key encryption key, and sends the decrypted content key as the content encryption key to the content key storage unit 614. The content key storage unit 614 stores the content encryption key sent from the content key decryption unit 605.
Step S1604

The content key encryption unit 607 acquires the content encryption key from the content key storage unit 614, gets the second key encryption key stored by the second key encryption key storage unit 617b, encrypts the content encryption key with the second key encryption key, and writes the encrypted key as the second encrypted content key 154 to the unprotected memory area 133.

An encrypted content key of the first format can thus be converted to an encrypted content key of the second format.

The second key encryption key storage unit 617b can be contained in the content key encryption unit 607. In addition, the second key encryption key can be stored in the protected memory area 132 of the recording medium 100e instead of in the second key encryption key storage unit 617b of the recording apparatus 600e.

The content key encryption unit 607 can also use an encryption algorithm that does not use an encryption key. In this case the second key encryption key storage unit 617b is unnecessary.

3.6 Example 6

Figure 31:
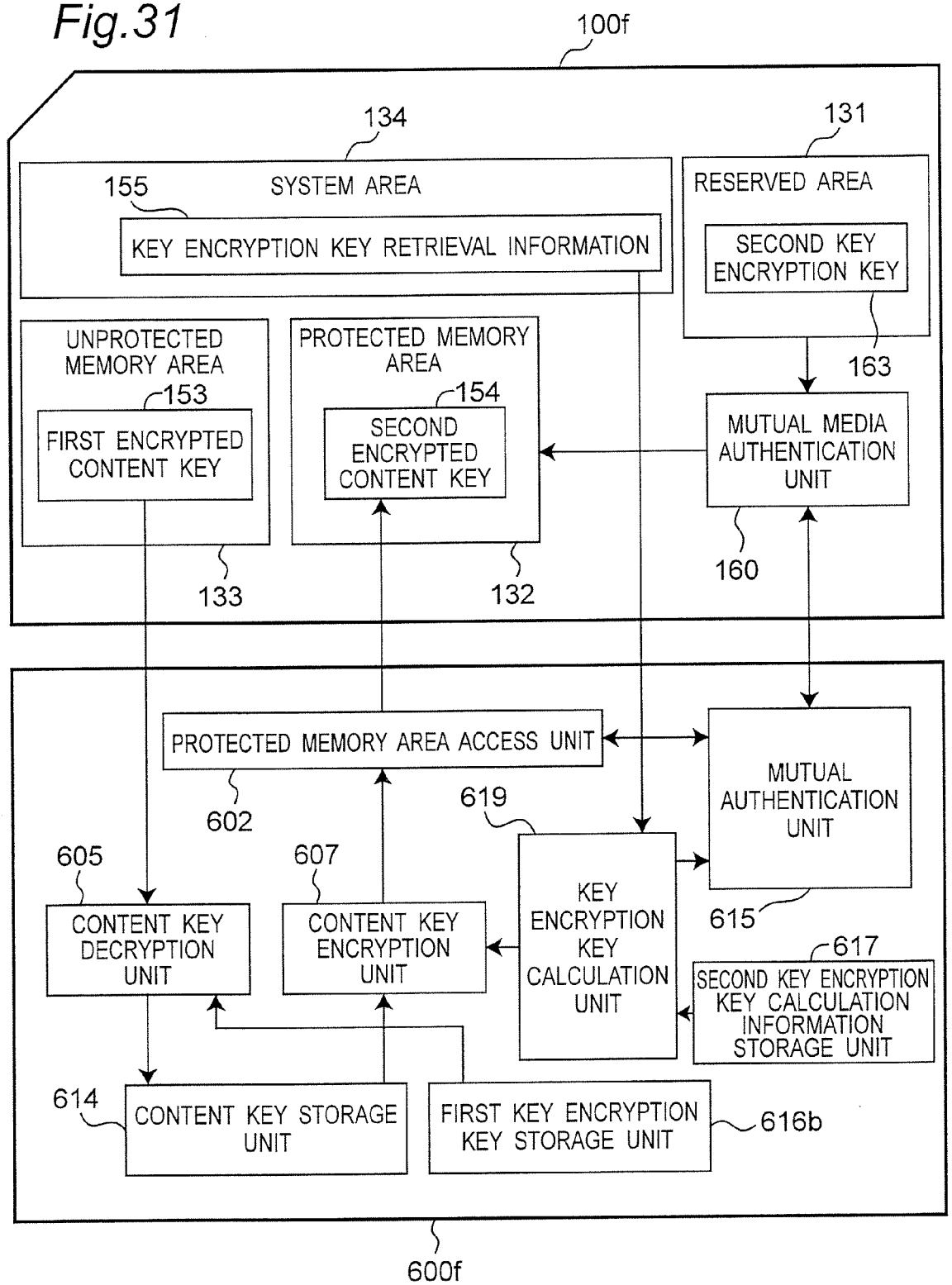
FIG. 31 shows the arrangement of a sixth recording apparatus and recording medium according to a third embodiment of the invention.

FIG. 31 shows the arrangement of a sixth recording apparatus and recording medium according to this embodiment of the invention.

The recording medium 100f in this example differs from the recording medium 100e in the fifth example in that this recording medium 100f stores the second key encryption key 163 in the reserved area 131, stores the second encrypted content key 154 in the protected memory area 132, and stores the first encrypted content key 153 in the unprotected memory area 133.

The recording apparatus 600f in this example differs from the recording apparatus 600e in the fifth example in that a second key encryption key calculation information storage unit 617 is provided instead of the first key encryption key calculation information storage unit 616, and a first key encryption key storage unit 616b is provided instead of the second key encryption key storage unit 617b.

Use of the protected memory area access information by the protected memory area access unit 602 to access the protected memory area 132 for mutual authentication is the same as described in the foregoing second example of the present embodiment.

Figure 32:
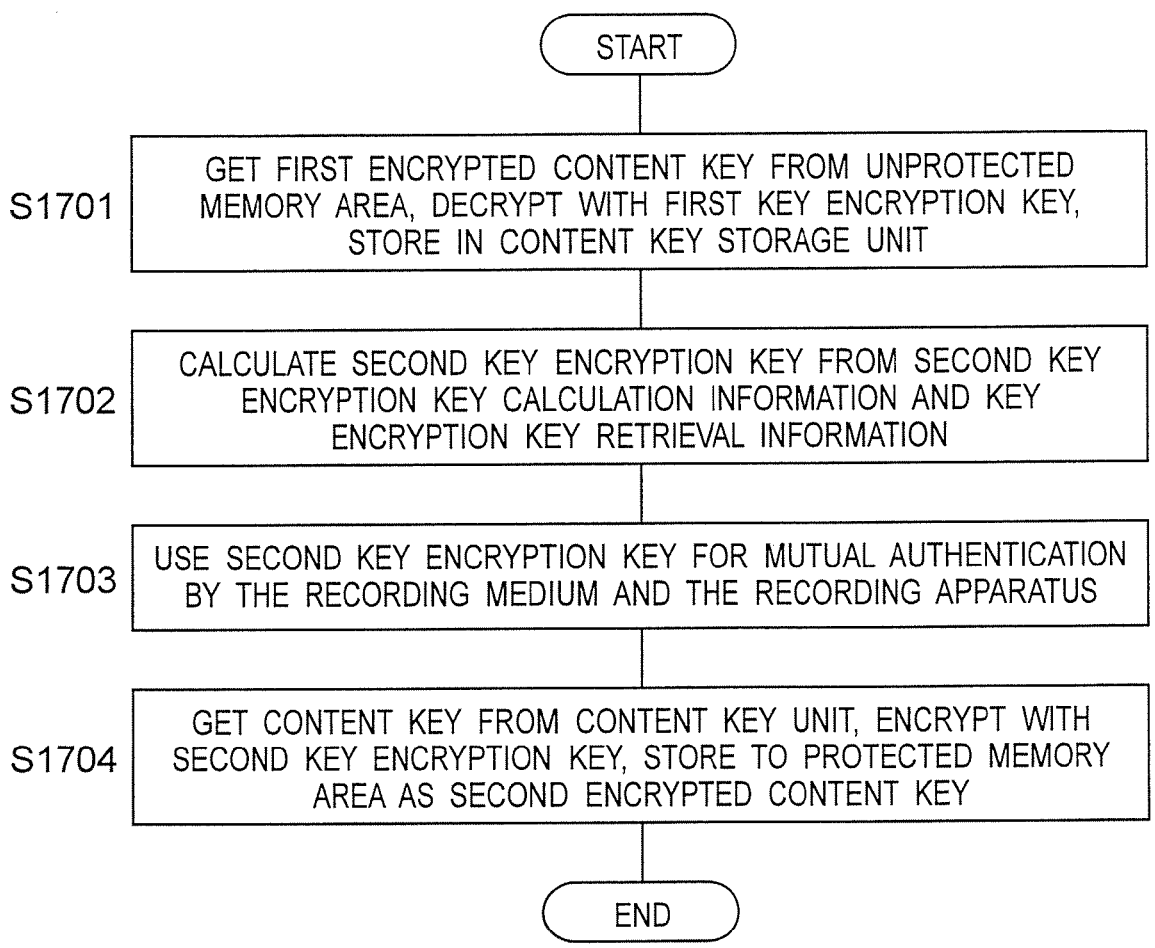
FIG. 32 is a flow chart of the content key conversion process of the sixth recording apparatus and recording medium according to the third embodiment of the invention.

The encrypted key conversion process of this example is described below with reference to the flow chart in FIG. 32.
Step S1701

The content key decryption unit 605 gets the first encrypted content key 153 from the unprotected memory area 133, gets the first key encryption key from the first key encryption key storage unit 616b, decrypts the first encrypted content key with the first key encryption key, and stores the decrypted content key in the content key storage unit 614.
Step S1702

The key encryption key calculation unit 619 gets the second key encryption key calculation information from the second key encryption key calculation information storage unit 617, gets the key encryption key retrieval information 155 from the system area 134, and based on these informations calculates the second key encryption key. The calculated second key encryption key is then sent to the mutual authentication unit 615.
Step S1703

The mutual authentication unit 615 uses the second key encryption key for mutual authentication with the mutual media authentication unit 160, and gets and sends the second protected memory area access information to the protected memory area access unit 602.
Step S1704

The content key encryption unit 607 gets the content key from the content key storage unit 614, gets the second key encryption key from the key encryption key calculation unit 619, encrypts the content key with the second key encryption key, and sends the encrypted key as the second encrypted content key to the protected memory area access unit 602.

The protected memory area access unit 602 uses the second protected memory area access information to write the second encrypted content key 154 to the protected memory area 132.

An encrypted content key of the first format can thus be converted to an encrypted content key of the second format.

The first key encryption key storage unit 616b can be contained in the content key encryption unit 607. In addition, the first key encryption key can be stored in the protected memory area 132 of the recording medium 100e instead of in the first key encryption key storage unit 616b of the recording apparatus 600f.

The content key decryption unit 605 can also use an encryption algorithm that does not use an encryption key. In this case the first key encryption key storage unit 616b is unnecessary.

3.7 Example 7

Figure 33:
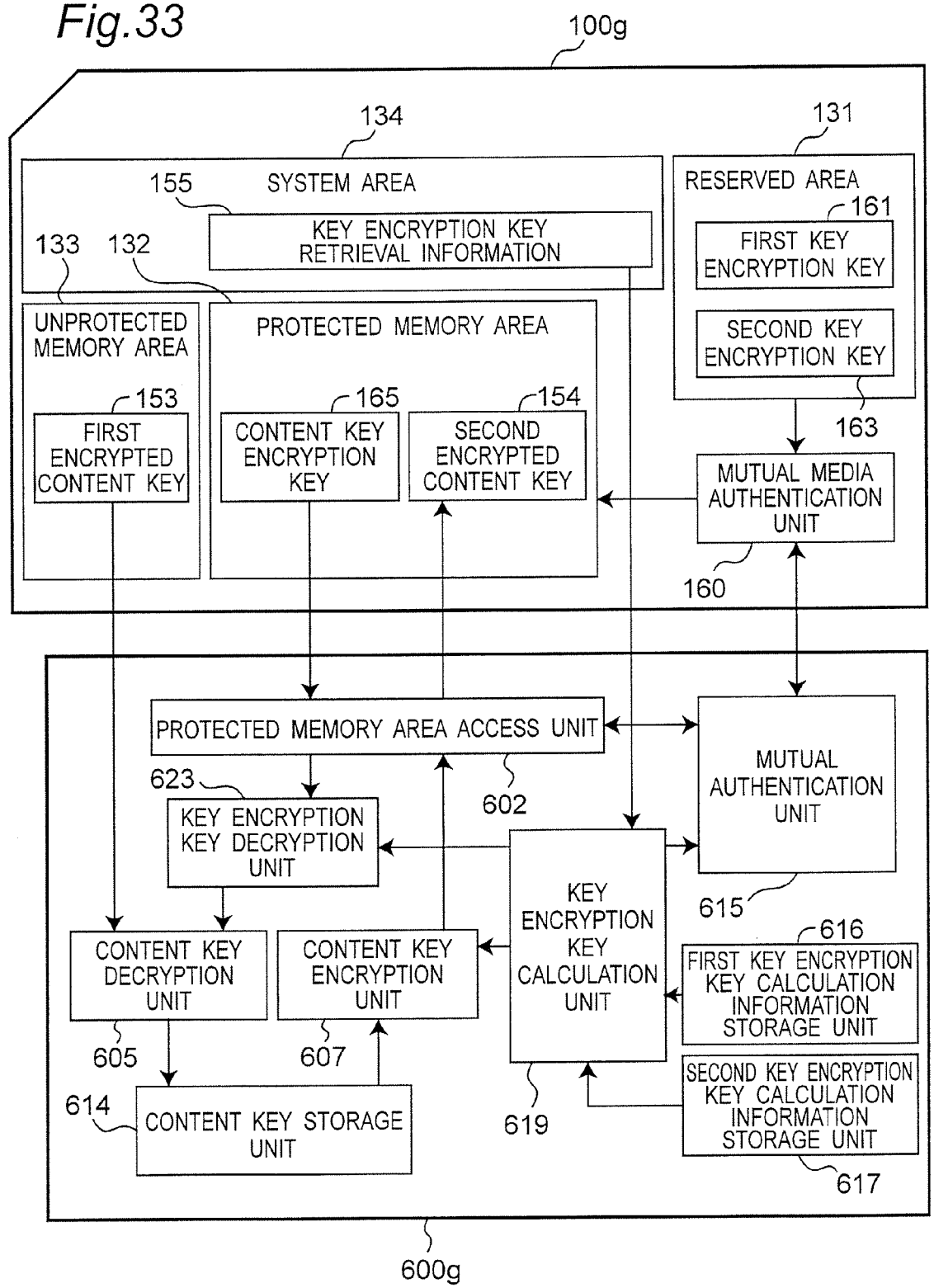
FIG. 33 shows the arrangement of a seventh recording apparatus and recording medium according to a third embodiment of the invention.

FIG. 33 shows the arrangement of a seventh recording apparatus and recording medium according to this embodiment of the invention.

This recording medium 100g stores the key encryption key retrieval information 155 in the system area 134, stores the first and second key encryption keys 161 and 163 in the reserved area 131, stores the content key encryption key 165 (third key encryption key) and second encrypted content key 154 in the protected memory area 132, and stores the first encrypted content key 153 in the unprotected memory area 133.

In this example the first encrypted content key 153 is encrypted with the content key encryption key 165, and the content key encryption key 165 is encrypted with the first key encryption key 161. The content key encryption key 165 (third key encryption key) is, for example, equivalent to the unique service key in the first and second embodiments, and the first key encryption key 161 is equivalent to the unique media key.

The recording apparatus 600g has a protected memory area access unit 602, content key decryption unit 605, content key encryption unit 607, content key storage unit 614, mutual authentication unit 615, first key encryption key calculation information storage unit 616, second key encryption key calculation information storage unit 617, key encryption key calculation unit 619, and key encryption key decryption unit 623. The key encryption key decryption unit 623 decrypts encrypted keys that are used for encrypting content keys.

Figure 34:
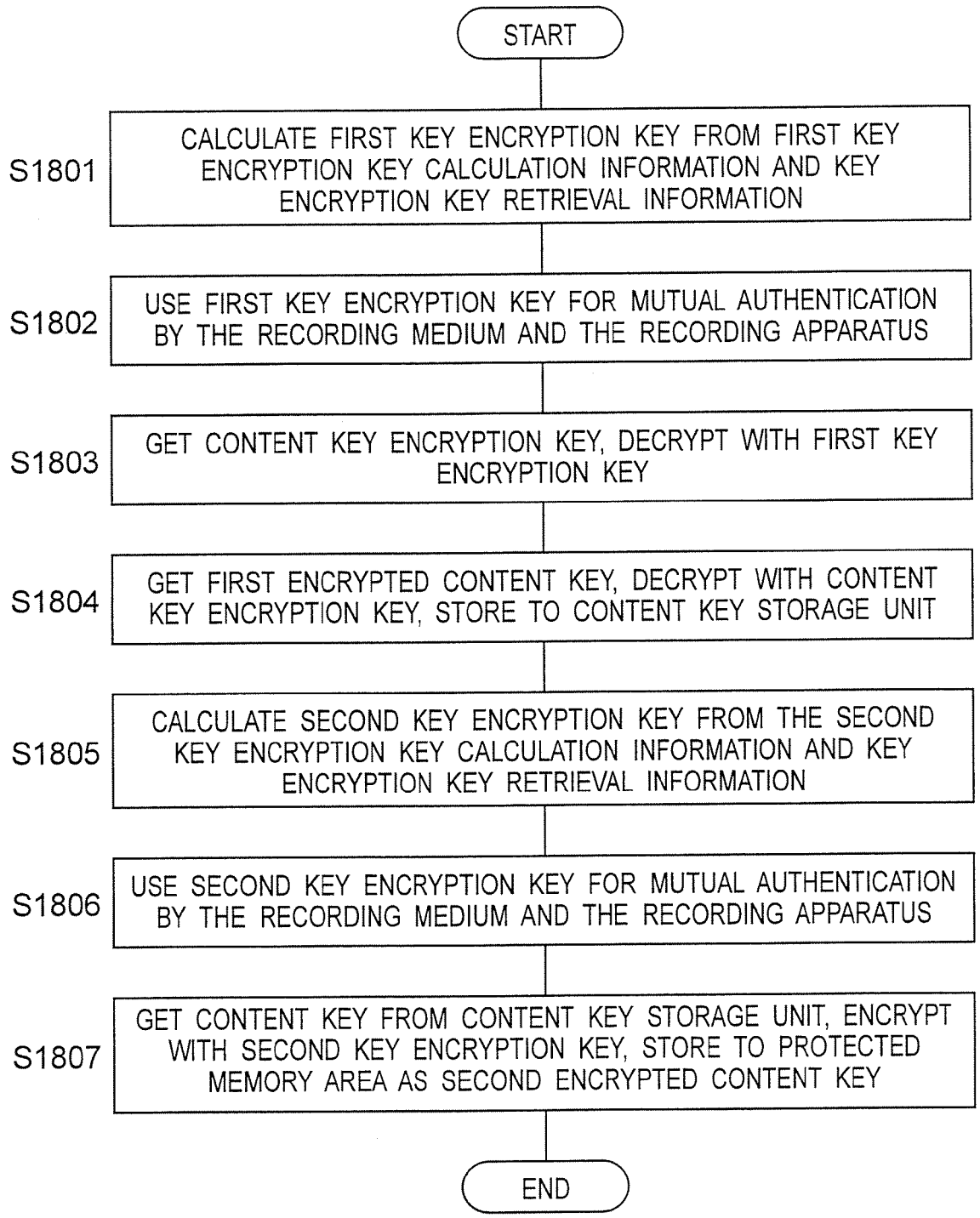
FIG. 34 is a flow chart of the content key conversion process of the seventh recording apparatus and recording medium according to the third embodiment of the invention.

The encrypted key conversion process of this example is described below with reference to the flow chart in FIG. 34.

Step S1801

The key encryption key calculation unit 619 gets the first key encryption key calculation information from the first key encryption key calculation information storage unit 616, gets the key encryption key retrieval information 155 from the system area 134, calculates the first key encryption key from this information, and outputs the first key encryption key to the mutual authentication unit 615.

Step S1802

The mutual authentication unit 615 uses the first key encryption key for mutual authentication with the mutual media authentication unit 160, and acquires and sends the first protected memory area access information to the protected memory area access unit 602. The process aborts if mutual authentication fails.

Step S1803

The key encryption key decryption unit 623 asks the protected memory area access unit 602 to get the content key encryption key 165.

The protected memory area access unit 602 uses the first protected memory area access information to get and send the content key encryption key 165 from the protected memory area 132 to the key encryption key decryption unit 623.

The key encryption key decryption unit 623 gets the first key encryption key from the key encryption key calculation unit 619, decrypts the content key encryption key 165 with the first key encryption key, and sends the decrypted content key encryption key to the content key decryption unit 605.

Step S1804

The content key decryption unit 605 gets the first encrypted content key 153 from the unprotected memory area 133, decrypts the first encrypted content key with the content key encryption key acquired from the key encryption key decryption unit 623, and sends the decrypted content key to the content key storage unit 614. The content key storage unit 614 stores the decrypted content key.

Step S1805

The key encryption key calculation unit 619 gets the second key encryption key calculation information from the second key encryption key calculation information storage unit 617, gets the key encryption key retrieval information 155 from the system area 134, uses this information to calculate the second key encryption key, and sends the second key encryption key to the mutual authentication unit 615.

Step S1806

The mutual authentication unit 615 uses the second key encryption key for mutual authentication with the mutual media authentication unit 160, gets the second protected memory area access information, and sends the second protected memory area access information to the protected memory area access unit 602.

Step S1807

The content key encryption unit 607 gets the content key from the content key storage unit 614, gets the second key encryption key from the key encryption key calculation unit 619, encrypts the content key with the second key encryption key, and sends the result as the second encrypted content key to the protected memory area access unit 602.

The protected memory area access unit 602 uses the second protected memory area access information to write the second encrypted content key 154 to the protected memory area 132.

An encrypted content key of the first format can thus be converted to an encrypted content key of the second format.

3.8 Example 8

Figure 35:
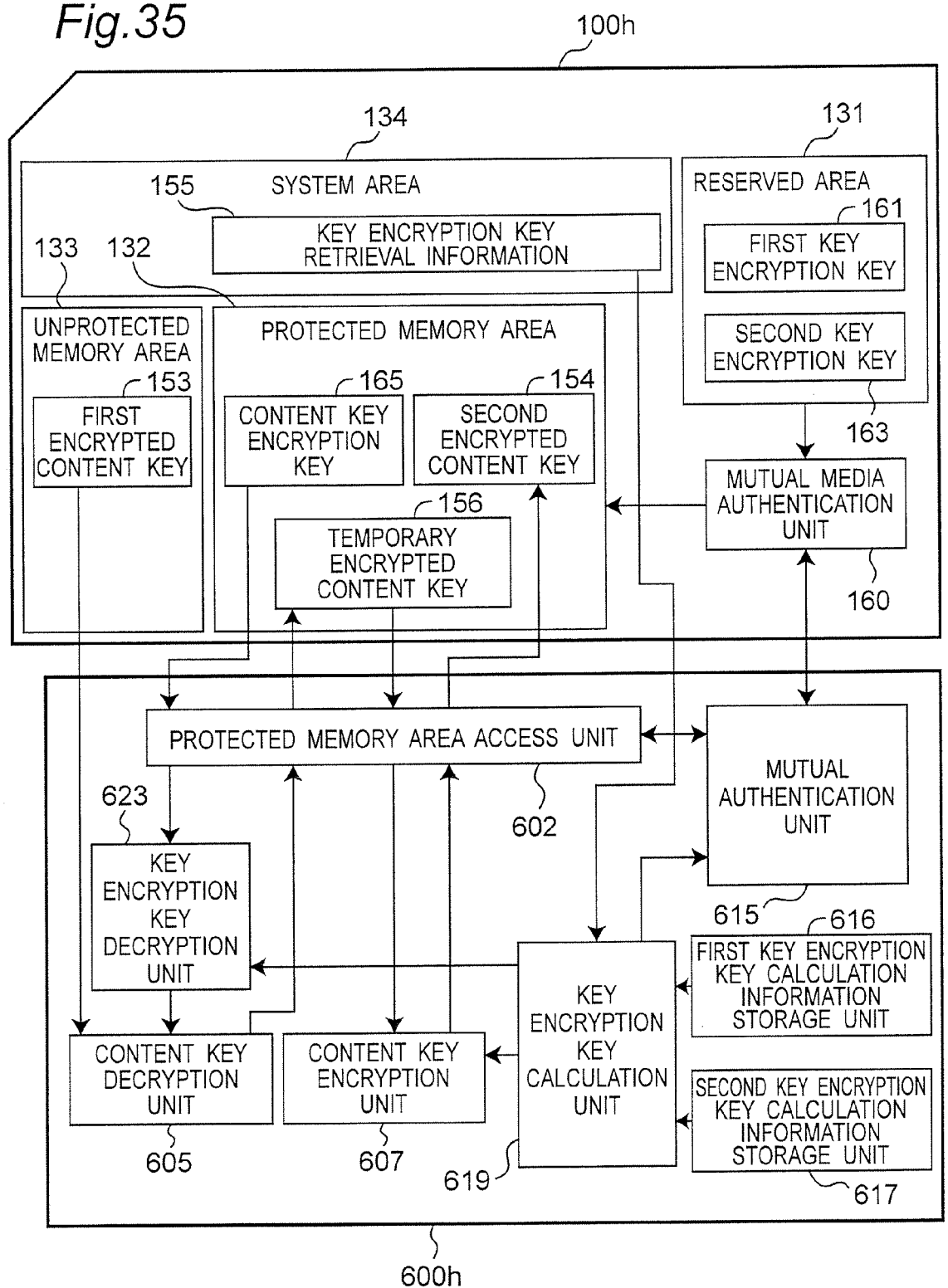
FIG. 35 shows the arrangement of an eighth recording apparatus and recording medium according to a third embodiment of the invention.

FIG. 35 shows the arrangement of an eighth recording apparatus and recording medium according to this embodiment of the invention.

This recording medium 100h stores the first and second key encryption keys 161 and 163 in the reserved area 131, stores the content key encryption key 165, second encrypted content key 154, and temporary encrypted content key 156 in the protected memory area 132, and stores the first encrypted content key 153 in the unprotected memory area 133.

The arrangement of the recording apparatus 600h is identical to the arrangement of the recording apparatus 600g in the seventh example except that the content key storage unit 614 is omitted. The operation of the recording apparatus 600h in this example is basically the same as the recording apparatus described in the seventh example.

Figure 36:
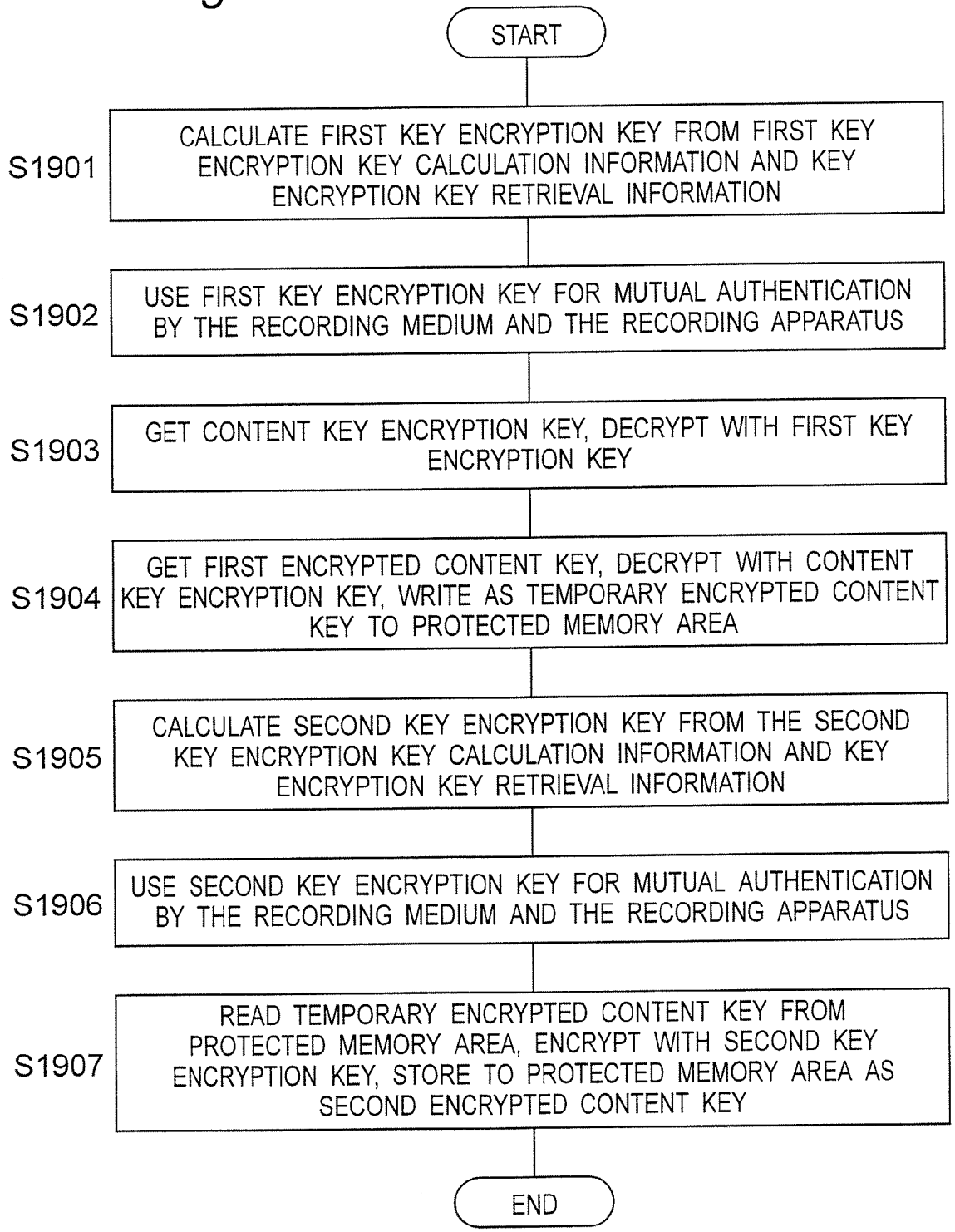
FIG. 36 is a flow chart of the content key conversion process of the eighth recording apparatus and recording medium according to the third embodiment of the invention.

The encrypted key conversion process of this example is described below with reference to the flow chart in FIG. 36.

Step S1901

The key encryption key calculation unit 619 calculates the first key encryption key from the first key encryption key calculation information in the first key encryption key calculation information storage unit 616 and the key encryption key retrieval information 155 in the system area 134.

Step S1902

Next, the first key encryption key is used for mutual authentication by the mutual media authentication unit 160 and mutual authentication unit 615. The process aborts if mutual authentication fails.

Step S1903

Next, the content key decryption unit 605 gets the first encrypted content key 153 from the unprotected memory area 133, gets the content key encryption key from the key encryption key decryption unit 623, decrypts the first encrypted content key with the content key encryption key, and sends the result as the content encryption key to the protected memory area access unit 602.

Step S1904

The protected memory area access unit 602 writes the received content encryption key as the temporary content encryption key to the protected memory area 132 using the first protected memory area access information received from the mutual authentication unit 615.

Step S1905

The key encryption key calculation unit 619 acquires the second key encryption key calculation information from the second key encryption key calculation information storage unit 617, gets the key encryption key retrieval information 155 from the system area 134, uses these informations to calculate the second key encryption key, and sends the second key encryption key to the mutual authentication unit 615.

Step S1906

The mutual authentication unit 615 uses the second key encryption key for mutual authentication with the mutual media authentication unit 160. The protected memory area access unit 602 then uses the second protected memory area access information received from the mutual authentication unit 615 to read the temporary encrypted content key 156 from the protected memory area 132, and outputs to the content key encryption unit 607.

Step S1907

The content key encryption unit 607 encrypts the received temporary encrypted content key 156 with the second key encryption key received from the key encryption key calculation unit 619, and sends the result as the second encrypted content key to the protected memory area access unit 602. The protected memory area access unit 602 writes the second encrypted content key 154 to the protected memory area 132.

An encrypted content key of the first format can thus be converted to an encrypted content key of the second format.

3.9 Example 9

Figure 37:
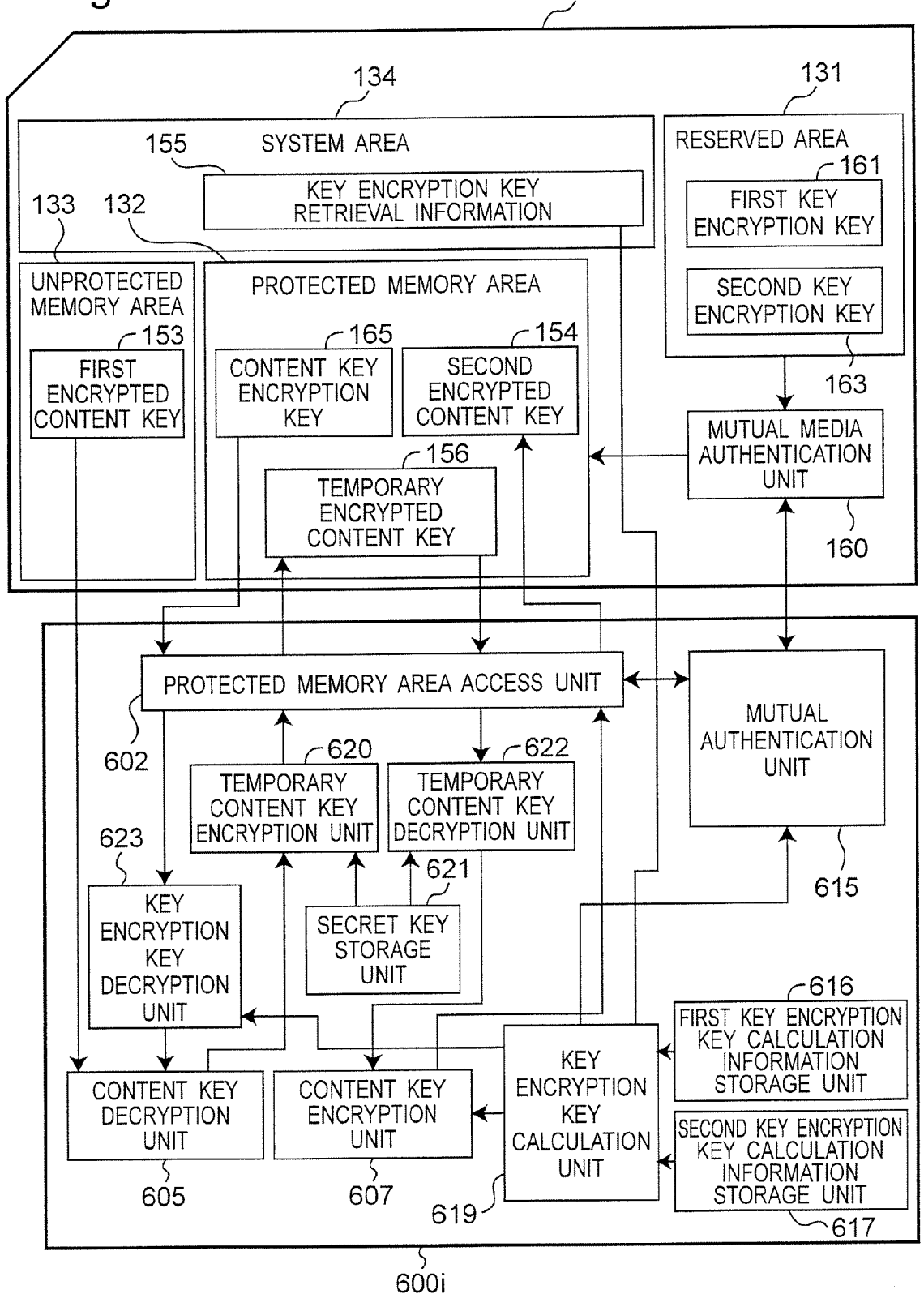
FIG. 37 shows the arrangement of a ninth recording apparatus and recording medium according to a third embodiment of the invention.

FIG. 37 shows the arrangement of a ninth recording apparatus and recording medium according to this embodiment of the invention.

The recording medium 100i in this example is identical to the recording medium 100h of the eighth example.

The recording apparatus 600i is identical to the recording apparatus 600h of the eighth example with the addition of a temporary content key encryption unit 620, temporary content key decryption unit 622, and secret key storage unit 621. The operation of this recording apparatus 600i is basically the same as the recording apparatus in the eighth example.

Figure 38:
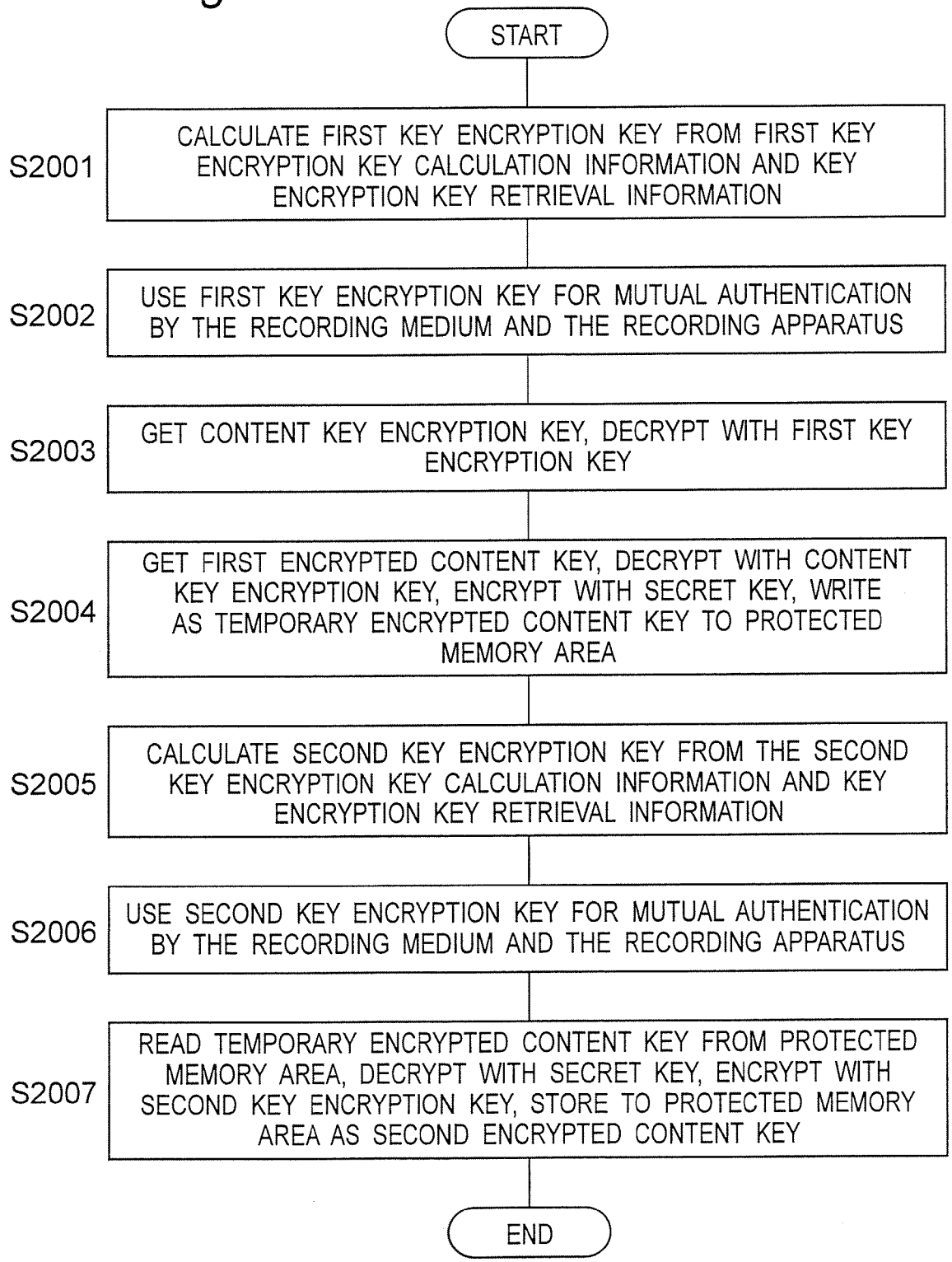
FIG. 38 is a flow chart of the content key conversion process of the ninth recording apparatus and recording medium according to the third embodiment of the invention.

The encrypted key conversion process of this example is described below with reference to the flow chart in FIG. 38.

Step S2001

The first key encryption key is first calculated from the first key encryption key calculation information and key encryption key retrieval information.

Step S2002

The first key encryption key is then used for mutual authentication by the mutual media authentication unit 160 and mutual authentication unit 615. The process aborts if mutual authentication fails.

Step S2003

The key encryption key decryption unit 623 then acquires the content key encryption key 165 from the protected memory area 132, and decrypts the content key encryption key 165 using the first key encryption key.

Step S2004

The content key decryption unit 605 gets the first encrypted content key 153 from the unprotected memory area 133, gets the content key encryption key from the key encryption key decryption unit 623, decrypts the first encrypted content key with the content key encryption key, and sends the decrypted content key to the temporary content key encryption unit 620.

The temporary content key encryption unit 620 receives the secret key from the secret key storage unit 621, encrypts the content key received from the content key decryption unit 605 with this secret key, and sends the encrypted content key to the protected memory area access unit 602.

The protected memory area access unit 602 uses the first protected memory area access information received from the mutual authentication unit 615 to write the received content encryption key to the protected memory area 132 as the temporary encrypted content key 156.

Step S2005

The key encryption key calculation unit 619 then calculates a second key encryption key from the second key encryption key calculation information and key encryption key retrieval information.

Step S2006

The mutual authentication unit 615 uses the second key encryption key for mutual authentication with the mutual media authentication unit 160.

Step S2007

The protected memory area access unit 602 then uses the second protected memory area access information received from the mutual authentication unit 615 to read and send the temporary encrypted content key 156 from the protected memory area 132 to the temporary content key decryption unit 622.

The temporary content key decryption unit 622 decrypts the received temporary encrypted content key 156 using the secret key stored by the secret key storage unit 621, and sends the result to the content key encryption unit 607.

The content key encryption unit 607 encrypts the received temporary encrypted content key with the second key encryption key received from the key encryption key calculation unit 619, and outputs the result to the protected memory area access unit 602.

The protected memory area access unit 602 stores the received content key as the second encrypted content key to the protected memory area 132.

An encrypted content key of the first format can thus be converted to an encrypted content key of the second format.

The secret key storage unit 621 is provided separately from the temporary content key encryption unit 620 and temporary content key decryption unit 622 in this embodiment, but these units can be combined. For example, the secret key storage unit 621 can be included in the temporary content key encryption unit 620 and the temporary content key decryption unit 622. The temporary content key encryption unit 620, temporary content key decryption unit 622, and secret key storage unit 621 can also be integrated in a single unit.

Furthermore, the temporary content key encryption unit 620 and temporary content key decryption unit 622 separately handle encryption and decryption operations using the secret key stored by the secret key storage unit 621 in this example, but the content can be temporarily encrypted and decrypted using an encryption/decryption algorithm that does not use a secret key. In this case the secret key storage unit 621 is unnecessary.

3.10 Example 10

Figure 39:
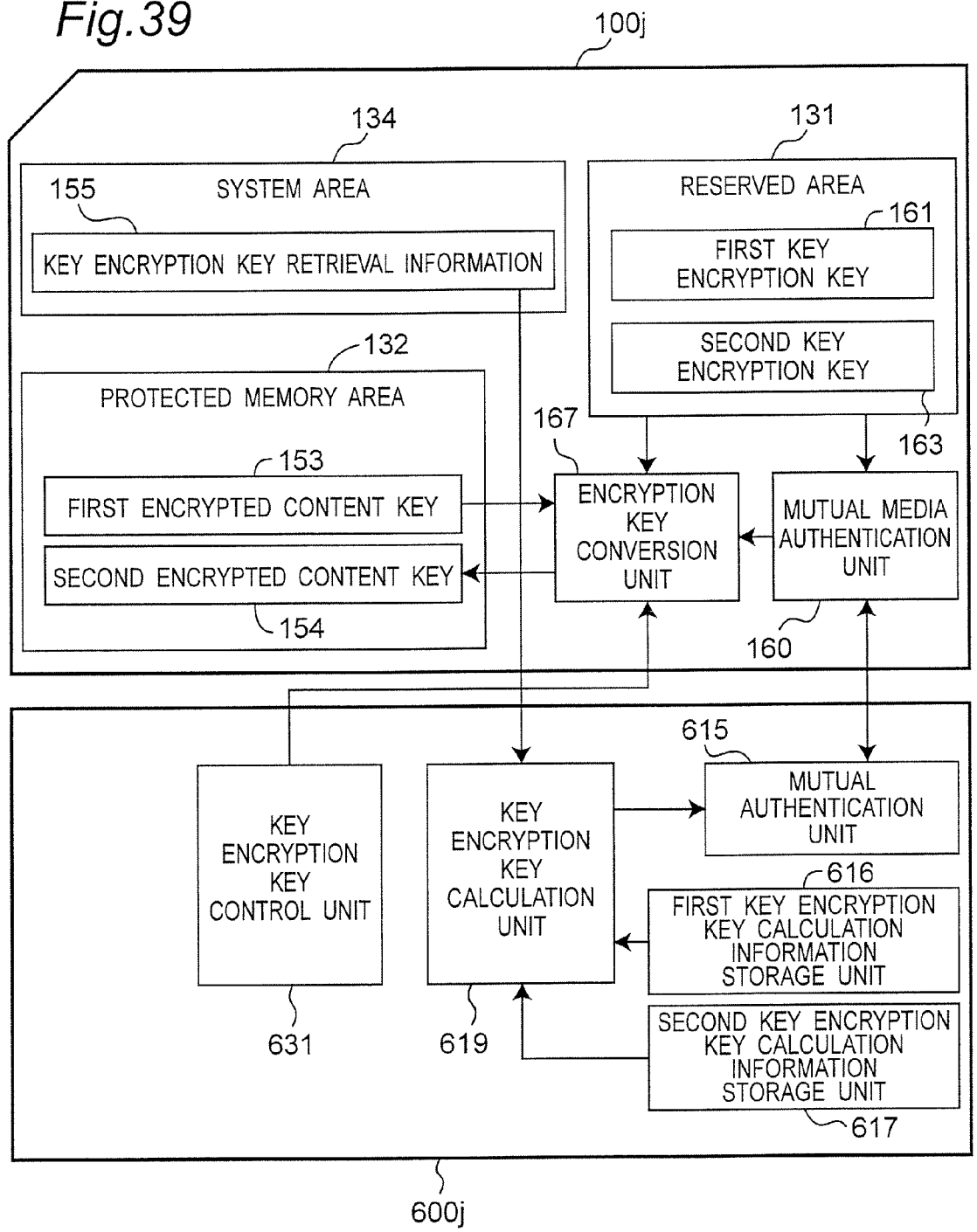
FIG. 39 shows the arrangement of a tenth recording apparatus and recording medium according to a third embodiment of the invention.

FIG. 39 shows the arrangement of a tenth recording apparatus and recording medium according to this embodiment of the invention.

This recording medium 100j stores the first and second key encryption keys 161 and 163 in the reserved area 131, stores the first and second encrypted content keys 153 and 154 in the protected memory area 132, and stores the key encryption key retrieval information 155 in the system area 134. The recording medium 100j also has an encryption key conversion unit 167 for converting the content encryption key from the first format to the second format. The recording medium 100j also includes a mutual media authentication unit 160.

The recording apparatus 600j has a mutual authentication unit 615, first and second key encryption key calculation information storage units 616 and 617, a key encryption key calculation unit 619, and a key encryption key control unit 631. The mutual authentication process of this recording apparatus 600j is basically the same as described in the second example above.

Figure 40:
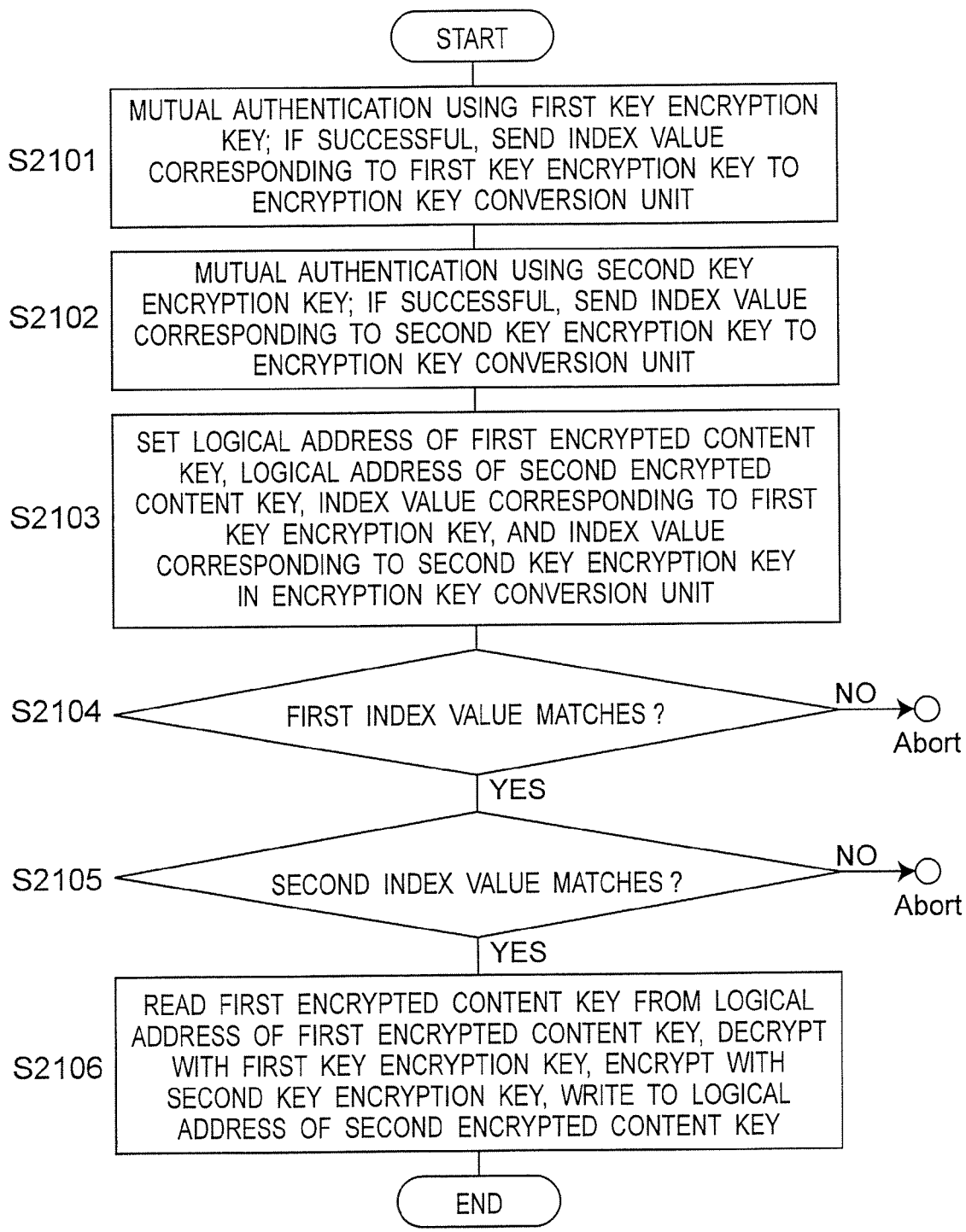
FIG. 40 is a flow chart of the content key conversion process of the tenth recording apparatus and recording medium according to the third embodiment of the invention.

The encrypted key conversion process of this example is described below with reference to the flow chart in FIG. 40.
Step S2101

The key encryption key calculation unit 619 gets the first key encryption key calculation information from the first key encryption key calculation information storage unit 616, gets the key encryption key retrieval information 155 from the system area 134, calculates the first key encryption key based on these informations, and outputs to the mutual authentication unit 615.

The mutual authentication unit 615 uses the first key encryption key for mutual authentication with the mutual media authentication unit 160. The process aborts if mutual authentication fails. If mutual authentication using the first key encryption key succeeds, the mutual media authentication unit 160 sends an index value corresponding to the first key encryption key to the encryption key conversion unit 167.
Step S2102

The key encryption key calculation unit 619 then gets the second key encryption key calculation information from the second key encryption key calculation information storage unit 617, gets the key encryption key retrieval information 155 from the system area 134, calculates a second key encryption key based on these informations, and outputs to the mutual authentication unit 615.

The mutual authentication unit 615 uses the second key encryption key for mutual authentication with the mutual media authentication unit 160. The process aborts if mutual authentication fails. If mutual authentication using the second key encryption key succeeds, the mutual media authentication unit 160 sends an index value corresponding to the second key encryption key to the encryption key conversion unit 167.
Step S2103

The key encryption key control unit 631 then passes the index value for the first key encryption key, the index value for the second key encryption key, and the logical address of the first encrypted content key 153 and the logical address of the second encrypted content key 154 in the protected memory area 132 to the encryption key conversion unit 167.
Steps S2104, S2105

The encryption key conversion unit 167 determines if the index value to the first key encryption key received from the key encryption key control unit 631 and the index value to the first key encryption key acquired from the mutual media authentication unit 160 are the same, and if the index value to the second key encryption key acquired from the key encryption key control unit 631 and the index value to the second key encryption key acquired from the mutual media authentication unit 160 are the same. The process aborts if there is not at least one match.
Step S2106

If either index value pair matches, the encryption key conversion unit 167 reads the first encrypted content key 153 from the logical address of the first encrypted content key in the protected memory area 132, reads the first key encryption key 161 and second key encryption key 163 from the reserved area 131, and decrypts the read first encrypted content key 153 with the read first key encryption key 161. The decrypted content key is also encrypted with the read second key encryption key 163 and written to the logical address of the second content encryption key in the protected memory area 132.

After mutual authentication using the first key encryption key and the second key encryption key in this example the mutual media authentication unit 160 sends index values to the first key encryption key and second key encryption key to the encryption key conversion unit 167.

Alternatively, however, the mutual authentication unit 615 can send the first protected memory area access information and the second protected memory area access information to the key encryption key control unit 631, and the key encryption key control unit 631 can use the first protected memory area access information and second protected memory area access information when sending the logical address of the first encrypted content key and the logical address of the second content encryption key to the encryption key conversion unit 167. In this case the logical address of the first encrypted content key can be encrypted using the first session key contained in the first protected memory area access information, the logical address of the second content encryption key can be encrypted using the second session key contained in the second protected memory area access information, and the encrypted logical addresses can be sent to the encryption key conversion means, but the invention is not limited to this method.

3.11 Example 11

Figure 41:
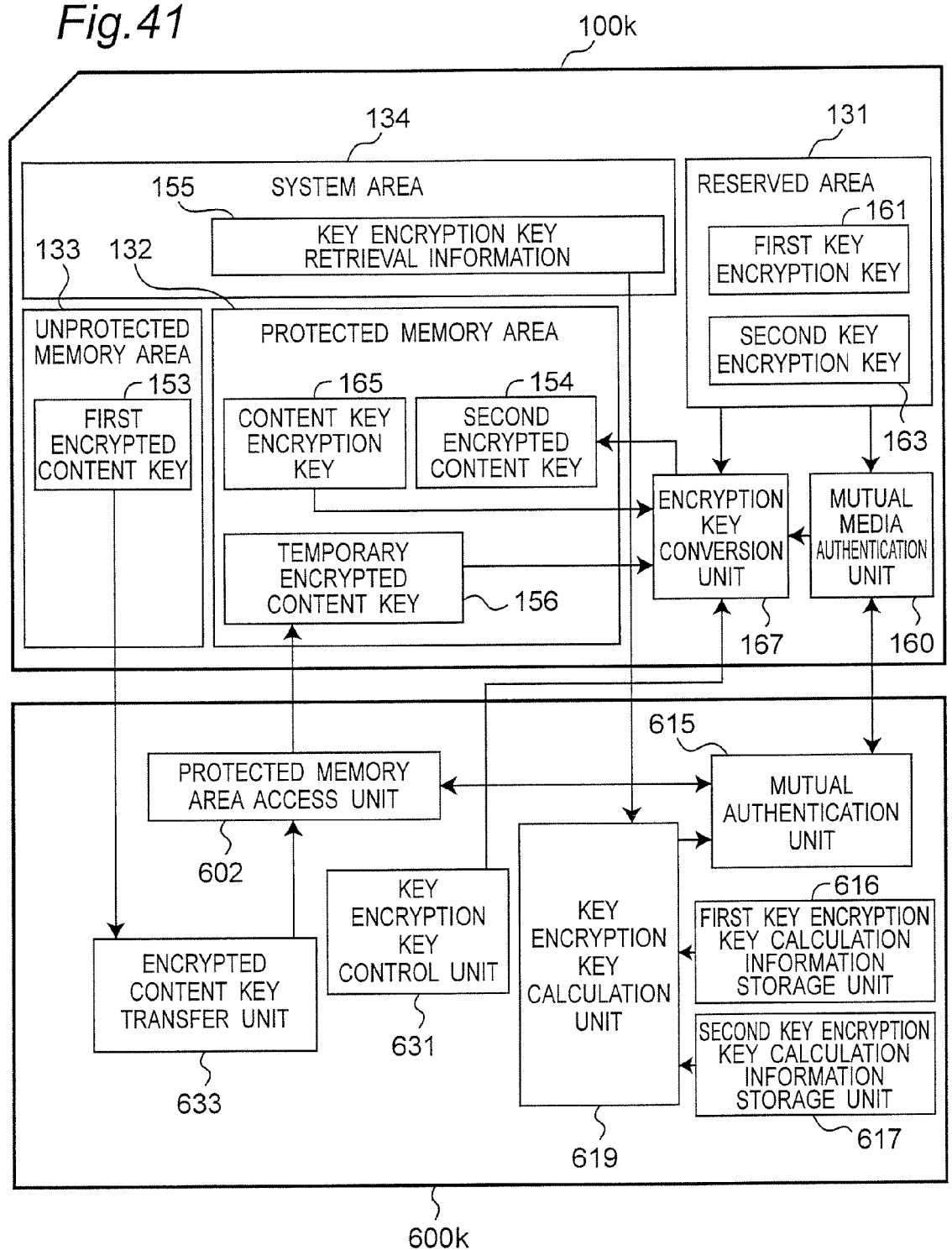
FIG. 41 shows the arrangement of an eleventh recording apparatus and recording medium according to a third embodiment of the invention.

FIG. 41 shows the arrangement of an eleventh recording apparatus and recording medium according to this embodiment of the invention.

This recording medium 100k stores the first and second key encryption keys 161 and 163 to the reserved area 131, stores the second encrypted content key 154, content key encryption key 165, and temporary encrypted content key 156 to the protected memory area 132, stores the key encryption key retrieval information 155 to the system area 134, and stores the first encrypted content key 153 to the unprotected memory area 133.

The recording medium 100k has an encryption key conversion unit 167 for converting content encryption keys from the first format to the second format. The recording medium 100k includes a mutual media authentication unit 160.

The recording apparatus 600k has a protected memory area access unit 602, mutual authentication unit 615, first and second key encryption key calculation information storage units 616 and 617, key encryption key calculation unit 619, key encryption key control unit 631, and encrypted content key transfer unit 633. Mutual authentication and the use of protected memory area access information by the protected memory area access unit 602 to access the protected memory area 132 are the same as described in the second example above.

Figure 42:
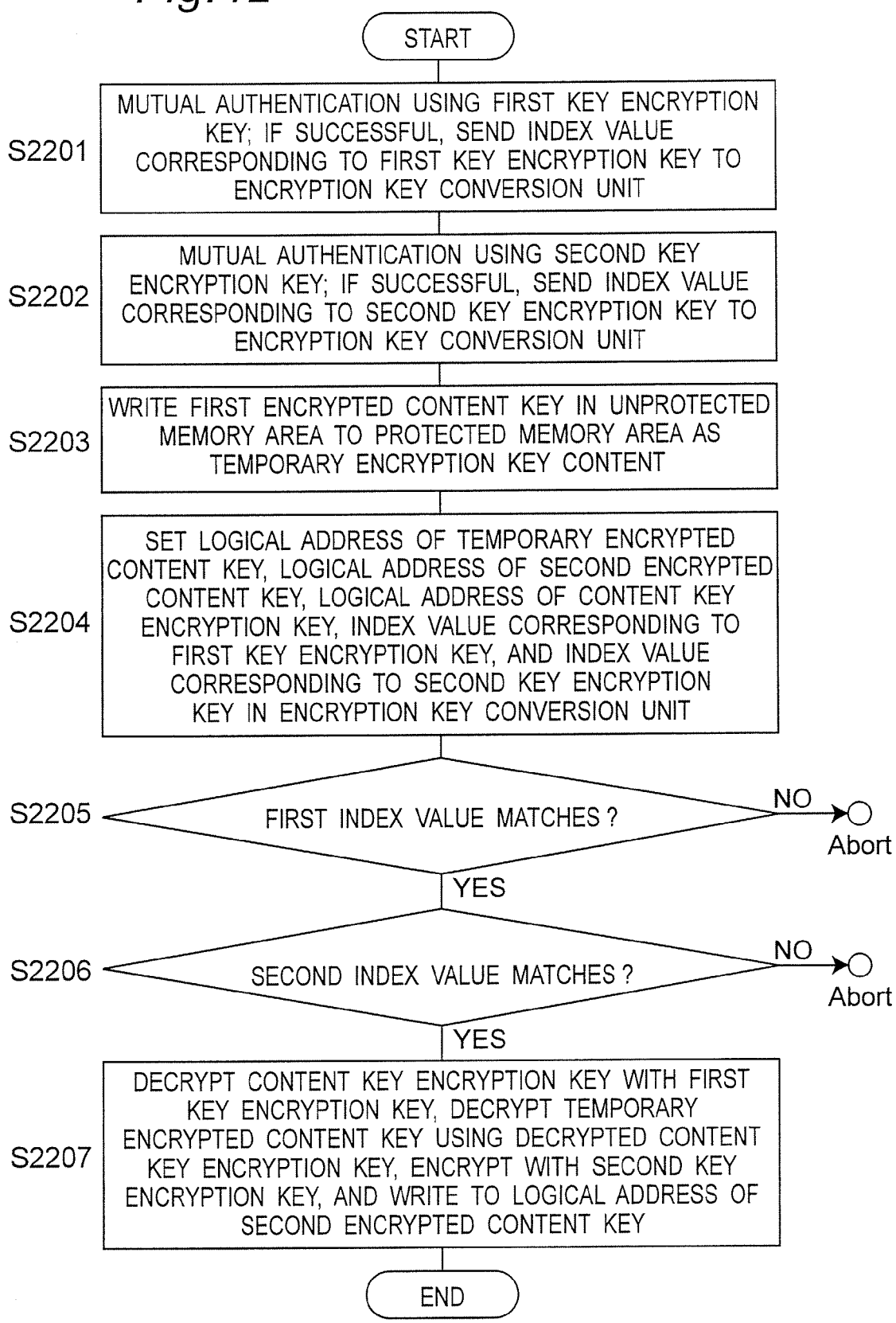
FIG. 42 is a flow chart of the content key conversion process of the eleventh recording apparatus and recording medium according to the third embodiment of the invention.

The encrypted key conversion process of this example is described below with reference to the flow chart in FIG. 42.

Step S2201

The key encryption key calculation unit 619 gets the first key encryption key calculation information from the first key encryption key calculation information storage unit 616, gets the key encryption key retrieval information 155 from the system area 134, calculates the first key encryption key based on these informations, and outputs to the mutual authentication unit 615.

The mutual authentication unit 615 uses the first key encryption key for mutual authentication with the mutual media authentication unit 160. The process aborts if mutual authentication fails. If mutual authentication using the first key encryption key succeeds, the mutual media authentication unit 160 sends an index value to the first key encryption key to the encryption key conversion unit 167.

Step S2202

The key encryption key calculation unit 619 then gets the second key encryption key calculation information from the second key encryption key calculation information storage unit 617, gets the key encryption key retrieval information 155 from the system area 134, calculates the second key encryption key based on these informations, and outputs to the mutual authentication unit 615.

The mutual authentication unit 615 uses the second key encryption key for mutual authentication with the mutual media authentication unit 160. The process aborts if mutual authentication fails. If mutual authentication using the second key encryption key succeeds, the mutual media authentication unit 160 sends an index value to the second key encryption key to the encryption key conversion unit 167.

Step S2203

The encrypted content key transfer unit 633 reads and sends the first encrypted content key 153 from the unprotected memory area 133 to the protected memory area access unit 602.

The protected memory area access unit 602 receives the first protected memory area access information from the mutual authentication unit 615 and uses this information to write the first encrypted content key acquired from the encrypted content key transfer unit 633 to the protected memory area 132 as temporary encrypted content key 156.

Step S2204

The key encryption key control unit 631 then passes the index value to the first key encryption key 161, the index value to the second key encryption key 163, the logical address of the temporary encrypted content key 156 in the protected memory area 132, the logical address of the second encrypted content key 154 in the protected memory area 132, and the logical address of the content key encryption key 165 in the protected memory area 132 to the encryption key conversion unit 167.

Steps S2205, S2206

The encryption key conversion unit 167 determines if the index value to the first key encryption key received from the key encryption key control unit 631 and the index value to the first key encryption key acquired from the mutual media authentication unit 160 are the same, and if the index value to the second key encryption key acquired from the key encryption key control unit 631 and the index value to the second key encryption key acquired from the mutual media authentication unit 160 are the same. The process aborts if there is not at least one match.

Step S2207

If either index value pair matches, the encryption key conversion unit 167 reads the temporary encrypted content key 156 from the logical address of the temporary encrypted content key 156 in the protected memory area 132, reads the content key encryption key 165 from the logical address of the content key encryption key, and reads the first key encryption key 161 and second key encryption key 163 from the reserved area 131.

The encryption key conversion unit 167 decrypts the content key encryption key 165 using the first key encryption key 161, and decrypts the temporary encrypted content key 156 using the decrypted content key encryption key.

The encryption key conversion unit 167 also encrypts the decrypted content key using the second key encryption key, and writes the encrypted content key to the logical address of the second encrypted content key in the protected memory area 132.

After mutual authentication using the first key encryption key and the second key encryption key in this example the mutual media authentication unit 160 sends index values to the first key encryption key and second key encryption key to the encryption key conversion unit 167.

Alternatively, however, the mutual authentication unit 615 sends the first protected memory area access information and the second protected memory area access information to the key encryption key control unit 631. The key encryption key control unit 631 can use the first protected memory area access information and second protected memory area access information when sending the logical address of the temporary content encryption key, the logical address of the second content encryption key, and the logical address of the content key encryption key to the encryption key conversion unit 167. In this case the logical address of the temporary encrypted content key and the logical address of the content key encryption key can be encrypted using the first session key contained in the first protected memory area access information, the logical address of the second content encryption key can be encrypted using the second session key contained in the second protected memory area access information, and the encrypted logical addresses can be sent to the encryption key conversion means, but the invention is not limited to this method.

In this example the recording apparatus 600k first reads the first encrypted content key 153 from the unprotected memory area 133 of the recording medium 100k into the protected memory area 132 for later conversion by the encryption key conversion unit 167, but the arrangement described below can be used instead.

The key encryption key control unit 631 passes an index value to the first key encryption key, an index value to the second key encryption key, the logical address of the first encrypted content key in the unprotected memory area 133, the logical address of the second encrypted content key 154 in the protected memory area 132, and the logical address of the content key encryption key 165 in the protected memory area 132 to the encryption key conversion unit 167.

The conversion process run by the encryption key conversion unit 167 in this case reads the first encrypted content key 153 from the logical address of the first encrypted content key in the unprotected memory area 133, reads the content key encryption key 165 from the logical address of the content key encryption key, and reads the first and second key encryption keys 161 and 163 from the reserved area 131. The content key encryption key 165 is then decrypted using the first key encryption key, and the decrypted content key encryption key is then used to decrypt the first encrypted content key 153. The decrypted content key is then encrypted with the second key encryption key and written to the logical address of the second content encryption key in the protected memory area 132. In this case the encrypted content key transfer unit 633 and the protected memory area access unit 602 are not needed in the recording apparatus 600k.

These embodiments of the invention are described using by way of example converting an encrypted content key from a first format to a second format, but the concept of the invention can also be used for conversion from the second format to the first format.

The encryption key conversion process of the recording apparatus according to the present invention enables easily and safely converting an encrypted content key stored on a recording medium, and can also be applied to DRM (digital rights management) conversion.

The present invention is described herein with reference to specific embodiments thereof, and numerous variations, modifications, and other applications will be obvious to one with ordinary skill in the related art. The invention is not limited to these specific embodiments, and is limited only by the scope of the accompanying claims.

The present invention relates to Japanese Patent Application 2004-193677 (filed Jun. 30, 2004) and Japanese Patent Application 2004-193678 (filed Jun. 30, 2004), the entire content of which is incorporated herein by reference.

INDUSTRIAL APPLICABILITY

The present invention can be used in a recording apparatus for recording content in various formats affording a copyright protection function to a recording medium.

The invention claimed is:

1. A recording apparatus for recording content to a recording medium, comprising:
a receiver that receives content in a first format and a first format content key, the first format content key being obtained by encrypting a content key using a first key encryption key, the content key being used to encrypt the content;
a first key writer that writes the received first format content key into the recording medium;
a first format content writer that writes the received first format content into an unprotected area of the recording medium;
a key converter that converts the first format content key to a second format content key without changing the key value of the content key;
a content converter that converts the first format content to content in a second format;
a second key writer that writes the second format content key into the recording medium; and
a second content writer that writes the second format content into the unprotected area of the recording medium;
wherein the key converter comprises:
a content key decryptor that reads the first format content key from the recording medium and decrypts the first format content key, using the first key encryption key; and
a content key encryptor that encrypts the decrypted first format content key, using a second key encryption key to obtain the second format content key, the second key encryption key being different from the first key encryption key,
wherein the unprotected area can be accessed freely by the recording apparatus, regardless of whether the recording apparatus succeeds in performing mutual authentication with the recording medium, wherein:
the recording medium further comprises:
a system area from which data can only be read;
a reserved area that cannot be externally accessed; and
a protected area that can only be accessed when mutual authentication is performed successfully,
wherein the system area stores key encryption key retrieval information that is used for performing mutual authentication,
the reserved area stores the second key encryption key and a third key encryption key,
the unprotected area stores the first format content key, and
the protected area stores the first key encryption key encrypted with the third key encryption key; and
wherein:
the recording apparatus further comprises:
a key encryption key calculator that calculates the second and third key encryption keys, using the key encryption key retrieval information stored in the system area of the recording medium;
a mutual authenticator that performs first mutual authentication and second mutual authentication with the recording medium, respectively using the calculated second and third key encryption keys; and
a key encryption key decryptor that reads the encrypted first key encryption key, when the mutual authenticator succeeds in performing the second mutual authentication using the third encryption key, and decrypts the read encrypted first key encryption key with the third key encryption key;
wherein the content key decryptor reads the first format content key from the unprotected area, and decrypts the first format content key, using the decrypted first key encryption key; and
the second content key writer stores the second format content key to the protected area if the mutual authenticator succeeds in performing the second mutual authentication using the third key encryption key.

2. The recording apparatus described in claim 1, wherein the decrypted first format content key is stored temporarily into the protected area of the recording medium, before encryption by the content key encryptor.

3. The recording apparatus described in claim 2, further comprising:
a temporary content key encryptor that applies a specific encryption to the decrypted first format content key and temporarily stores the encrypted content key into the protected area in the recording medium; and a temporary content key decryptor that reads the content key temporarily stored in the protected area, and decrypts the read content key.

4. A host apparatus connectable to a recording medium that stores a content key for decrypting an encrypted content, wherein the recording medium includes:
a special area that stores a plurality of unique media keys and prohibits access to the special area directly from the host apparatus, except when the host apparatus and the recording medium are mutually authenticated;
a protected area that stores a unique service key encrypted with one of the plurality of unique media keys, and can be accessed by the host apparatus only upon successful authentication with the host apparatus; and
an unprotected area that stores the content key encrypted with the unique service key, and can be accessed by the host apparatus without authentication with the host apparatus, the host apparatus comprising:
a content key obtainer that obtains the content key encrypted with the unique service key from the unprotected area;
a service key obtainer that performs authentication with the recording medium, and obtains a decrypted unique service key, which is the unique service key decrypted with the one of the plurality of the unique media keys, from the protected area;
a content key decryptor that decrypts the encrypted content key with the decrypted unique service key; and
a content key recorder that performs authentication with the recording medium, encrypts the decrypted content key with another of the plurality of unique media keys, different from the one of the plurality of unique media keys, and stores the encrypted content key in the protected area.

5. The host apparatus according to claim 4, wherein a content encrypted with the content key is stored in the unprotected area.

6. The host apparatus according to claim 4, wherein
the recording medium stores a first list including a content ID related to an encrypted content in a first format which can be decrypted with the content key stored in the unprotected area, and a second list including a content ID related to an encrypted content in a second format which can be decrypted with the content key stored in the protected area, and
the host apparatus records the content ID related to the encrypted content in the second format to the second list.

7. A method for recording a content key for decrypting an encrypted content to a recording medium which stores, wherein the recording medium includes:
a special area that stores a plurality of unique media keys and prohibits access to the special area directly from a host apparatus;
a protected area that stores a unique service key encrypted with one of the plurality of unique media keys, and can be accessed by the host apparatus only upon successful authentication with the host apparatus; and
an unprotected area that stores a content key encrypted with the unique service key, and can be accessed by the host apparatus without authentication with the host apparatus, the method comprising:
obtaining the content key encrypted with the unique service key from the unprotected area;
performing authentication with the recording medium, and obtaining a decrypted unique service key, which is the unique service key decrypted with the one of the plurality of unique media keys, from the protected area;
decrypting the encrypted content key with the decrypted unique service key; and
performing authentication with the recording medium, encrypting the content key with another of the plurality of unique media keys, different from the one of the plurality of unique media keys, and storing the encrypted content key in the protected area.

8. The method according to claim 7, wherein a content encrypted with the content key is stored in the unprotected area.

9. The method according to claim 7, wherein
the recording medium stores a first list including a content ID related to an encrypted content in a first format which can be decrypted with the content key stored in the unprotected area, and a second list including a content ID related to an encrypted content in a second format which can be decrypted with the content key stored in the protected area, and
the method further comprises recording the content ID related to the encrypted content in the second format to the second list.

* * * * *